US011040708B2

(12) United States Patent
Mennie

(10) Patent No.: US 11,040,708 B2
(45) Date of Patent: Jun. 22, 2021

(54) BRAKE CONTROL SYSTEM

(71) Applicant: Trevor Michael Mennie, Mayfield (GB)

(72) Inventor: Trevor Michael Mennie, Mayfield (GB)

( * ) Notice: Subject to any disclaimer, the term of this patent is extended or adjusted under 35 U.S.C. 154(b) by 0 days.

(21) Appl. No.: 16/095,772

(22) PCT Filed: Oct. 13, 2017

(86) PCT No.: PCT/GB2017/054109
§ 371 (c)(1),
(2) Date: Oct. 23, 2018

(87) PCT Pub. No.: WO2018/069727
PCT Pub. Date: Apr. 19, 2018

(65) Prior Publication Data
US 2019/0351890 A1    Nov. 21, 2019

(30) Foreign Application Priority Data

Oct. 14, 2016  (GB) ...................................... 1617506
Jan. 24, 2017  (GB) ...................................... 1701156
(Continued)

(51) Int. Cl.
*B60T 17/22*      (2006.01)
*B60T 8/34*       (2006.01)
(Continued)

(52) U.S. Cl.
CPC .............. *B60T 17/222* (2013.01); *B60T 8/34* (2013.01); *B60T 11/26* (2013.01); *B60T 11/30* (2013.01); *B60T 13/52* (2013.01)

(58) Field of Classification Search
CPC ........ B60T 11/26; B60T 11/30; B60T 17/222; B60T 8/34; B60T 13/52
See application file for complete search history.

(56) References Cited

U.S. PATENT DOCUMENTS 2,343,698 A  *  3/1944  Parnell ................. B60T 13/147
                                                188/359
3,159,974 A     12/1964  Rodgers et al.
(Continued)

FOREIGN PATENT DOCUMENTS

DE      19535709 A1    3/1997
EP       0173658 A2    3/1986
(Continued)

OTHER PUBLICATIONS

Office action for EP17787579.6 dated Feb. 14, 2020.
Office action for EP17787579.6 dated Jul. 23, 2020.

*Primary Examiner* — Vishal R Sahni
(74) *Attorney, Agent, or Firm* — Getz Balich LLC

(57) ABSTRACT

A brake control system for a vehicle, the brake control system including a master cylinder, a brake line for communicating brake fluid between the master cylinder and a brake, a fluid reservoir in fluid communication with the brake line during non-braking conditions, and means for selectively moving brake fluid into and/or out of the fluid reservoir. The means for selectively moving brake fluid into and/or out of the fluid reservoir includes means for removing gas from the fluid reservoir, and is configured to move brake fluid into the fluid reservoir, so that brake fluid is moved along the brake line in a direction towards the master cylinder, during non-braking conditions. Upon receiving a signal of an anticipated brake event, brake fluid may also be moved out of the fluid reservoir, so that brake fluid is moved along the brake line in a direction away from the master cylinder.

20 Claims, 26 Drawing Sheets

(30) Foreign Application Priority Data

Jun. 13, 2017 (GB) .................................... 1709400
Sep. 27, 2017 (GB) .................................... 1715652

(51) Int. Cl.
B60T 11/26 (2006.01)
B60T 11/30 (2006.01)
B60T 13/52 (2006.01)

(56) References Cited

U.S. PATENT DOCUMENTS

| | | | |
|---|---|---|---|
| 4,503,678 A | 3/1985 | Wimbush | |
| 5,088,529 A | 2/1992 | Jones et al. | |
| 5,335,981 A | 8/1994 | Volz et al. | |
| 5,649,746 A * | 7/1997 | Stewart, Jr. | B60T 8/345 |
| | | | 188/351 |
| 5,653,316 A * | 8/1997 | Kane | B60T 17/222 |
| | | | 188/352 |
| 2003/0067215 A1 | 4/2003 | Rieth et al. | |
| 2005/0061394 A1* | 3/2005 | Awad | B60T 17/222 |
| | | | 141/98 |
| 2005/0269180 A1 | 12/2005 | Von Hayn et al. | |
| 2005/0279173 A1 | 12/2005 | Leigh-Monstevens | |
| 2006/0125315 A1 | 6/2006 | Hool | |
| 2007/0034462 A1 | 2/2007 | Themelin et al. | |
| 2008/0265663 A1 | 10/2008 | Leach et al. | |
| 2010/0253136 A1 | 10/2010 | Greer | |
| 2011/0253252 A1* | 10/2011 | Buchanan | B60T 17/222 |
| | | | 141/11 |

FOREIGN PATENT DOCUMENTS

| | | |
|---|---|---|
| FR | 2944765 A1 | 10/2010 |
| GB | 960128 A | 6/1964 |
| GB | 1212087 A | 11/1970 |
| GB | 2334078 A | 8/1999 |
| GB | 2497426 A | 6/2013 |
| JP | 54030368 | 3/1979 |
| JP | S5593739 U | 6/1980 |
| JP | H03194226 A | 8/1991 |
| JP | H0532841 A | 2/1993 |
| JP | H09156398 A | 6/1997 |
| JP | 2001191911 A | 7/2001 |
| JP | 2009236221 A | 10/2009 |
| JP | 2010215188 A | 9/2010 |
| KR | 20020018791 A | 3/2002 |
| WO | WO9908913 A1 | 2/1999 |
| WO | WO9912785 A1 | 3/1999 |

* cited by examiner

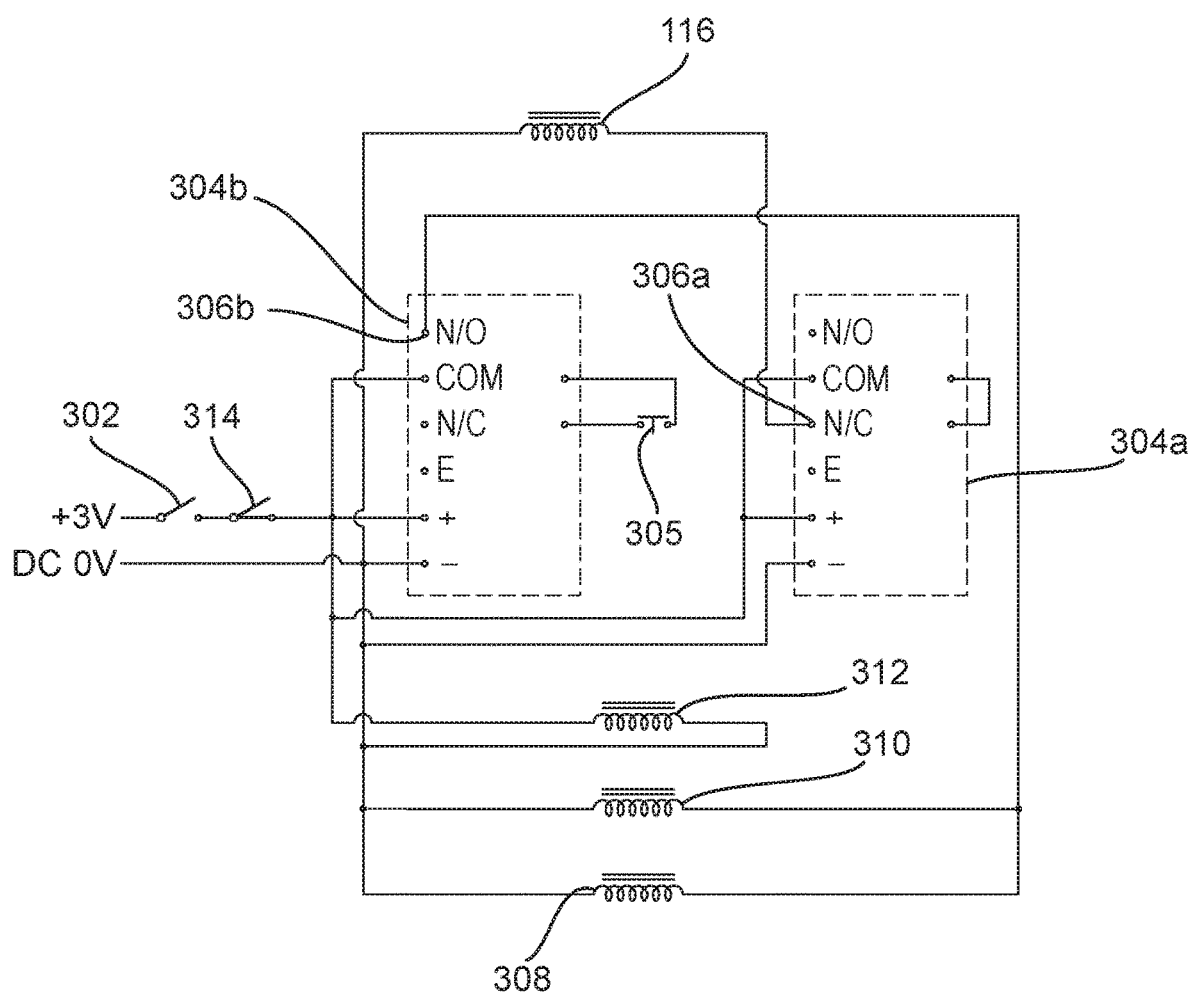

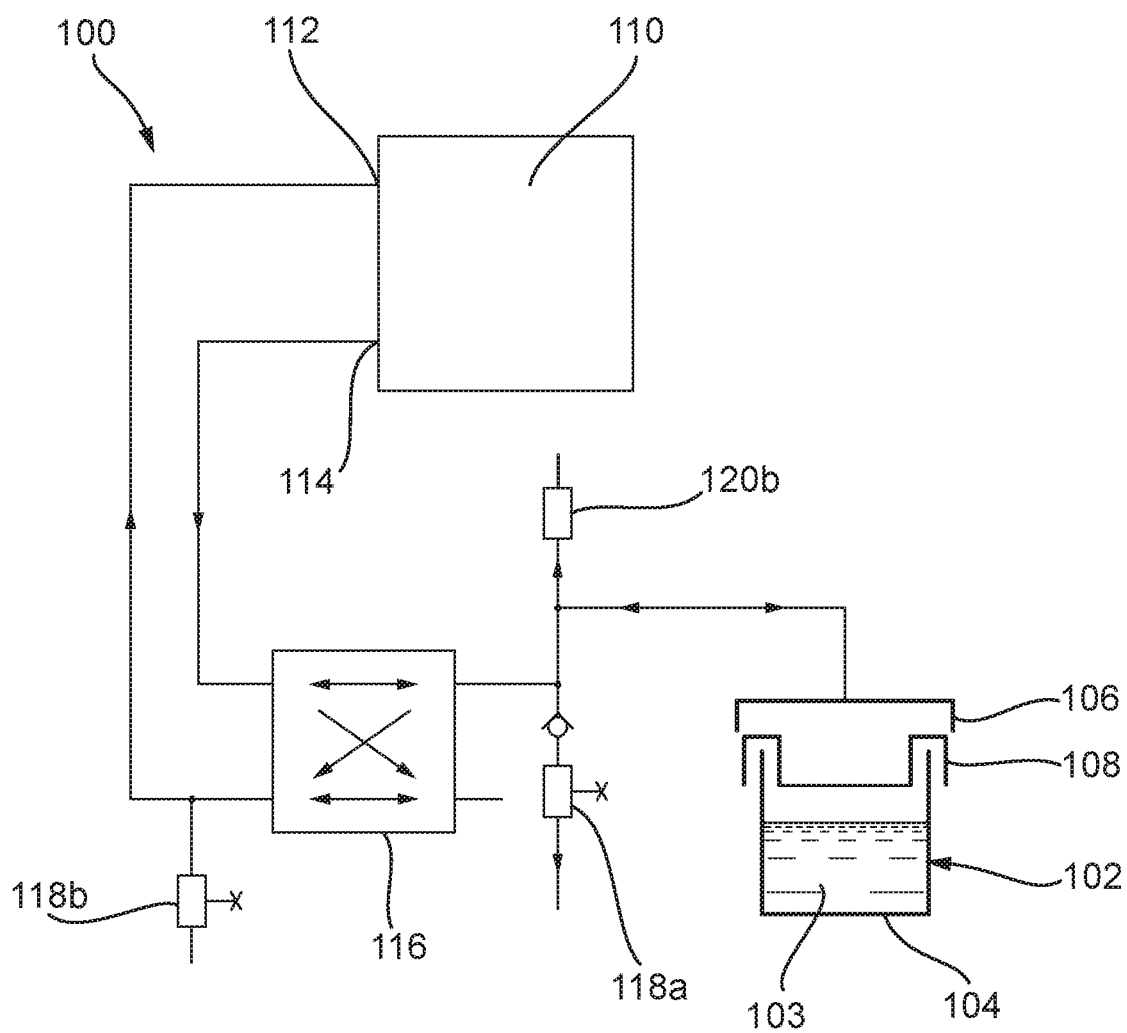

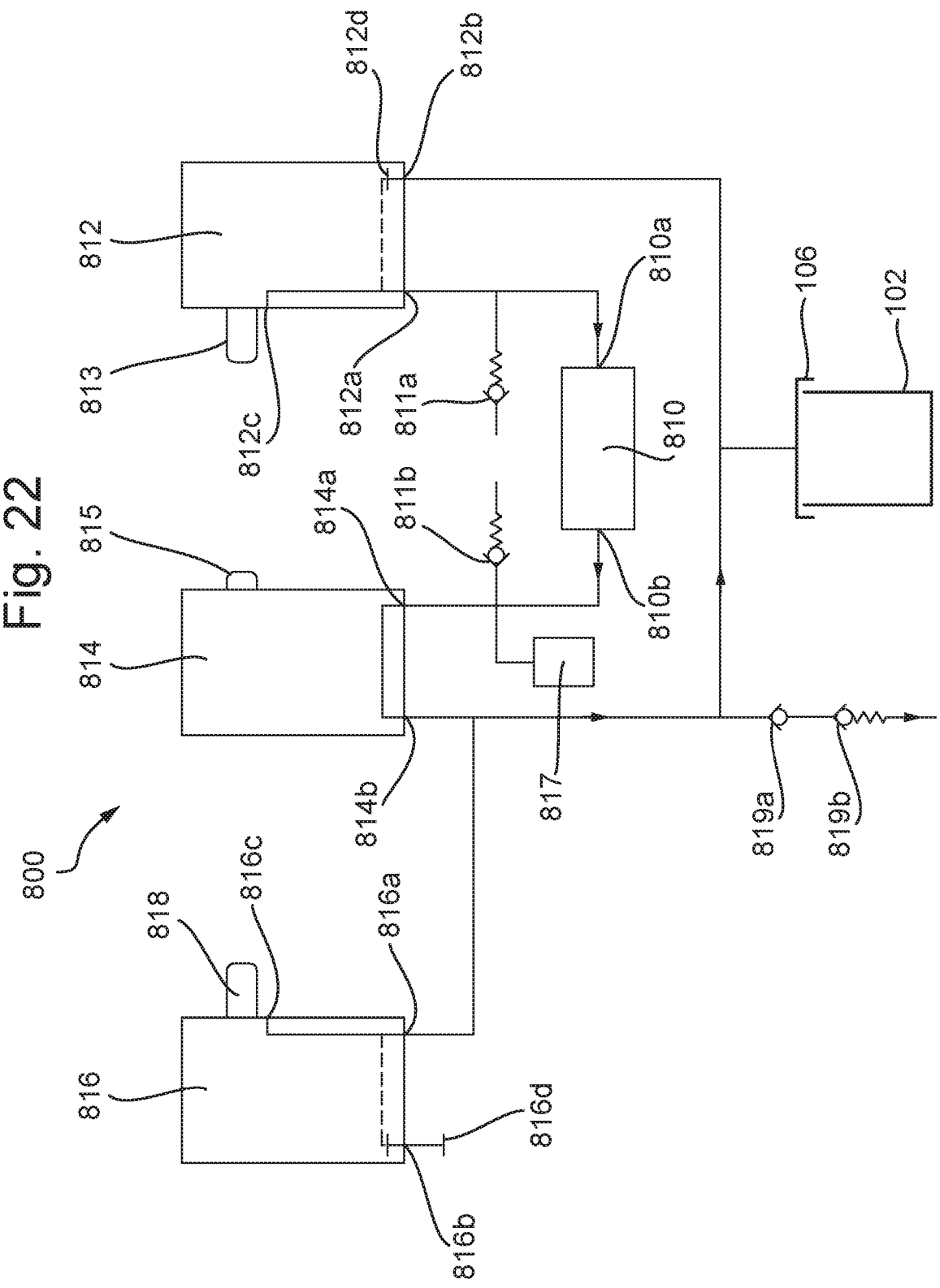

BRAKE CONTROL SYSTEM

This application is entitled to the benefit of, and incorporates by reference essential subject matter disclosed in PCT Application No. PCT/GB2017/053109 filed on Oct. 13, 2017, which claims priority GB Patent Appln. No. 1617506.9 filed Oct. 14, 2016, GB Patent Appln. No. 1701156.0 filed Jan. 24, 2017, GB Patent Appln. No. 1709400.4 filed Jun. 13, 2017 and GB Patent Appln. No. 1715652.2 filed Sep. 27, 2017, which are hereby incorporated by reference in their entireties.

BACKGROUND OF THE INVENTION

1. Technical Field

The present invention relates to a brake control system for a vehicle, a method of controlling a vehicle brake system, and a brake system for a vehicle.

2. Background Information

Brake systems for vehicles, such as a car, typically comprise a brake rotor (or "brake disc") fixed to the wheel of the vehicle. The brake disc (also known as a brake rotor, and which may be a disc or drum) rotates with the wheel when the vehicle is moving. With disc brakes, a pair of brake pads is typically positioned with the respective brake pad on either side of the brake disc, and the brake pads are typically brought into firm contact with the brake disc by brake calipers. With drum brakes, brake pads are typically positioned on the inside of the brake drum and are forced outwards into firm contact with the brake drum. Brake pads are typically fixed to a static part of the vehicle, and do not rotate with the wheel when the vehicle is moving. When the brake is activated, the brake pad is pressed firmly against the brake disc, and friction between the static brake pad and rotating rotor causes the speed of rotation of the rotor, and therefore the speed of rotation of the wheel, to slow. This in turn slows the vehicle.

When the brake is not activated, brake pads are usually positioned in close proximity to the brake rotor so that the distance that the brake pad needs to travel in order to firmly contact the brake rotor is small and so that the activation time for the brake is short. This is particularly the case with hydraulically actuated brakes, in which a piston that is provided at the brake pedal of the vehicle to actuate the brake is in hydraulic communication with a piston that is provided at the brake pad to move the pad into contact with the rotor. The brake pedal piston has a smaller diameter than the brake pad piston, such that a larger movement/lower force provided at the brake pedal to activate the brake is converted into a much smaller movement but a much larger force at the brake pad to move the pad. Thus, with hydraulically actuated brakes, the distance between the brake pad and brake rotor is typically necessarily small so that an appropriate amount of force can be applied by the brake pad.

A small distance between a brake pad and brake rotor can also reduce the amount of debris that can accumulate between the brake pad and brake rotor, and can keep the brake pad dry by reducing the amount of water ingress. In some arrangements, brake pads may even be positioned in light contact with the brake rotor even when the brake is not being activated so as to minimize the distance and time to activate the brake.

After braking, the force applied by the hydraulic system to the pistons is reduced or removed. The brake system can then return to its pre-braking configuration, i.e. with a small distance between the brake pad and brake rotor.

However, a problem with these arrangements exists in that, after braking, an undesired braking force in the form of drag between the brake pad braking surface and the rotor can still be present. The greater the brake pedal force applied during braking, the greater the drag caused, which the vehicle has to overcome. This drag effect is caused by the caliper piston seal being compressed by the brake fluid to such an extent that the piston cannot be released from the seal grip as there is no direct or external force to return the pistons and the hydraulic (brake) fluid to their original locations, in present systems. This problem is exacerbated by the use of carbon fiber discs, which are increasingly being used due to their ability to be used at high temperatures without cracking, and while suffering virtually no wear, as is the case with traditional cast iron discs. However, with such discs, it is difficult to dissipate this heat. The heat can cause the components in the system, particularly the brake pads, to glaze. For example, the glue holding the granules forming the surface of the brake pad, will melt at high temperatures, and smear across the pad, filling in the gaps between the granules. It will be necessary to rub or wear this glue off before the pads can brake effectively again. The heat may also cause components in the system, particularly the brake pads and the brake disc, stick together, thus making it harder for the brake pads to return to their original position after braking, and thus increasing the drag effect. The heat can also transfer to other components in the brake causing, for example, the hydraulic (brake) fluid to boil. This problem of overheating and, thus, brake fluid boiling and additional drag, can also be found in fully floating brake discs, although the use of floating discs aids in that it allows for expansion of the components.

The drag effect increases the vehicle rolling resistance resulting in increased $CO_2$ emissions as the vehicle acts to overcome this resistance, which reduces the efficiency of the vehicle, and leads to higher fuel consumption. The contact between the pads and rotor also causes wear on the brake pads and rotors, even to some extent, though a lesser one, with carbon fiber discs, which can shorten the lifetime of the brake pads and rotors, producing brake dust pollution, to the detriment of the environment. Brake drag, and its detrimental effect to vehicle performance and environmental impact, is well known to the car manufacturing industry with no credible solution available to date.

A further problem experienced by brakes is known in the art is "Pad Knockback" (also known as "Brake Knock-off" or "Pad Knock-off"). This is a problem usually experienced by high performance vehicles such as racing cars, which often travel through corners at high speed. In such situations, elements of a brake system bend or slide sideways as a result of 'G' forces, causing the brake pad and piston to be retracted (i.e. pushed away from the brake rotor) further than desired. Thus, after braking, the brake pad is at a greater distance from the brake disc than usual. When the brakes are next applied, even full depression of the brake pedal may not cause application of the brakes. It may take several full depressions of the brake pedal before the brakes are applied. A previously known solution to this was to "pump" or "tap" the brakes after leaving a high speed corner, or just prior to the next braking event, in order to return the piston and brake pad to their usual position, without actually fully applying the brakes (i.e. pressing the brake pads against the brake rotor). This requires an additional action by the driver, and also risks either not fully pushing the brakes back to their desired position, or accidentally pushing the brakes back on, as the driver cannot be sure how many times they must "pump" or "tap" the brakes.

WO 2013/084188, by the present Applicant, discloses an apparatus and method for separating the brake pad from the brake rotor under non-braking conditions. A pressured fluid supply is used to provide fluid to the braking surface of the pad under non-braking conditions. Fluid removal means may be provided to remove fluid from the braking surface under braking conditions.

SUMMARY OF THE INVENTION

The present invention seeks to provide a brake control system and a brake system that further addresses the aforementioned problems. The brake and/or brake system can be used with any typical brake systems, for example systems using fixed or sliding ("floating") calipers, and cast iron, cross-drilled, slotted or carbon ceramic brake discs.

According to an aspect of the present invention, there is provided a brake control system for a vehicle, the brake control system comprising a master cylinder, a brake line for communicating brake fluid between the master cylinder and a brake, a fluid reservoir in fluid communication with the brake line during non-braking conditions, and means for selectively moving brake fluid into and/or out of the fluid reservoir during non-braking conditions, so that brake fluid is moved along the brake line during said non-braking conditions. Moving brake fluid into or out of the fluid reservoir during non-braking conditions will cause brake fluid to move along the brake line, which will, in turn, vary the position of a brake pad when the brake control system is used in combination with a brake.

The present invention provides a system that can solve the problems of retraction, heat transfer from the brake pads to the brake fluid via the caliper piston and knockback and can be added to existing brake systems, without detriment to brake efficiency or affecting vehicle safety features, which may be controlled by a hydraulic control unit (HCU), such as anti-lock brake systems (ABS), traction control, or stability control.

The term "master cylinder" is known in the art to refer to a cylinder for controlling a hydraulic system. A typical hydraulic brake system includes a main chamber located within a master cylinder in fluid communication with at least one slave cylinder via a brake line. The slave cylinder controls the positioning of a brake pad in a brake caliper. A master piston and a slave piston are slidably movable within the master and slave cylinders respectively, and the system is filled with a hydraulic (brake) fluid. When the master piston is actuated (e.g. by the driver pressing a brake pedal), the force is transmitted via the brake fluid in the main chamber of the master cylinder, the brake line, and the main chamber of the slave cylinder to actuate the slave piston, which in turn varies the position of a brake pad, such that it is moved firmly into contact with a brake disc. A master cylinder fluid reservoir, at least partially filled with brake fluid, is in fluid communication with the main chamber of the master cylinder during non-braking conditions, to ensure that the system remains full of brake fluid, and a valve or seal prevents any brake fluid entering the main chamber during the majority of the duration of braking conditions. Typically, such master cylinder fluid reservoirs have an opening to atmosphere to allow the level of brake fluid therein to increase or decrease as necessary without any pressure changes in an air gap within the reservoir. When the master cylinder is actuated, under braking conditions, the master cylinder fluid reservoir becomes isolated from the main chamber, thus creating a closed hydraulic system to ensure the force applied by the master piston is correctly propagated through the system to the brake pad. The master cylinder is typically biased such that, when an actuation force is removed, the master piston is returned to its initial position, and the master cylinder fluid reservoir returns to being in fluid communication with the main chamber of the master cylinder and atmosphere. Such biasing can be provided by a spring within the main chamber. In some vehicles, one master cylinder will control the brakes on all of the wheels. In some vehicles, such as racing vehicles, multiple master cylinders may be used. For example, one master cylinder may control the front brakes, and another master cylinder may control the rear brakes. Rear wheel brake caliper pistons usually have a smaller diameter than front wheel brake caliper pistons, since less force is required to be applied to the rear brake pads.

The vehicle may be any vehicle using hydraulic brakes, such as a car, truck, motorbike etc.

The term "brake line" should be understood to mean any brake hose or other passage/conduit between the master cylinder and the slave (brake) cylinder, as is known in the art.

The term "braking conditions" refers to situations when the brake system is activated, in order to press the brake pad against a brake rotor, for example, by depressing a brake pedal. As will be discussed with respect to FIGS. 1 and 2, there is a short time delay between the brake pedal being initially depressed and the brake pad being pressed against the brake rotor. As such, "braking conditions" should be understood to mean the time period when the brake pedal is depressed, which will include a short initial time period when the brake pad is not being pressed against the brake disc.

It should be understood that the present invention is equally applicable for vehicles in which the brake is applied by means other than a brake pedal, such as a brake lever on the handlebars of a motorbike. Any references to a "brake pedal" should thus be understood to refer to any brake input means of a vehicle, including any automatic braking (i.e. braking initiated by a vehicle's computer, such as 'brake assist' on a driver-operated vehicle, or even on a driverless vehicle).

The term "non-braking conditions" refers to situations when the brake pedal of the brake system is not depressed at all.

The term "acceleration conditions" refers to a portion of non-braking conditions, when the accelerator pedal of the brake system is depressed.

The term "selectively moving" refers to actively controlling the movement of the brake fluid into and/or out of fluid reservoir. For example, the control could be via user activation or via a controller configured to activate under certain conditions. This is different to a "passive" control of the movement of the fluid, for example using gravity and/or atmospheric air pressure only, and should not be considered to refer to any movement of the brake fluid into and/or out of the reservoir caused by the movement of the master cylinder piston prior to or after the engagement of a seal (or valve) between the master cylinder and the master cylinder fluid reservoir.

The term "selective fluid communication" refers to fluid communication being controllable, such that it can be allowed or prevented, depending on the conditions or system configuration.

In the present invention, there is a fluid reservoir in fluid communication with the brake line during non-braking conditions. The fluid reservoir may be in fluid communication with the means for selectively moving brake fluid. In embodiments wherein a diaphragm extends across the fluid reservoir and is moved by the means, as will be discussed below, it will be understood that means is in fluid communication with a portion of the fluid reservoir, but not in fluid communication with another portion of the fluid reservoir, i.e. the portion containing the brake fluid.

The fluid reservoir may be in selective fluid communication with the atmosphere such that, when the means is activated to add or remove brake fluid from the fluid reservoir, the reservoir is not in fluid communication with the atmosphere.

The master cylinder may comprise a main chamber having an outlet for communicating brake fluid to the brake line. The fluid reservoir may be in fluid communication with the outlet via the main chamber during non-braking conditions. Selectively moving brake fluid into and/or out of the fluid reservoir may cause brake fluid to move between the fluid reservoir and the main chamber, and between the main chamber and the brake line via the outlet. The term "between" should be understood to mean in either direction (i.e. between the fluid reservoir and the main chamber can mean from the fluid reservoir to the main chamber or vice versa). In such embodiments, the fluid reservoir may be the same reservoir as the main chamber fluid reservoir, which, in prior art systems, is open to atmosphere. A single reservoir can thus be used to provide the traditional benefit of ensuring the main chamber remains full of brake fluid, and also to provide the benefits of the present invention, as will be discussed below. In an alternative arrangement, the fluid reservoir may be in direct fluid communication with the brake line, (e.g. by being positioned between the main cylinder and the brake cylinder). In such an arrangement, a valve may be provided between the fluid reservoir and the brake line to prevent fluid communication therebetween during braking conditions.

The fluid reservoir may be isolated from the brake line for at least a portion (such as the majority) of the duration of braking conditions. The term "isolated" refers to not being in fluid communication with, i.e. the fluid reservoir is not in fluid communication with the outlet when isolated therefrom. In embodiments where the fluid reservoir is the same reservoir as the main chamber fluid reservoir, when the master cylinder is actuated to the extent to cause a valve/seal between the master chamber and the fluid reservoir to engage, the fluid reservoir is then isolated from the main chamber.

In embodiments where the fluid reservoir is not the same reservoir as the main chamber fluid reservoir, the fluid reservoir may be isolated from the brake line for at least a portion of the duration of braking conditions by other means, such as a valve. Isolating the fluid reservoir from the brake line creates a closed hydraulic system to ensure the force applied by the master piston is correctly propagated through the system to the brake pad during braking conditions.

As discussed above, in high performance race vehicles, "knock-back" is a commonly experienced problem caused when corners are taken at high speeds. This can cause elements of a brake system to bend, which, in turn, can cause the brake pad and piston to be retracted (or pushed back) further than desired. Thus, after braking, the brake pad is at a greater distance from the brake disc than usual. When the brakes are next applied, it takes longer for the application of the brake pads to occur. Previously, the solution to this was to "pump" or "tap" the brake pedal after leaving a high speed corner in order to return the piston and brake pad to their usual position, preferably without fully applying the brakes. Tapping (i.e. slightly depressing) the brake pedal may require more operations than pumping (i.e. fully depressing) the brake pedal.

Selectively moving (i.e. pushing) brake fluid out of the fluid reservoir causes brake fluid to move into the brake line e.g. via the master cylinder. Pressure is thus applied to both the master and the slave pistons. Due to the master piston having a smaller surface area in contact with the brake fluid than the slave piston, it requires less force to move the slave piston than the master piston. In addition, the master piston may be held in place by the brake pedal system. It would be necessary to provide a very large force to move the master piston. Thus, selectively moving brake fluid out of the fluid reservoir causes brake fluid to move in a direction away from the master cylinder and towards the slave cylinder, and the slave (or brake) piston to be extended towards the brake disc, returning it and the brake pad to their desired positions, i.e. to provide smaller clearance between the brake pad and the brake disc of the vehicle. The present invention thus addresses the problem of knock-back.

In embodiments, the system may be configured to move fluid out of the fluid reservoir, so that brake fluid is moved along the brake line away from the master cylinder (i.e. towards the slave (brake) cylinder) for a limited time period during non-braking conditions. It is only required to move fluid out of the fluid reservoir, and towards the slave piston, for a length of time sufficient to return the brake pad to its original position, i.e. to counter knock-back. The limited time period may be initiated by a signal received by the means. Such a signal may be generated automatically, such as by one or more sensors that detect when a knock-back event, such as a corner taken at high speed, has occurred. The sensor or sensors may comprise, for example, one or more accelerometers. Alternatively, the signal may be produced by user input, such as a switch or button, for instance located on the steering wheel. This allows a user (i.e. a driver), who considers that a knock-back event has occurred, to initiate the selective movement of the fluid to counter the problem when they consider it to be safe to do so. The limited period of time may be predetermined, or may be determined by the signal. For example, the sensors or the user may determine the extent of the knock-back effect and provide a signal indicative of the length of time necessary to return the pads to their desired location. Additionally or alternatively, the gas pressure in a compressor associated with the system, as discussed below, can be monitored when excessive drive current automatically turns off its power supply, indicating that all components affected by knock-back will have returned to their correct position and are unable to travel further.

As also discussed above, another problem experienced by brake systems is that, when brakes are released, i.e. at the start of non-braking conditions, the brake pad is not fully retracted from the brake disc. As such, the brake pad may remain in contact with the brake disc, causing braking to continue after the brakes have been released. The slave (brake) piston has relatively high inertia compared to the brake pad due to its greater weight. Further, in order for it to retract, in usual brake systems, some brake fluid must be pushed back through the hydraulic system to the main chamber.

Selectively moving (i.e. pulling or sucking) brake fluid into the fluid reservoir causes brake fluid to move out of the brake line towards the master cylinder. This movement of the brake fluid will act on both the master piston and the slave piston. For the same reasons as discussed above, a smaller force is required to move the slave piston than the master piston and, thus, brake fluid will travel in a direction towards the master cylinder (i.e. away from the slave cylinder) and the slave piston will move, i.e. retract the brake (slave) piston. This creates a gap between the pad and the brake piston. Thus, the only part still needing to be retracted is the brake pad. Since the brake piston and seals are the major cause of brake drag, the pads can more easily retract into the newly formed gap. The present invention thus addresses the problem of brake pads remaining in contact with the brake disc after braking by allowing the brake pad to retract more easily. The subsequent gap formed between the brake pad and the brake disc also reduces heat transfer from the brake disc to the brake pads, piston and brake fluid.

From another aspect of the present invention, at least one brake piston comprises a magnet that holds the opposed back surface of the brake pad to the brake piston. In this manner, retraction of the brake piston also acts to retract the ferrous back plate of the brake pad at the same time. This reduces the heat transferred from the brake disc to the brake pads, the brake pads to the piston and the piston to the brake fluid, thereby reducing the risk of boil-off of the brake fluid. It is to be understood that this aspect is equally applicable to the "caliper fingers" of a floating caliper, such as described in UK patent application GB-1512224.5. In such embodiments, the caliper fingers alternatively or in addition to the brake pistons may comprise one or more magnets that retain the opposed back surface of the outer brake pad. In certain embodiments, there may be a magnet for each brake piston and/or each finger of the brake. In alternative embodiments, if a reduced magnetic force is sufficient to hold the opposed back surface of the brake pad, there may be fewer magnets used.

The means for selectively moving brake fluid may be configured to move brake fluid into the fluid reservoir, so that brake fluid is moved along the brake line in the direction towards the master cylinder (i.e. away from the slave (brake) cylinder), upon commencement of non-braking conditions. Moving braking fluid into the fluid reservoir will aid in the retraction of the brake pad immediately upon commencement of non-braking conditions.

Thus, the brake control system of the present invention can address either or both of the problems of knock-back and brake pads remaining in contact with the brake disc i.e. drag and brake fluid boil-off, after braking.

The means for selectively moving brake fluid out of the fluid reservoir may be configured to move brake fluid out of the fluid reservoir, so that brake fluid is moved along the brake line towards a brake end of the brake line, for a limited time period at the start of braking conditions.

Alternatively, the means for selectively moving brake fluid out of the fluid reservoir may be configured to move brake fluid out of the fluid reservoir, so that brake fluid is moved along the brake line towards a brake end of the brake line, immediately preceding a predicted braking event, e.g. for a time period prior to when it is predicted that braking conditions will start, i.e. when it is predicted that non-braking conditions will end, such as at the end of acceleration conditions. The means may be activated to move brake fluid out of the fluid reservoir for a short period prior to the predicted start of braking conditions by a switch or a sensor. For example, the brake control system may include a proximity detector located proximate to the brake pedal, which detects foot movement towards the brake. Alternatively or additionally, the brake control system may include an accelerator switch, which detects when the foot is removed from the accelerator (i.e. the accelerator is released). The proximity detector and accelerator switch may predict that braking conditions will soon be activated, i.e. that the brake pedal is about to be depressed, and activate the means for selectively moving braking fluid to move brake fluid out of the fluid reservoir. The means may be deactivated, to cease moving brake fluid out of the fluid reservoir by the brake switch when the brake pedal is depressed, i.e. when braking commences. The means may then be reactivated to move brake fluid out of the fluid reservoir by the brake switch when the brake pedal is released to move brake fluid out of the fluid reservoir and then deactivated (i.e. cease moving brake fluid out of the fluid reservoir) by either the brake switch upon another depression of the brake pedal, or the accelerator switch upon depression of the accelerator. Depression of the accelerator may also activate the means to move fluid into the fluid reservoir to retract to the brake pads, as discussed above.

In an alternative embodiment, suitable for racing vehicles, the means for selectively moving brake fluid may be configured to be continuously activated to either move fluid into or out of the fluid reservoir. Racing drivers usually use left footed braking, i.e. using the left foot to brake and the right foot to accelerate (as opposed using the right foot for both braking and accelerating). In such an embodiment, the means may be configured to be activated to move fluid out off the fluid reservoir by a brake switch when the brake pedal is depressed, and continue to do so until it is activated to instead move fluid into the fluid reservoir by an accelerator switch when the accelerator pedal is depressed or by a brake switch when the brake pedal is released.

Additionally or alternatively, in vehicles, such as racing vehicles, having multiple master cylinders, such as a master cylinder for the front brakes and another master cylinder for the back brakes, the means for selectively moving brake fluid for each master cylinder may be configured to move different amounts of fluid, such as by applying a different pressure differentials to the fluids. For example, in vehicles wherein the rear wheel caliper pistons have a smaller diameter, less force is required to move the pistons and, thus, a lower pressure differential can be used.

Moving the brake fluid out of the reservoir at the start of braking conditions and/or prior to the predicted or anticipated start of braking conditions aids in decreasing the time taken for the brakes to be applied (i.e. the brake pads to be pressed against the brake rotor) after braking conditions begin, i.e. after the brake pedal is initially depressed. In embodiments where fluid is moved into the fluid reservoir during non-braking conditions, the brake pad may be moved back, or retracted, further than when the system of the present invention is not used. Thereafter, when the brakes are applied, the brake pad may need to travel further to come into contact with the brake disc. This delay may be noticeable to the driver (i.e. by creating increased brake pedal travel and/or by giving 'spongy' feeling brakes), and additionally may increase braking times and distances. Moving fluid out of the fluid reservoir immediately upon the brake pedal being depressed, i.e. at the start of braking conditions, or prior to the predicted or anticipated start of braking conditions will counter this effect. It is only necessary to do so for a limited period of time, i.e., until the brake pad has been (lightly) pressed against the brake disc. After the limited time period, the fluid reservoir may be isolated from the brake line for the remainder of the braking conditions.

The "limited time period" referred to in any of the above examples can be determined by a timer, which is configured to allow the means to selectively move brake fluid into and/or out of the fluid reservoir for a pre-determined length of time that is sufficient to place the brake pads in the correct position. Alternatively or additionally, the "limited time period" can be determined by a pressure sensor, which is configured to allow the means to selectively move brake fluid into and/or out of the fluid reservoir until a particular pressure threshold is reached, that is known to place the brake pads in the correct position.

Once the "limited time period" above has expired, the brake control system may be configured to power off, until a subsequent condition requiring brake pad movement is detected. This powering off of the system prevents unnecessary power drain from the vehicle during periods when the system is not required to operate, for example, during cruise conditions (e.g. during motorway driving) or when queued in traffic.

The force provided by the fluid moving through the system and to the brake pad is sufficient to move the brake pad towards and into slight contact with the brake disc. The force can be adjusted by a pressure control valve. However, it is not sufficient to press the brake pad against the brake disc to the extent that a significant braking force is generated. As such, in embodiments where the fluid is moved out of the fluid reservoir prior to the predicted start of braking conditions, if the brake control system has predicted incorrectly that braking conditions are about to start, and the fluid has thus moved out of the fluid reservoir, this will not cause a significant drag force between the brake pad and the brake disc, i.e. it will not cause any significant braking. The drag force will be adjusted to be similar to that which would be present if the brake pad had not been retracted from the brake disc at the end of the previous braking condition. In such embodiments, as previously discussed, the means may be deactivated by the brake switch upon depression of the brake pedal. At such a time, the early activation system may have fully returned the brake pad to the position it would have been in had retraction not occurred during non-braking conditions. The brake switch may reactivate the means to move fluid out of the fluid reservoir when the brake pedal is released. When a driver releases the brake pedal, they frequently subsequently reapply the brake pedal to continue braking. Reactivating the means to move fluid out of the fluid reservoir when the brake pedal is released ensures that the brake pad remains proximate to the brake disc, such that if braking is recommenced, there is no additional time lapse between the brake pedal being depressed and the brake pad being pressed firmly against the brake disc. Upon subsequent depression of the brake pedal, the brake switch may again deactivate the means. Depression of the accelerator will result in the accelerator switch deactivating the means from moving fluid out of the fluid reservoir. The means may instead be activated (by depressing the accelerator pedal) to the move fluid into the fluid reservoir, causing retraction of the brake pad, as previously discussed. Thus, the brake control system of the present invention may additionally or alternatively address the problem of a delay between depressing a brake pedal and braking commencing.

The means for selectively moving brake fluid may be configured to selectively or fully fluidly isolate the fluid reservoir from atmosphere. Using the means to actively move fluid out of the fluid reservoir under non-braking conditions avoids the need for the fluid reservoir to be open to atmosphere, as is the case in prior art master cylinder fluid reservoirs.

During braking conditions, however, the fluid reservoir is placed into fluid communication with atmosphere, and in some embodiments, also taken out of fluid communication with the means for selectively moving brake fluid, such that the means cannot interfere with the braking process. In addition or alternatively, during braking conditions, the means for selectively moving brake fluid may be powered off, and only powered back on when the next non-braking condition commences. These features provide an additional safety mechanism during braking.

The means for selectively moving brake fluid into and/or out of the fluid reservoir comprises means for supplying and/or removing gas to/from the fluid reservoir.

By using means for supplying and/or removing gas to selectively move brake fluid into and/or out of the fluid reservoir, the present invention provides a simple, pneumatic system that is easily "added on" to a fluid reservoir of a conventional brake system, without affecting the usual hydraulic brake fluid circuit. This overcomes the complexity of providing the means within an existing or additional hydraulic circuit of the brake system, and allows more precise, adjustable operation thereof (i.e. via pneumatic pressure control).

Nonetheless, alternative examples of suitable means include a piston movable within the fluid reservoir, a liquid supply/removal means for adding/removing liquid to/from the fluid reservoir, or a means for expanding/compressing a flexible chamber, such as a bellows, located within the fluid reservoir, for example by changing the pressure within the chamber.

The means may comprise a gas supply/removal device (for example, a pressurized air supply, such as a compressor or pump) in fluid communication with the fluid reservoir (for example, via a gas inlet).

A gas inlet in the reservoir may be located in a vertically upper portion of the reservoir such that the gas is always added and removed to a portion of the reservoir containing gas, i.e. to an air gap above the normal level of the brake fluid.

Supplying gas to the reservoir under non-braking conditions will initially create a gas volume (e.g. an air gap) in the reservoir or increase the pressure of any gas already present within the reservoir. This causes the gas to exert a force, over and above that of the existing air pressure/gravitational force present, on the brake fluid within the fluid reservoir. Such a force will then be transmitted through the largely incompressible brake fluid to the slave (brake) piston. Brake fluid moves out of the fluid reservoir (e.g. into the main chamber of the master cylinder and through the outlet), along the brake line, and causes the slave (brake) piston to extend towards the brake disc. The volume of the gas within the fluid reservoir will increase as the pressure of the gas equalizes with that of the fluid as the fluid moves through the system and pushes the slave (brake) piston. At the end of the cycle, the brake pads may push slightly on the brake disc, depending on the pre-set system pressure, causing small levels of drag therebetween. However, such an effect is much smaller than the one that could be caused by a driver over-pumping the brake pedal, along with the distraction and effort it will inevitably cause. Further, as low pressure gas is used for moving the caliper piston, seals and brake fluid, minimal seal distortion takes place allowing the brake pad and brake piston to move freely away from the brake disc, i.e. retract slightly, as seal resilience and low gas pressure allow the gas to be easily compressed, allowing brake fluid to move from the brake piston chamber along the brake line (e.g. through the outlet, into the main reservoir) and into the fluid reservoir.

Removing gas from the reservoir under non-braking conditions will initially cause the pressure of gas in the fluid reservoir to decrease. The pressure differential between the brake fluid within the fluid reservoir and the gas will cause brake fluid to move into the fluid reservoir (e.g. from the main chamber), and brake fluid to flow along the brake line (e.g. into the main chamber from the outlet), thus retracting the brake (slave) piston. By varying the length of time and speed of gas supply and/or removal, the retraction or return of the slave piston (i.e. the brake or caliper piston) is highly controllable. It is undesirable to over-pressurize the gas in the fluid reservoir. Too high a "positive" pressure in the fluid reservoir could, for example, cause too much brake fluid to be moved out of the fluid reservoir, moving the brake pad into contact with the brake disc, and causing drag during non-braking conditions. Too high a "negative pressure" (i.e. too low a pressure) could, for example, cause too much brake fluid to move into the fluid reservoir, thus retracting the brake piston too far during non-braking conditions, subsequently causing increased brake piston travel and braking time at the beginning of the next braking condition.

Although brake piston has only been referred to in the singular above, it is to be understood that this disclosure can apply to a brake system with any suitable number of brake pistons, for instance, a plurality of brake pistons (e.g. up to eight brake pistons).

The brake fluid may be selectively moved into or out of the fluid reservoir and the main chamber for a set time period. This set time period enables the brake pad to be fully returned to its desired location, i.e. retraction to fully occur, or the brake pad to be moved towards the brake disc prior to the brakes being fully applied. A timer may be used to activate the means for selectively moving brake fluid for the set time period.

The brake control system may comprise an auxiliary reservoir for holding a volume of pressurized gas, ready to be released to the fluid reservoir when desired, e.g. under non-braking conditions, such as when it is predicted that braking will commence or when a knock-back has occurred. This ensures rapid pressurization of the fluid reservoir, which in turn, reduces brake pedal travel. For this reason the auxiliary reservoir may be in selective fluid communication with the fluid reservoir.

The auxiliary reservoir may also be selectively "topped-up" with pressure following pressurization of the fluid reservoir, to ensure it has sufficient pressure to provide for a subsequent pressurization of the fluid reservoir. For this reason, the auxiliary reservoir may be in selective fluid communication with the gas supply/removal device, which may activate to supply gas to the auxiliary reservoir, when necessary. The supply of gas may be activated periodically using a timer control or when the pressure in the auxiliary reservoir drops below a certain threshold, indicated by a pressure sensor associated therewith.

The gas supply/removal device may be specifically provided for the purposes of the present invention, or may be an existing part of the vehicle, such as part of the engine. The gas supply/removal device may be a compressor. The compressor may have an inlet and an outlet, wherein the inlet of the compressor is in fluid communication with the reservoir. When the compressor is switched on, the compressor can be configured to either add or remove gas from the reservoir. Using a single compressor may provide weight and power savings and be less bulky. As mentioned above, the compressor may be specifically provided for the purpose of supplying/removing gas from the fluid reservoir or may be an existing part of the vehicle, for example part of the vehicle's suspension or be engine derived or driven.

The brake control system of the present invention may be fitted into the cap of the fluid reservoir of the master cylinder. Advantageously, the system is small and highly efficient, using a negligible amount of energy (approximately 0.1 W). The system can be supplied as part of a new vehicle, or retro-fitted to an existing vehicle.

In embodiments, there may be more than one master cylinder, each having a master cylinder piston and being associated with at least one brake system. The brake systems may share a gas supply/removal means such as a compressor, or may have separate gas supply/removal means, such as separate compressors. The brake system may additionally or alternatively share a brake control system, or may have separate brake control systems.

The outlet of the compressor may also or alternatively be in fluid communication with the reservoir. When the compressor is switched on, the compressor will add or remove gas to or from the reservoir.

The compressor may be a two-headed compressor. The advantage of using a two-headed compressor is that it can continuously supply both positive and negative pressurized air. Therefore, less time is taken to change between the two conditions as the compressor does not need to switch between modes. The compressor may also be connected to an auxiliary reservoir (as mentioned above), such that the auxiliary reservoir can provide a larger volume of pressurized gas instantaneously, for example in embodiments when pressurized air is provided to the fluid reservoir for a set time period when the brake pedal is depressed. The pressure reservoir is maintained at a constant pressure, by use of a pressure regulators, such as a pressure limiting valve, and a vacuum regulator. The vacuum regulator is used to control the "negative" pressure during retraction, and may be a vacuum regulating valve such as a restrictor valve. Such valves are simpler and cheaper than other types of valve, and constantly leak to atmosphere. This provides the advantage of allowing low or "negative" pressure in the fluid reservoir to vent to atmosphere, usually within one second, when the compressor is switched off and/or the compressor is not in fluid communication with the fluid reservoir. The pressure regulator may also be a restrictor valve or a ball and spring or other sprung loaded type valve. Since, when the positive pressure exceeds a desired threshold pressure, this can push such a ball and spring or other sprung loaded valve open, it is possible to use such a valve to ensure the positive pressure does not exceed the desired level by venting to atmosphere until the pressure has decreased to the desired threshold value, unlike when the fluid reservoir has a negative pressure (i.e. a pressure less than atmosphere pressure), when the ball and spring or other sprung loaded type valve would remain closed. Advantageously, (as discussed below) when system power is removed during brake operation, the multi port valve may be arranged to be in the second position, where the vacuum regulator leakage vents the reservoir to atmosphere. The two-headed compressor may provide the further advantage of not needing any electronic control of the system.

The brake control system may further comprise a multi-port valve having a first configuration and a second configuration, wherein when the valve is in the first configuration, the outlet of the compressor is in fluid communication with the reservoir and the inlet of the compressor is in fluid communication with atmosphere, and when the valve is in the second configuration, the outlet of the compressor is in fluid communication with atmosphere, and the inlet of the compressor is in fluid communication with the reservoir. Thus, when the compressor is on, in the first configuration, gas is added to the reservoir and, in the second configuration, gas is removed from the reservoir. The multi-port valve may be any suitable type of valve such as pneumatic, mechanical, electrical or hydraulic. This allows the brake control system to be set into different configurations and address the problems of brake drag i.e. pads remaining in contact with the brake disc after braking, knock-back, heat transfer, and returning the brake pads prior to braking, using the same system. When the compressor is not switched on, the multi-port valve may remain in the first configuration.

The multi-port valve may be configured such that, when it is de-energized, it is in the first configuration. Alternatively, the multi-port valve may be configured such that, when it is de-energized, it is in the second configuration.

When non-braking conditions are initiated, the multi-port valve may be switched to the second configuration, and the compressor turned on for a predetermined period of time before being turned off.

Alternatively, under non-braking conditions, the multi-port valve may be switched to the second configuration, and the compressor turned on. In such arrangements, the compressor will remain on until braking conditions are initiated. Such arrangements require far less, but constant, negative gas pressure to be applied to the fluid reservoir to obtain the same effect upon removal of the negative pressure. The arrangement may require a third or more of the pressure of the gas to be removed. As the gas is being constantly removed during non-braking conditions, there is a constant retraction force on the brake piston. This provides for low rolling resistance without the need for an air-bearing system to the braking surface of the brake pad. Additionally, upon braking, the removal of the retraction force (by turning off the compressor) causes the gap between the brake pad and the brake disc to automatically partially close due to the removal of the negative pressure to the fluid reservoir, which reduces the distance required to be travelled by the brake pad and thus the brake piston, allowing for a faster reaction time.

The brake control system may switch the valve to the first configuration, and turn the compressor on for a predetermined period of time before being turned off in order to counter knockback, in response to an activation. This activation may occur when a switch is pressed. The switch may be pressed by a user, i.e. a driver. The switch may be located on a steering wheel or in any other suitable location. This gives the driver control over when to activate the system to counter knock-back, such as after an event that may have caused knock-back to occur, e.g. after driving on a ramp at high speed, or alternatively prior to a braking event to counter any previous knock-back that has occurred. Alternatively, the activation of the brake control system may occur automatically, for example by using an accelerometer to detect an event that may have caused knock-back. In either arrangement, applying the brakes will shut off the power to the brake control system such that the system will not work under braking conditions. Even if the power were not to be shut off, under braking conditions, the inlet connecting fluid reservoir to the main chamber is sealed such that no fluid can move therebetween (i.e. the fluid reservoir is isolated from the main chamber), which further ensures that the system will not have any effect on the braking of the vehicle for safety reasons. In arrangements wherein a brake pad-cooling system is also provided, the cooling may remain on under braking conditions or non-braking conditions as required.

The brake control system may switch the valve to the first configuration, and turn the compressor on for a predetermined period of time in order to push the brake pad towards the brake disc at the start of braking conditions and/or a short time prior to the start of braking conditions, or a short time prior to when it is predicted or anticipated that braking conditions will start.

The reservoir may comprise a flexible diaphragm separating the brake fluid from the means for adding/removing gas. By "flexible" it is meant that the diaphragm is capable of changing shape in response to fluid pressure being exerted on it (i.e. a pressure differential across the diaphragm). In turn, the change of diaphragm shape displaces the brake fluid in the fluid reservoir. The diaphragm can be made from any suitable material. The material may be strong, durable, resilient and flexible, and ideally thin. In addition, the material may be resistant to corrosion from contact with brake fluid. Suitable materials may include latex, rubber and nitrile rubber. In certain embodiments, the diaphragm material may not be flexible itself, but rather shaped to allow it to be flexible (as defined above). For instance, the diaphragm may be made in the form of a bellows. If the diaphragm material itself is not resistant to corrosion from brake fluid, it may be coated with a material, or feature a brake fluid facing material layer that is (e.g. a rubber coating/layer). The presence of the diaphragm prevents contamination of the brake fluid by any foreign matter within the gas as it is added or removed from the fluid reservoir. Such contamination can, for example, be moisture, along with other contaminants. In certain embodiments, the diaphragm may feature an O-ring seal around its circumference, to help create a seal between the diaphragm and the fluid reservoir. In high performance race vehicles, brake fluid is often changed frequently, such as after every race. Thus, in such vehicles, such a diaphragm may not be necessary, as less contamination may enter the system between fluid changes. The levels of contamination may be controlled by such frequent fluid changes. When the diaphragm is present, the means is still in fluid communication with the fluid reservoir, as it is in direct fluid communication with the portion of the fluid reservoir to which the gas is supplied or removed.

The brake control system may further comprise one or more pressure control valves or pressure sensors in fluid communication with the fluid reservoir and/or the means for supplying and/or removing gas, e.g. when present, the compressor inlet and outlet. The one or more pressure control valves ensure that the pressure of the gas in the system does not exceed a pre-determined positive or negative pressure and bleeds-off excess positive or negative pressure to atmosphere when the pressure in the system exceeds a predetermined set pressure. This feature ensures that the system works at the optimum pressure to obtain the correct degree of retraction and or knock-back for the minimum energy consumption. It also allows higher working pressures to be used in the system, which speeds up system activation, whilst avoiding too higher pressure being delivered to the fluid reservoir prior to braking (i.e. pressure which would cause too much brake pad movement and potential drag). In addition, by calibrating the pressure control valve in fluid communication with the fluid reservoir to have a relatively low pressure threshold compared to the pressure in the system, it will experience a constant low-level pressure bleed. This prevents "stop-start" bleeds that would occur when the valve pressure threshold is set to around that of the system, which can lead to valve "hammering", and generate unwanted noise, wear and variable load demand on the means for supplying and/or removing gas (e.g. when present, the compressor). A pressure control valve in fluid communication with the means for supplying and/or removing gas (e.g. when present, the compressor outlet) may be set to the maximum operating pressure of the means for supplying and/or removing gas (e.g. when present, the compressor). This protects the means from exceeding its maximum operating pressure, but also allows as higher pressure as possible to be communicated into the system, to allow high responsiveness (as mentioned above).

The pressure control valve may allow gas to be supplied to the means at a pressure of, for example, 20 psi. The pressure control valve may allow gas to be removed from the means at a pressure of, for example, minus 10 psi.

The pressure control valves may be restrictor valves or ball and spring or other sprung loaded type valves. Alternatively, the pressure control valves may be electronically controlled pressure sensor valves.

In addition, the valves may be adjustable, such that their "cracking pressure" (as discussed below) can be adjusted, as desired. In this manner, the pressure control provided by each valve can be tailored to individual system requirements.

The brake control system may further comprise one or more timers for controlling the means for selectively moving brake fluid. For example, when non-braking conditions begin, the brake control system may switch the valve to the second configuration, and turn the compressor on for a predetermined period of time before being turned off. This acts to retract the brake pads.

The brake control system may be configured to power off in response to the one or more timers reaching a pre-determined time limit or the one or more pressure sensors sensing a pre-determined pressure threshold.

After vacuum retraction, the brake piston may be required to travel a greater distance in order for the brake pad to contact the brake disc, which thus increases the distance the brake pedal needs to be depressed, and the reaction time of the brake. To solve this problem, during braking conditions, the means may be configured to supply positive gas pressure to the fluid reservoir. The gas is supplied before or immediately upon depression of the brake pedal. When the brake pedal is depressed, as discussed above, the rod moves to seal the fluid reservoir off from the rest of the brake system. However, there is a small delay between the beginning of depression of the brake pedal and the fluid reservoir being sealed off. During this time, the pressurized gas supplied to the fluid reservoir will cause fluid to move from the fluid reservoir into the main chamber, and from the main chamber through the outlet to the brake piston. This aids in pushing the brake piston and thus the brake pad towards the brake disc before the fluid chamber is sealed off from the rest of the brake system and, thus, decreases the brake pedal travel and the time taken to effectively apply the brake. The addition of the pressure to the fluid reservoir provides for positive pressure on the brake fluid, causing the brake fluid to move through the system and begin to push the brake piston and, thus, the brake pad towards the brake disc. The pressure provided can be adjusted to accurately reflect the brake feel of a typical brake control system. Providing the pressurized gas also reduces brake reaction time and, thus, increases vehicle safety. The positive gas pressure provided to the fluid reservoir may continue to be supplied to the fluid reservoir until the end of braking conditions, i.e. until the brake pedal is released. However, after the set time period, the seal will isolate the fluid reservoir from the main chamber and thus no brake fluid will be moved between the fluid reservoir and the main chamber.

The system can be adjusted such that depression of the brake pedal does not immediately move the push rod and thus activate the brake. This can be done, for example, by screwing the rod further into the brake pedal linkage. Thus, when the brake pedal is initially depressed (i.e. pressed with enough force to brake the magnetic force created by magnet 208 of FIG. 6, as discussed below), braking conditions are initiated by the switch before the brake is activated by the push rod. Such a time lapse allows for the means to switch to move the brake fluid out of the fluid reservoir (as required under braking conditions) before the master piston begins to move, thus allowing optimum functionality of the system. In embodiments, the distance required to travel by the brake pedal to begin pushing the rod (i.e. the "free movement" of the brake pedal) may be 0.5-1 mm.

According to another aspect of the present invention there is provided a brake system for a vehicle, the brake system comprising the above described brake control system and a brake, the brake comprising a brake pad and a piston operatively connected to the brake pad, wherein the piston is operatively connected to the brake pad, wherein the piston is operatively connected to the brake line such that moving brake fluid along the brake line controls the position of the brake piston. In use, the brake pad is positioned adjacent a brake disc and pressed against the disc during braking. The actuation of the brake is generally controlled by a master cylinder piston.

"Operatively connected" refers to the piston and the brake pad, or the brake pad and the brake line, being directly or indirectly connected such that the movement and/or action of one affects the movement/action of the other. For example, movement of the piston will cause movement of the brake pad, and the movement of the fluid within the brake line will cause movement of the piston. The brake line may be in direct fluid communication with the piston.

In embodiments, the fluid reservoir may be in fluid communication with the slave (brake) piston via the outlet of the main chamber. The piston being in fluid communication with the outlet of the main chamber refers to the brake fluid in the outlet being in fluid communication with the interior of the (slave) cylinder in which the slave piston is housed, such that movement of the brake fluid through the outlet and into the cylinder causes movement of the piston, as the piston is at least partially located within said cylinder.

The brake system may further comprise a means for supplying air to a braking surface of the brake pad and/or a brake disc located adjacent the brake pad. This means may be suitable for cooling the braking surface of the brake pad and/or the brake disc.

The brake system may further comprise a brake pedal, wherein initial depression of the brake pedal initiates braking conditions, and full release of the brake pedal initiates non-braking conditions.

The brake pedal may include a switch.

When the brake pedal is fully released, the switch may cause the means for selectively moving the brake fluid to move brake fluid into the fluid reservoir.

Additionally or alternatively, when the brake pedal is depressed (to any extent), the switch may cause the means for selectively moving the brake fluid to move brake fluid out of the fluid reservoir so that the brake pad is moved towards the brake disc.

The brake system may further comprise a retaining means for holding the brake pedal in place when the brake pedal is not depressed. This ensures that the switch is not accidentally activated when the brake pedal is nudged or otherwise touched, as the retaining means requires a small force to overcome it holding the brake pedal in place. Suitable retaining means include a magnet.

Additionally or alternatively, the brake system may include an early activation means configured to predict when depression of the brake pedal is likely to commence and, when such a prediction is made, cause the means for selectively moving brake fluid to move brake fluid out of the fluid reservoir.

The early activation means may comprise a means for detecting foot movement towards the brake pedal, for example a proximity or motion sensor, as discussed above. The proximity detector may be any detector capable of triggering at different distances both ferrous and non-ferrous objects, and may include capacitive, inductive, optical, light emitting, ultrasonic and/or laser sensors. The proximity detector may be located and arranged such that it detects movement towards and/or over the brake pedal or away from the accelerator. The detector may be located in any suitable location, such as above the brake pedal, where it will typically be obscured from the view of the driver, and protected from damage, by a plastic valence, embedded into the top surface of the brake pedal, or recessed into vehicle side panels.

Additionally or alternatively, the early activation means may comprise a means for detecting release of the accelerator, for example an accelerator switch, which may be a mechanical or proximity switch. The accelerator switch may be activated when the accelerator is released. The accelerator switch may be arranged such that the accelerator must be fully released before the switch is activated. This is such that, when a driver is resting his/her foot on the accelerator, and the accelerator is only slightly depressed, the means for selectively moving the brake fluid is not activated to move brake fluid out of the fluid reservoir.

The early activation means predicts when braking conditions are likely to be activated, and causes the means for selectively moving the brake fluid to move brake fluid out of the fluid reservoir prior to when braking conditions are predicted or anticipated to start. In such embodiments, the brake pedal may also include the brake switch so that, when the brake pedal is fully released, the brake switch reactivates the means to move brake fluid out of the fluid reservoir, anticipating the reapplication of the brakes. If the brake pedal is reapplied, then the brake switch again deactivates the means from moving the brake fluid out of the fluid reservoir. This can occur on any number of occasions before the accelerator pedal is depressed. Upon depression of the accelerator pedal, an or the accelerator switch may deactivate the means from moving brake fluid out of the fluid reservoir, and may activate the means to move fluid into the fluid reservoir, i.e. to retract the brake pad. The brake pads would then always be retracted when the accelerator is depressed.

Both the foot movement detector and the accelerator switch are configured to predict that the brake pedal is about to be depressed, i.e. that braking conditions will commence shortly, and activate the means for selectively moving the fluid to supply fluid out of the fluid reservoir, thus pushing the brake pad towards the brake disc, and thus eliminating any gap therebetween. If the prediction is incorrect, i.e. braking conditions are not activated, the force between the brake pad and the brake disc is not sufficient create a significant braking force. Indeed, the frictional force applied to the brake disc to the brake pad in such situations (i.e. in situations where the master cylinder is not subsequently actuated) is similar to that which would be caused by the brake pad having not fully retracted after braking, as would occur if the brake control system of the present invention were not present. If the prediction is correct, and the brake pedal is subsequently depressed (i.e. during braking conditions), then the brake pad would not need to travel any distance before it is firmly pressed against the brake disc. This thus eliminates the time delay between a user depressing a brake pedal and braking occurring caused by any such travel, and reduces undesirable excess brake pedal travel.

In vehicles having "cruise control", both an accelerator switch and a means for detecting foot movement may be used. When the cruise control is being utilized, the accelerator switch will be automatically disabled. The early activation of the means for selectively moving brake fluid will thus be performed by the foot movement detector alone.

The brake control system may include a fine control "negative" pressure valve comprising a tapered pin that can adjusted by being screwed into a hole (through which gas passes), which reduces the cross-sectional area of the hole, causing a pressure drop across the valve input/output. This can control gas flow, such as in the present system where gas flows to atmosphere, and gas losses are not an issue.

The brake control system may also include a "positive" pressure control valve comprising a sprung loaded ball or other spring type valve that covers a hole (one side of which is the gas supply), which releases the gas to atmosphere when the forces on either side of the valve equalize (i.e. when the cracking pressure is reached). This is the preferred control valve for controlling the positive pressure because the response time of the valve is important, as is the micro-compressor for weight, cost and size. The valve only releases gas to atmosphere (as wastage) after it has reached the desired/set pressure (i.e. a cracking pressure). The term "cracking pressure" is known in the art to refer to the pressure at which a component such as a check valve, or other regulating valve, opens, and if the pressure drops below the cracking pressure, the component closes again.

Alternatively, the brake control system may use pressure control switches instead of pressure control valves. Such switches may be cheaper than the equivalent pressure valves, and may provide more accurate tolerances. They may also reduce the complexity and/or weight of the system, and can provide feedback to a controller, such as an electronic control unit (ECU), for active control of the brake control system.

The brake control system may also include one or more control valves to permit selective fluid communication between components of the brake control system and provide switching between different system conditions.

The one or more control valves can be any suitable control valve. For instance, a multi-port valve, a solenoid valve, a latching valve, a pneumatic valve, a pneumatically piloted valve or a mechanically operated valve.

In some embodiments employing at least one latching valve as a control valve, the latching valve position may be controlled using a double pole, double throw (DPDT) relay in conjunction with an adjustable timer circuit. The use of a latching valve may reduce power consumption of the brake control system.

According to another aspect of the present invention, there is provided a method of controlling a vehicle brake system having a master cylinder, a brake line for communicating brake fluid between the master cylinder and a brake, and a fluid reservoir in fluid communication with the brake line during non-braking conditions, the method comprising selectively moving brake fluid into and/or out of the fluid reservoir along the brake line during non-braking conditions.

Selectively moving fluid into the fluid reservoir may cause movement of the brake fluid in the brake line in a direction towards the master cylinder (i.e. away from the slave cylinder). Such movement may occur along the entire length of the brake line or along a portion of the brake line, such as a portion of the brake line between the slave cylinder and the fluid reservoir, allowing the brake pad to retract from the brake disc.

Selectively moving the fluid out of the fluid reservoir may cause movement of the brake fluid in the brake line in a direction away from the master cylinder (i.e. towards from the slave cylinder). Such movement may occur along the entire length of the brake line or along a portion of the brake line, such as a portion of the brake line between the slave cylinder and the fluid reservoir. This moves the brake pad towards the brake disc.

As such the position of the brake pad, relative to the brake disc, can be controlled during non-braking conditions.

The brake fluid may be selectively moved into and/or out of the fluid reservoir by supplying or removing gas to or from the fluid reservoir. The gas may be supplied and/or removed by a compressor.

In embodiments, the fluid reservoir may be in fluid communication with the brake line via the outlet of the main chamber of the master cylinder. Removing gas from the fluid reservoir causes movement of brake fluid from the main chamber to the fluid reservoir and from the brake to the main chamber via the outlet, and supplying gas to the fluid reservoir causes movement of brake fluid from the fluid reservoir to the main chamber and from the main chamber to the brake via the outlet.

Brake fluid may be moved into the fluid reservoir at the commencement of non-braking conditions.

Brake fluid may be moved out of the fluid reservoir upon commencement of braking conditions.

Brake fluid may be moved out of the fluid reservoir immediately prior to braking conditions, when braking has been predicted to commence, as discussed above (in relation to the early activation means).

The brake fluid may be moved out of the reservoir during non-braking conditions in response to a detected condition of the vehicle or a driver input. The detected condition may indicate a potential "knock-back" of the brake pad. The brake control system may comprise a sensor for detecting potential knock-back conditions, such as an accelerometer.

According to an aspect of the present invention, there is provided a brake control system for a vehicle, the brake control system comprising an activation means having a proximity detector configured to detect the presence of an object in a region proximate a brake pedal and/or an accelerator pedal of a vehicle wherein, upon detection of an object, in said region, by the proximity detector, the activation means is configured to activate the brake control system.

The activation means can activate a brake control system prior to braking conditions being initiated or activated, as when the proximity detector detects the object, it predicts that braking conditions may be about to commence. The object may be a user's foot, in a standard vehicle, or a hand, such as in a vehicle that is hand operated only. Activating the brake control system may refer, for example, to moving fluid into or out of a fluid reservoir to control the position of the brake pads.

The brake control system may comprise the brake control system as described above in any aspect or embodiment thereof.

The brake control system may comprise a brake switch associated with the brake pedal, wherein the brake control system is activated when the brake pedal is released.

The brake switch may be configured to deactivate the brake control system when the brake pedal is depressed, subsequent to having been activated by the proximity detector. The proximity detector may be configured to detect movement of an object such as a driver's foot towards the brake pedal and away from the accelerator pedal.

The brake control system may be a brake control system as detailed in any previously discussed aspect or embodiment of the invention, and further comprise an accelerator switch. When the accelerator pedal is released, the accelerator switch may activate brake fluid movement out of the fluid reservoir. When the accelerator pedal is depressed, i.e. in use, the accelerator switch may cause brake fluid flow to the reservoir. In embodiments where there is a proximity detector, the detector may not be used to cause brake fluid flow to the reservoir. The proximity detector may act as a fail-safe to cause brake fluid to be moved out of the fluid reservoir upon detection of foot movement when any cruise control system is not enabled. As discussed previously, when the cruise control is enabled, the accelerator switch is disabled and the early detection proximity switch will be the sole cause of initiating brake fluid movement away from the reservoir in anticipation of braking.

Within the scope of this disclosure, any suitable brake or accelerator switch may be used, as would be understood by the skilled person. One suitable type of switch is a reed switch.

These aspects of the present invention may comprise the use or provision of any one or more of, or all of, the preferred or optional features discussed above in relation to previous aspects.

In addition, it is to be understood that within the scope of this disclosure, the systems described may include further modifications, such as including air filtration means and sound muffling/insulation means.

It is also to be understood that within the scope of this disclosure, any of the systems described may include a fail-safe that turns off the system, if the power supply configured to activate and run the system is determined to be depleted or running at a predetermined voltage, lower than a normal working voltage. In the case of electric cars, this may ensure that the system is turned off before battery power failure. In the case of non-electric cars, this may ensure the system is deactivated before the car battery is depleted. The driver may be alerted that the system was powered off in such a circumstance, e.g. via a dashboard display, such as a LED. The system may turn back on, once the battery has been recharged to the predetermined voltage.

According to another aspect of the present invention, there is provided a brake pad assembly comprising a brake pad having a braking surface, an opposed back surface and an aperture extending between the braking surface and the back surface, and an air supply tube for supplying air to the aperture, the air supply tube being in fluid communication with the aperture via a hollow spigot.

The air supply tube may be configured to receive pressurized air from an air supply means.

The brake pad assembly may be used with the brake system, brake control system or method described above in any aspect or embodiment thereof.

The air supply tube may be rotatably mounted to the brake pad via the hollow spigot.

The spigot may prevent movement in the direction perpendicular to the brake surface such that once the tube is attached to the brake surface via the spigot, the tube can easily be rotated, but not so easily removed from the spigot.

The hollow spigot may extend from the back surface.

In one embodiment, the hollow spigot may be integrally formed with the back surface.

In one embodiment, the hollow spigot may extend within the aperture, at least partially through the brake pad.

In an alternative embodiment, the hollow spigot may be secured to the air supply tube. For example, the hollow spigot may be integrally formed with the air supply tube.

In another alternative embodiment, the hollow spigot may be provided separately from the air supply tube and the brake pad, i.e. be removable therefrom.

The air supply tube may have a flattened cross-section for at least a portion of its length.

The flattened cross-section may extend for the portion of the tube that is in contact with and/or overlies the back surface. The flattened cross-section may have a minimum dimension of less than 5 mm, less than 3 mm, less than 2 mm or between 1 mm and 2 mm. The flattened portion of the tube allows for provision of the same cross-sectional area of pipe whilst having a smaller dimension in the direction perpendicular to the brake surface. This is desirable as the space between the back surface of a brake pad and an adjacent caliper housing can be as little as 3 mm or less. Any extra clearance required adds to piston protrusion from the caliper frame, which affects brake rigidity, vibration, the weight of the system, and dynamic wheel stability.

The pipe may be a non-magnetic, metallic, thin walled tube, such as a stainless steel tube. The pipe may be easily formable, i.e. pliable or soft enough to be flattened, but strong enough to hold its flattened shape when installed in a brake. a pipe having a circular cross section can be flattened to form a pipe having a substantially rectangular, ovaloid or racetrack shaped cross section. Both sides of the pipe may be flattened.

The air supply tube may further comprise a non-flattened cross-section at one end thereof for connection to an air supply pipe. The non-flattened cross-section may be substantially circular.

The braking surface may comprise an elongated slot surrounded by braking material and in fluid communication with the aperture.

The air supply tube may supply air to the braking surface to cool the brake pad and/or a brake rotor (e.g. a brake disc) against which the braking surface is pressed during braking. The air supply tube may also or alternatively supply air to the braking surface to provide and/or maintain a gap between the braking surface and a brake rotor during non-braking.

The air supply tube may comprise a hole in a wall thereof, the hole being in fluid communication with the spigot. The pipe may comprise only one hole. In one embodiment, the hole may be in the flattened cross-section portion. In one embodiment, the hole may receive the hollow spigot. In one embodiment, the hole may be in the surface of the air supply tube wall that contacts the brake surface. There may be no hole on the side of the pipe opposing the side facing the back surface of the back plate. The hole is in fluid communication with the hollow interior of the air supply tube, and when installed with the aperture of the brake pad.

The brake pad assembly may further comprise a magnet for securing the air supply tube to the back surface. The combination of the magnet and the spigot provides a secure attachment of the air supply tube to the back surface even in a very tight clearance between the brake pad and a caliper. The magnet should be of sufficient strength such that it will not move when subject to forces that may be applied thereto in use. The advantage of using a magnet is that the location of the air supply tube on the brake surface can be easily altered. For example, the magnet can be "slid" on the brake surface (by rotating the air supply tube around the spigot) to a desired location during the attachment or when desired at a later time. The magnet may be a high power permanent magnet, such as a rare earth magnet made by powder technology. Such magnets can be formed to have any suitable shape. The magnet can be shaped to precisely fit the end of the air supply tube, to avoid interference with pistons, and to gain maximum attachment strength.

The magnet may be secured to the air supply tube.

The magnet may be positioned at least partially within the air supply tube. In one embodiment, the magnet may close one end of the air supply tube. In one embodiment, the magnet may protrude from one end of the air supply tube. The tube may be crimped around the magnet. Alternatively, the magnet may be held wholly within the air supply tube. In one embodiment, the magnet may be elongated and/or flat to fit with the air supply tube, which may be flattened. For example, the magnet may be rectangular. The magnet may be within the flattened portion of the tube.

According to another aspect of the present invention, there is provided a brake pad assembly comprising a brake pad having a braking surface, an opposed back surface and an aperture extending between the braking surface and the back surface, an air supply tube for supplying air to the aperture, and a magnet securing the air supply tube to the back surface.

The brake pad assembly may be used with the brake system, brake control system or method described above in any aspect or embodiment thereof.

The brake pad may have any of the features of the brake pad of the previously described aspect or any embodiment thereof.

The magnet may be positioned at least partially within the air supply tube.

The air supply tube may be in fluid communication with the aperture via a hollow spigot.

The air supply tube may be rotatably mounted to the brake pad via the hollow spigot.

The hollow spigot may extend from the back surface.

The air supply tube may comprise a hole in a wall thereof, the hole being in fluid communication with the spigot.

The air supply tube may have a flattened cross-section for at least a portion of its length.

The air supply tube may further comprise a non-flattened cross-section at one end thereof for receiving an air supply pipe.

The braking surface may comprise an elongated slot surrounded by braking material and in fluid communication with the aperture.

The air supply tube may supply air to the braking surface to cool the brake pad and/or a brake rotor (e.g. a brake disk) against which the braking surface is pressed during braking. The air supply tube may also or alternatively supply air to the braking surface to provide and/or maintain a gap between the braking surface and a brake rotor during non-braking.

In any of the above systems/assemblies, the brake pad may have a braking surface and an opposed back surface, and a brake piston may comprise a magnet to hold the back surface of the brake pad to the piston. The magnet holds the piston and brake pad in contact such that movement of the piston away from the brake rotor/disk (due to brake fluid moving towards master cylinder), causes the brake pad to move in the same direction with the piston, i.e. a gap is not created between the piston and the back surface.

These aspects of the present invention may comprise the use or provision of any one or more of, or all of, the preferred or optional features discussed above in relation to previous aspects.

BRIEF DESCRIPTION OF THE DRAWINGS

Preferred embodiments of the present invention will now be described, by way of example only, with reference to the accompanying figures in which:

FIG. 4B shows a schematic wiring diagram for use with the system of FIG. 4A;

FIG. 5A shows a schematic of an alternative embodiment of a system in accordance with the present invention;

FIG. 22 shows a schematic of an alternative embodiment of a brake system including mechanically activated valves.

DETAILED DESCRIPTION

Figure 1A:
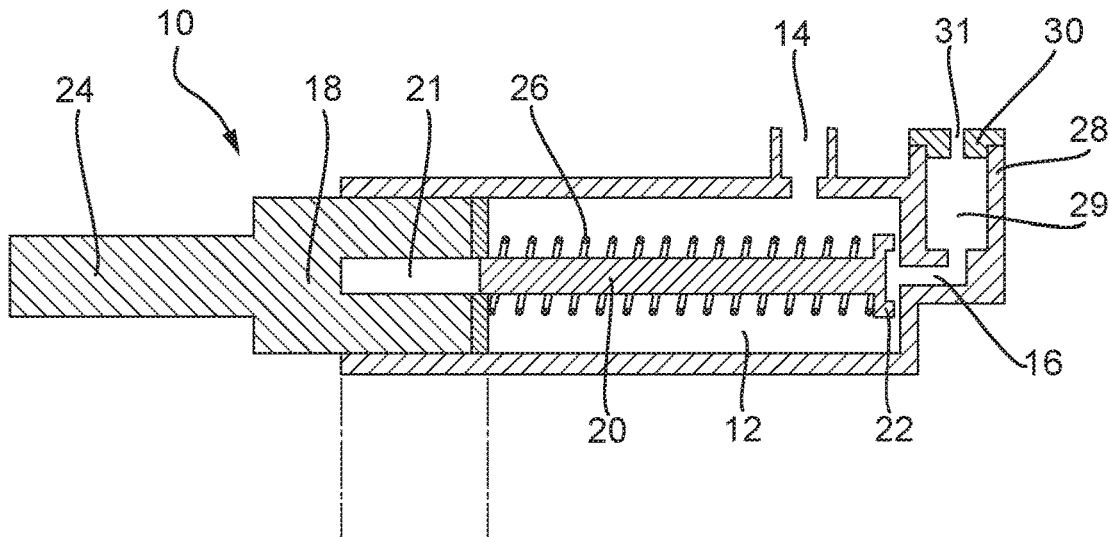
FIGS. 1A, 1B and 1C show an example of a basic prior art master cylinder for controlling a brake.
Figure 1B:
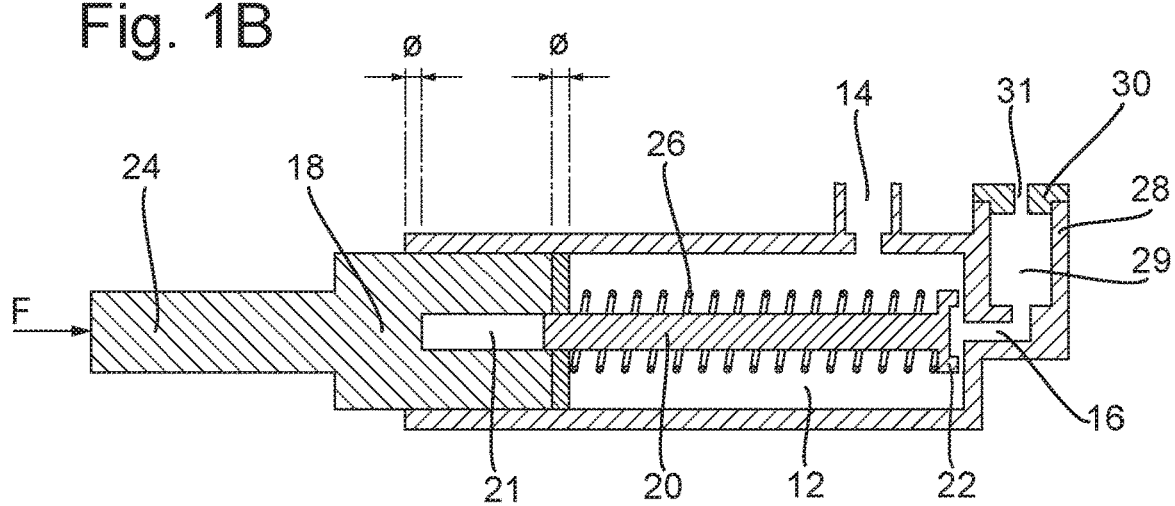
Figure 1C:
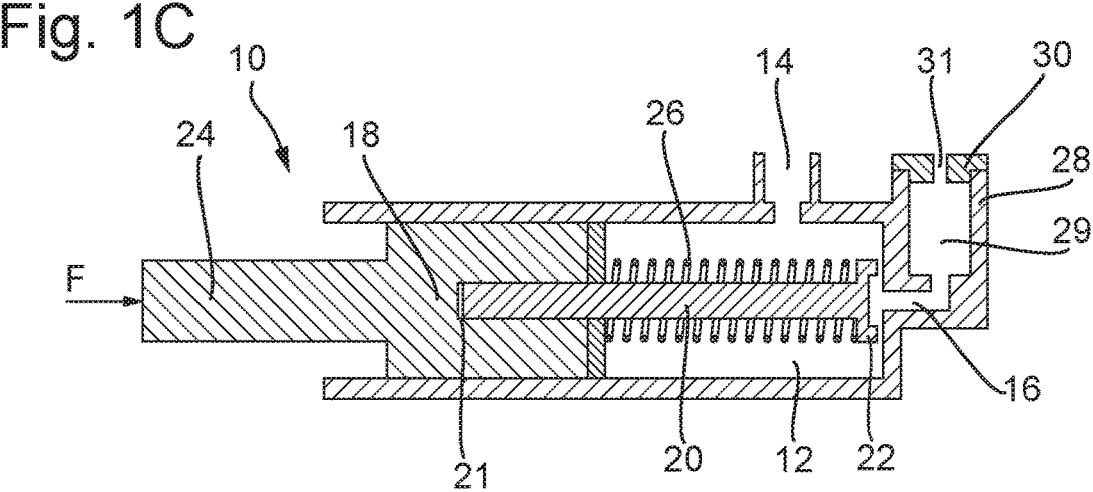

FIGS. 1A, 1B and 1C show an example of a typical prior art master cylinder 10 for controlling a brake. The master cylinder 10 has been shown in a very basic form, and many refinements (known in the prior art) have been omitted for the sake of clarity. It is thus to be understood that any suitable master cylinder (e.g. featuring any of these further refinements) may be used, without departing from the scope of this disclosure.

The master cylinder 10 includes a chamber 12 having an outlet 14 and an inlet 16. A master piston 18 extends into the chamber 12. A rod 20 extends through the chamber 12 from master piston 18, ending in a seal 22. In FIG. 1A, the master piston 18 is not actuated, and the seal 22 is open. When the master piston 18 is actuated, as in FIG. 1B, by a force F being applied to operating rod 24 the rod 24 and the master piston 18 move by distance D, and the seal 22 closes the inlet 16. As the force F is continually applied once the seal 22 is closed, the master piston 18 continues to travel, whilst the rod 20 cannot move any further, and instead retracts into cavity 21 in the master piston 18. The rod 20 is attached to the master piston 18 in a known manner (not shown) such that, when force F is first applied, the rod 20 moves with the master piston 18 as described above, and only retracts into the cavity 21 when the seal 22 is closed. The operating road can be controlled by, for example, a brake pedal. The master cylinder 10 also includes a spring 26 to return the master piston 18 to its non-actuated configuration after braking.

In FIG. 1A, the chamber 12 of the master cylinder 10 is in fluid communication with the outlet 14 and the inlet 16. The outlet 14 is in fluid communication with a brake. The inlet 16 is in fluid communication with a reservoir 28. The reservoir 28 comprises a reservoir chamber 29 and a reservoir cap 30. The system is filled with a brake fluid. The reservoir 28 ensures that the system remains filled with brake fluid and prevents any ingress of air, particularly under non-braking conditions. There is a hole 31 in the reservoir cap 30 such that the reservoir 28 is in fluid communication with atmosphere in order to allow the level of the brake fluid (not shown) to vary as necessary. The fluid reservoir 28 is typically formed from a material such as aluminum. The reservoir cap 30 may be formed from the same material, but typically is formed from plastic.

As shown in FIG. 1B, when the master piston 18 is initially actuated, the rod 20 moves to push the seal 22 to close the inlet 16 to create a sealed hydraulic system. There is a short travel distance and thus time delay between the master piston 18 being activated and the seal 22 closing the inlet 16 as the rod (and the seal 22) have to travel a distance in order for the seal 22 to close the inlet 16.

As shown in FIG. 1C, when the master piston 18 continues to be actuated (i.e. moved), the rod 20 retracts into cavity 21 in the master cylinder 18. As the system is a sealed hydraulic system, continuing to actuate the master piston 18 causes the largely incompressible brake fluid (not shown) to be pushed through the outlet 14, and actuate a slave piston in a slave cylinder in the brake caliper (not shown).

It is also known for the master cylinder to have more than one outlet, for example two outlets, each in fluid communication with a brake (not shown). The chamber 12 may be divided into two chambers, one in fluid communication with each outlet. The operating rod 24 may extend through both chambers, and comprise multiple seals to allow the sealing of inlets to each chamber. In such systems, there may be two reservoirs, one connected to each inlet, or there may be a single fluid reservoir in fluid communication with both inlets.

It is also known for two master cylinders to operate in tandem. The master cylinders may be located in a side-by-side relationship, with the operating rods 24 being operatively connected such that actuation of the system actuates both master cylinders. In a brake system, one master cylinder may control the back brakes of a vehicle, whilst the other master cylinder controls the front brakes. The operating rods 24 may be connected with a "see-saw" arrangement having a pivot point through which the operating force is applied. The pivot point can be moved so as to bias the force to act more strongly on one or other of the master cylinders.

Figure 2A:
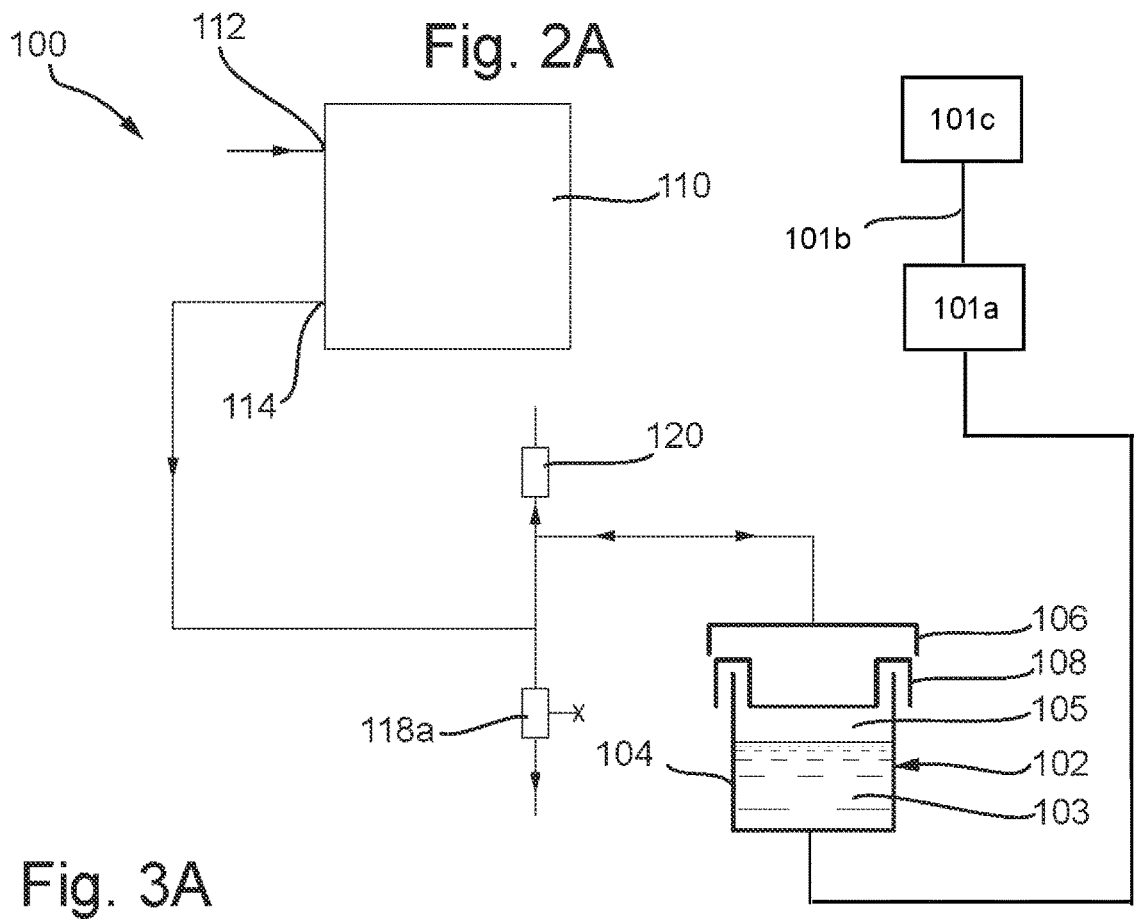
FIG. 2A shows a schematic of a system in accordance with an embodiment of the present invention.

FIG. 2A shows a schematic of a brake control system 100 in accordance with an embodiment of the present invention. System 100 provides a fluid reservoir in the form of a brake master cylinder reservoir 102 that is connected to a master cylinder 101a, brake line 101b and brake 101c. Brake master cylinder reservoir 102 includes chamber 104, a cap 106, and a diaphragm 108. Unlike in typical brake systems, the cap 106 is not formed from plastic. The cap 106 is replaced with a cap which can be tightened sufficiently and has sufficient strength to withstand the positive and negative pressures of the present system. Such caps may be formed from aluminum, steel or other suitable metals. The chamber 104 contains brake fluid 103 and an air gap 105. The system 100 also includes a gas removal device and/or gas supply device in the form of a compressor 110 having an inlet 112 and an outlet 114. The compressor 110 can be single or multi headed, and mechanically or electrically driven. When the compressor 110 is switched on, the compressor 110 draws gas into the inlet 112 and pumps pressurized gas out of the outlet 114. The outlet 114 is in fluid communication with the reservoir 102 and the inlet 112 is in fluid communication with atmosphere such that when the compressor 110 is on, gas is added to the reservoir 102.

The system also comprises an adjustable or fixed restrictor or needle valve 118a in fluid communication with the outlet 114 for pressure adjustment. The valve 118a can have different characteristics at different flow rates and, thus, can be used in combination with a both timed and adjustable compressor flow to suit system needs.

The system further comprises a solenoid or other dump valve 120. The dump valve 120 is normally open (N/O) such that, when the compressor is off, the dump valve 120 is also off (i.e. open), meaning the reservoir is in fluid communication with the atmosphere via the valve and acts in the same manner as a typical reservoir. When the compressor is on, the valve is also closed. The valve is also present as a safety feature to ensure vehicle and driver safety. Should either the system fail for any reason, then the dump valve would automatically open, ensuring that the reservoir is returned to atmospheric air pressure after brake use. The dump valve may therefore be present or omitted, or act independently, as required.

The system can be activated by a user, for example by a switch controlled by the user. Such a switch may be located, for example, on the steering wheel of a vehicle. This allows the user to utilize the system when they determine that an event that may have caused knockback may have occurred, and/or avoid using the system when the brakes are to be applied. Although the system will not affect the braking of the vehicle as, during braking, the fluid reservoir is sealed off from the master cylinder, it will not provide the desired outcome during braking conditions. Alternatively, the system may be activated automatically upon detection of an event that may have caused knockback. For example, sensors may be used to detect when the vehicle has hit a ramp at high speed.

Figure 2B:
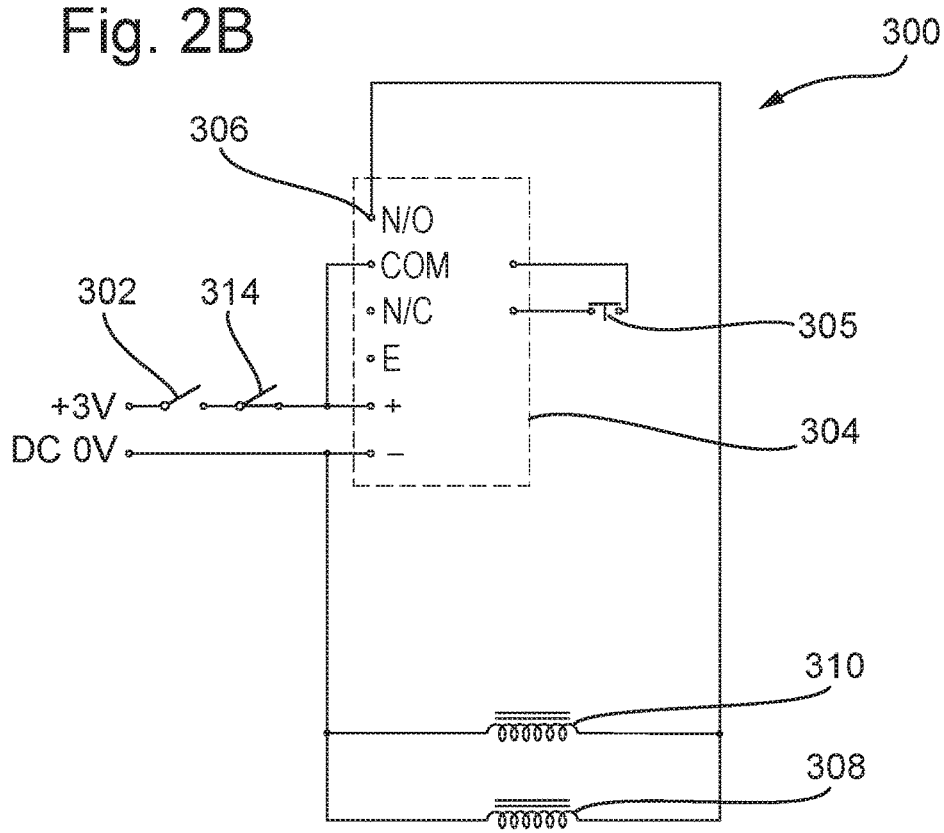
FIG. 2B shows a schematic wiring diagram for use with the system of FIG. 2A.

FIG. 2B shows a schematic wiring diagram 300 for use with the system of FIG. 2A.

Upon release of the brake pedal, normally open switch (N/O) 314 is closed, and power is provided to the timer board 304. When the input contacts 305 are momentarily closed, this activates the knock-back system. This closes normally open (N/O) relay contacts 306, which supplies power to the N/O dump valve 308 and compressor 310. The dump valve 308 closes, and the compressor 310 supplies air to the fluid reservoir (not shown). After a predetermined set time, the timer board 304 opens the normally open relay contacts 306, which turns off the compressor 310 and allows the dump valve 308 to open. The fluid reservoir is thus in fluid communication with the atmosphere via the dump valve 308, which allows the fluid reservoir to vent to atmosphere and be used in its normal way (i.e. in the same manner as in a system not fitted with the brake control system).

Figure 3A:
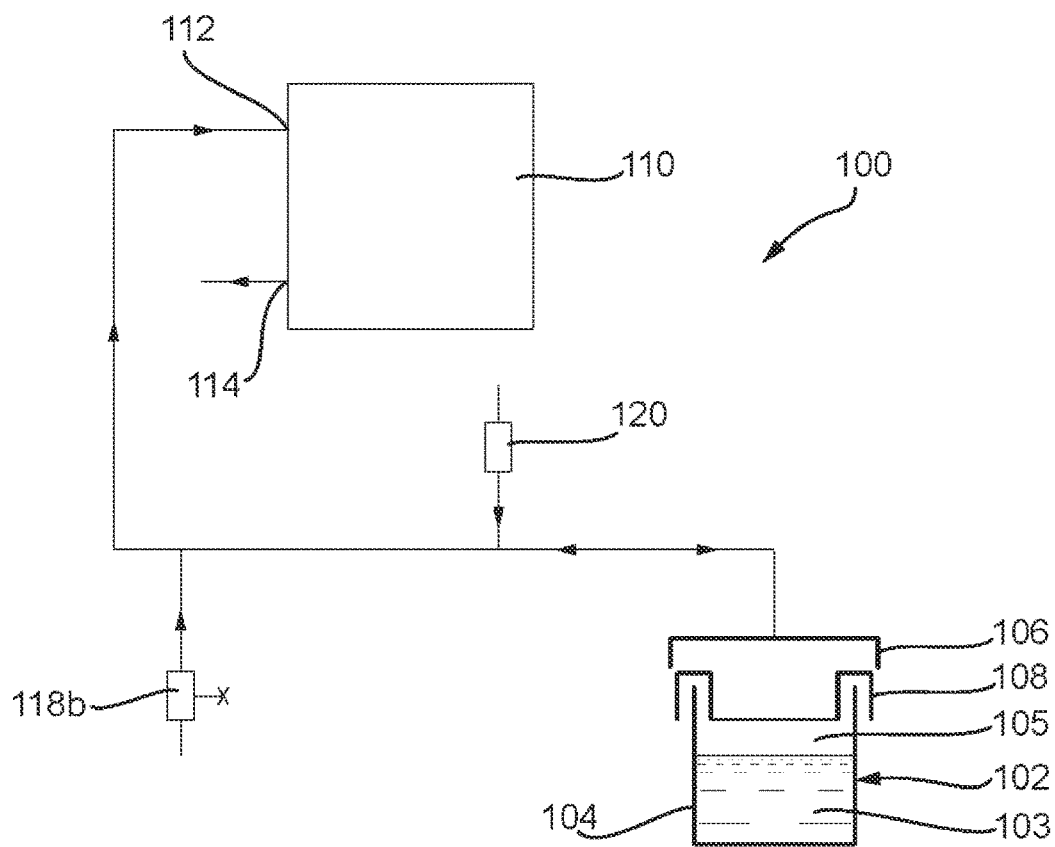
FIG. 3A shows a schematic of a system in accordance with another embodiment of the present invention.

FIG. 3A shows a schematic of a system in accordance with another embodiment of the present invention. FIG. 3A includes the same components as FIG. 2A, but the inlet 112 is in fluid communication with the reservoir 102 and the outlet 114 is in fluid communication with atmosphere such that when the compressor 110 is on, gas is removed from the reservoir 102. It uses valve 118b, which is suitable for vacuum adjustment, instead of the valve 118a for pressure adjustment used in FIG. 2A. Valve 118b can also be used in combination with a timed compressor output in order to provide adjustability. The system is activated automatically after braking has occurred.

Figure 3B:
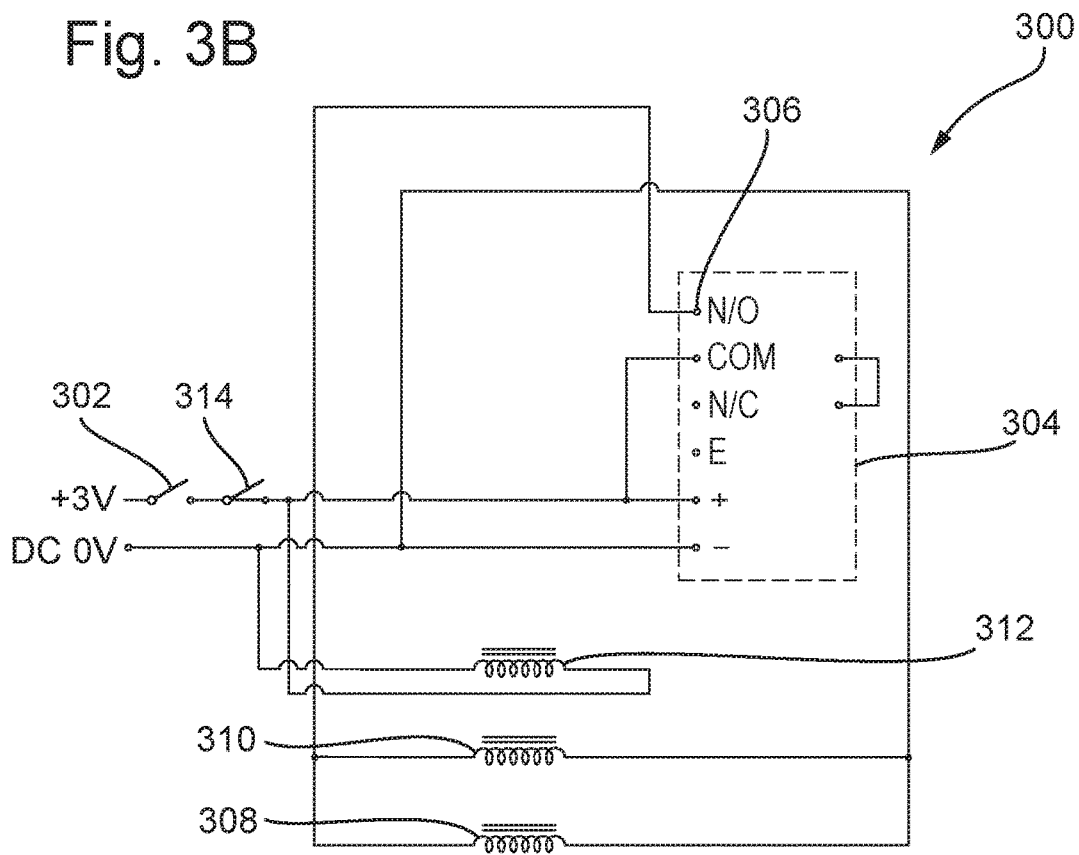
FIG. 3B shows a schematic wiring diagram for use with the system of FIG. 3A.

FIG. 3B shows a schematic wiring diagram 300 for use with the system of FIG. 3A.

Upon release of the brake pedal, power is provided to the timer board 304 via the brake switch 314. Unlike the system of FIG. 2B, the timer board 304 does not include input contacts 305, there instead being a permanent wired connection. Therefore, when power is provided to the timer board 304, this energizes normally open relay (N/O) contacts 306 to close, and power is provided to the N/O dump valve 308 and a compressor 310. The dump valve 308 closes, and compressor 310 removes gas from the fluid reservoir (not shown). After a predetermined set time, the timer board opens the relay contacts 306, de-energizing the compressor 310 and the dump valve 308 (i.e. turning off the compressor 310 and allowing the dump valve 308 to open). The fluid reservoir is thus in fluid communication with the atmosphere via the dump valve 308, which allows the fluid reservoir to vent to atmosphere and be used in its normal way (i.e. in the same manner as in a system not fitted with the brake control system).

The schematic also includes a second compressor 312, which is used for providing cooling air to the braking surface of a brake pad, which provides air to the surface of the brake pad during non-braking conditions. The brake control system can be used without this additional element, as in FIG. 2B. Also, this additional element could be used with the arrangement of FIG. 2B.

Figure 4A:
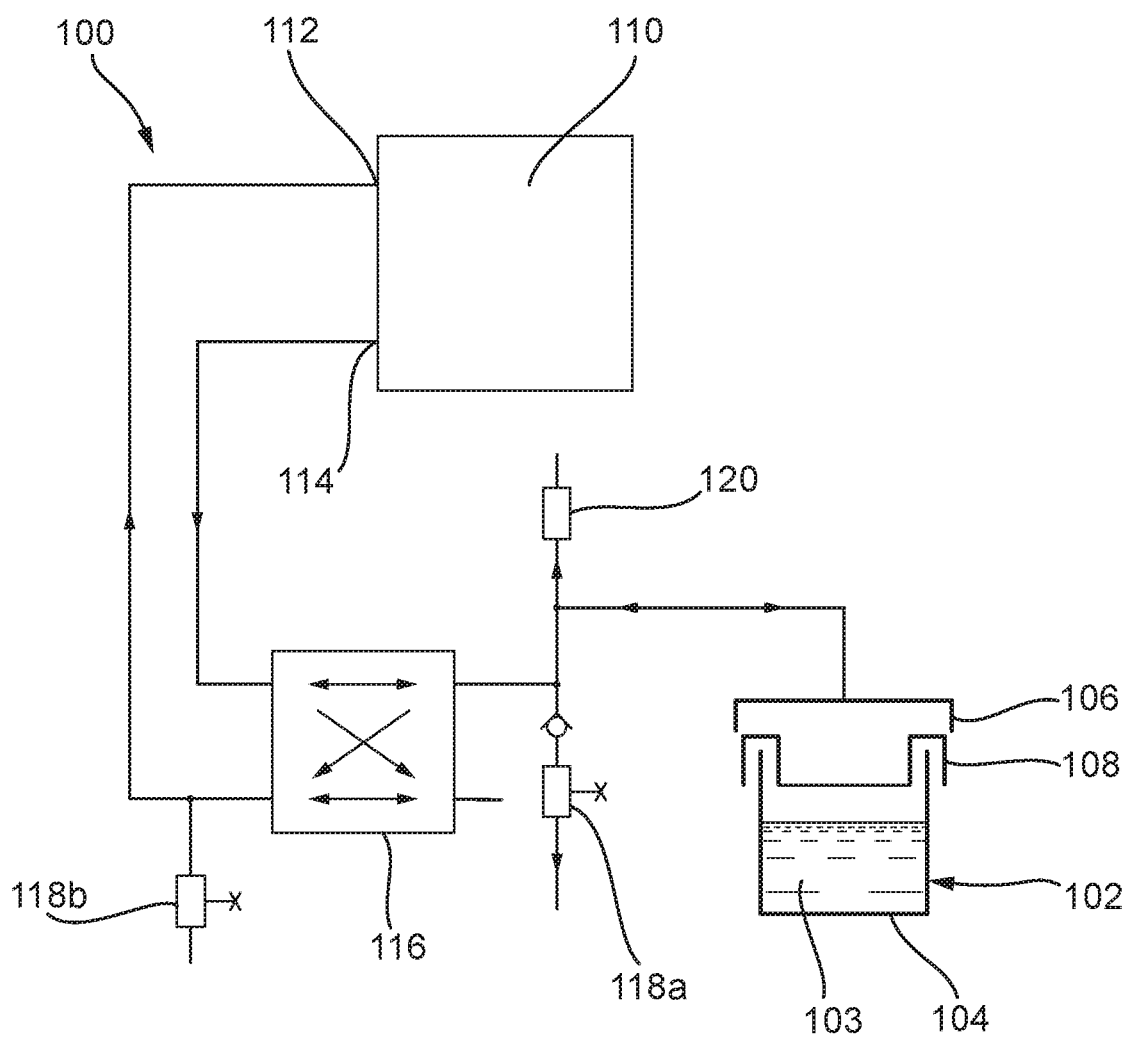
FIG. 4A shows a schematic of a system in accordance with a further embodiment of the present invention.

FIG. 4A shows a schematic of a system 100 in accordance with a further embodiment of the present invention. The system 100 includes the same components as the systems of FIGS. 2 and 3, and also comprises a multi-port valve 116 having a first configuration and a second configuration, wherein in the first configuration the outlet of the compressor is in fluid communication with the reservoir 102 and the inlet 112 of the compressor is in fluid communication with atmosphere, and in the second configuration the outlet 114 of the compressor is in fluid communication with atmosphere, and the inlet of the compressor 110 is in fluid communication with the reservoir 102. Thus, in the first configuration, when the compressor 110 is on, gas is added to the reservoir 102 and, in the second configuration, gas is removed from the reservoir 102.

The system includes two adjustable valves 118a,b. The valve 118b is in permanent fluid communication with the inlet 112, and is for vacuum adjustment. Valve 118a is in permanent fluid communication with the reservoir 102, for pressure adjustment.

When gas is added to the reservoir 102, it will exert a force on the fluid contained therein. Under non-braking conditions, the reservoir is in fluid communication with the main chamber 12. Thus, the force will be exerted on brake fluid in the main chamber 12. As the master piston 18 is biased open against a stop that limits its movement by a spring, a relatively large amount of force is required to move the master piston, compared to the force required to move the slave piston, as discussed in more detail below. Thus, the force exerted on the brake fluid in the main chamber instead causes fluid to move through the outlet and extend a slave piston in the brake. The slave piston pushed on the brake pad, moving it closer to the brake disc. When gas is removed from the reservoir, this will cause a negative pressure, drawing brake fluid back into the master cylinder 10 via the outlet 14, and retracting the slave piston. Although the negative pressure in the fluid reservoir 102 will also cause a pull on the master piston 18, this piston is biased to the non-actuated position by the spring 26. It would require a larger force to move the master piston than the slave piston due to the bias of the spring 26 and the relative sizes of the pistons (the slave piston is large and, thus, the same force applied per unit area to each provides a greater overall force on the slave piston) and, as such, it is the slave piston which is moved. If the master piston does move, any small movement thereof will cause the operating rod 24 to move, and the inlet 16 to be closed by the seal 22. This will then isolate the fluid reservoir from the main chamber 12, and prevent the negative pressure from causing any further movement of brake fluid in the system. This stops the negative pressure in the fluid reservoir 102 from causing any further movement of the master piston 18, and also prevents the system from retracting the brake pads and acts as a fail-safe to the brake system.

FIG. 4B shows a schematic wiring diagram for use with the system of 4A. The schematic wiring diagram includes two timer boards 304a,b. Upon release of the brake pedal power is provided to the first and second timer boards 304a,b via switch 314. The first timer board 304a will open its normally closed relay contacts 306a, for a predetermined time period, which will switch the multi-port valve 116 to the second configuration. The second timer board 304b will close its normally open relay contacts 306b for the same time period, which will supply power to the N/O dump valve 308 and compressor 310 as in FIG. 3B. This closes the dump valve 308, and turns the compressor 310 on, such that it removes air from (i.e. supplied a negative air pressure to) the fluid reservoir (not shown). After a the predetermined time, the first timer board 304a closes relay contacts 306a, and the second timer board 304b opens relay contacts 306b, which returns the multi-port valve to the first configuration, turns off the compressor 310 and allows the dump valve 308 to open. The fluid reservoir is thus in fluid communication with the atmosphere via the dump valve 308, which allows the fluid reservoir to vent to atmosphere and be used in its normal way (i.e. in the same manner as in a system not fitted with the brake control system).

When the input contacts 305 of the second timer board 304b are broken then restored (i.e. momentarily opened and then closed), it activates the knock-back system. The normally open closed (N/O) relay contacts 306b of the second timer board are closed for a predetermined period of time, which supplies power to the N/O dump valve and compressor. Thus, the dump valve closes and the compressor supplies air (i.e. positive air pressure) to the fluid reservoir. Since the first timer board 304a has not been activated, the multi-port valve remains in the first configuration. After the predetermined time, the second timer board 304b opens the normally open relay contacts 306b, which turns off the compressor 310 and allows the dump valve 308 to open. The fluid reservoir is thus in fluid communication with the atmosphere via the dump valve 308, which allows the fluid reservoir to vent to atmosphere and be used in its normal way (i.e. in the same manner as in a system not fitted with the brake control system).

The schematic also includes a second compressor 312, which is used for providing cooling air to the braking surface of a brake pad, which provides air to the surface of the brake pad during non-braking conditions, as in FIG. 3B. The brake control system can be used without this additional element, as in FIG. 2B. Also, this additional element could be used with the arrangement of FIG. 2B. Although FIG. 4B includes two timer boards 304a,b, it is possible to use just one timer board having two relays, which known in the art, and may provide a cheaper alternative to using two timer boards.

FIG. 5A shows an alternative embodiment wherein gas is removed continuously from the fluid reservoir 104 during non-braking conditions. This differs from the embodiment of FIG. 4A in that the dump valve 120b is normally closed. Under braking conditions, as in FIG. 4A, the compressor 110 may be switched off, and the dump valve 120b is energized to be open. Therefore, under braking conditions, the gas in the fluid reservoir 102 can vent to atmosphere. This arrangement requires a lower negative pressure of gas (i.e. lower vacuum) to be provided to the fluid reservoir 102 but for a longer period of time. The arrangement may require a third or less of the negative pressure of the gas. As the gas is being constantly removed during non-braking conditions, there is a constant retraction force on the brake piston. This provides for low rolling resistance without the need for an air-bearing system to the braking surface of the brake pad. Additionally, upon braking, the removal of the retraction force (by turning off the compressor) causes the gap between the brake pad and the brake disc to automatically partially close, when the brake pedal and the brake piston travel is reduced, providing a faster brake reaction time.

Figure 5B:
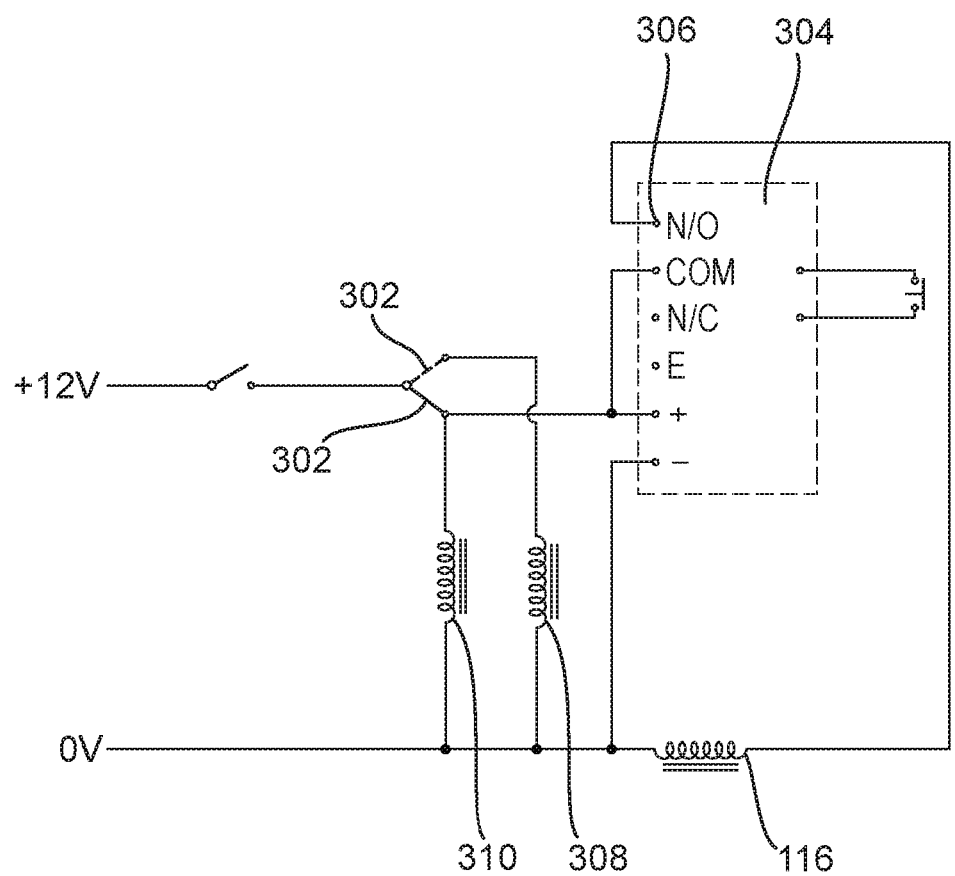
FIG. 5B shows a schematic wiring diagram for use with the system of FIG. 5A.

FIG. 5B shows a schematic wiring diagram for use with the system of FIG. 5A. The schematic includes a switch 302, which will be described in more detail below with respect to FIG. 6. During braking, the switch 302 is located to provide power to the normally closed dump valve 308, energizing it to open and vent the fluid reservoir to atmosphere. During non-braking, the switch 302 is located to supply power to the compressor 310 and a timer board 304. The contacts on the timer board 304 are normally open. The multi-port valve 116 remains in a second configuration, as in FIG. 4B, and the compressor 310 removes gas from the fluid reservoir. When the normally open relay contacts 306 on the timer board 304 are activated to close, the multi-port valve 116 is energized to be in a first configuration. The removal of gas from the fluid reservoir (retraction) stops, and gas is added to the fluid reservoir, to combat knock-back, for a predetermined period of time before the normally open relay contacts 306 reopen and the multi-port valve 116 returns to the second configuration. Braking at any time, i.e. during either the removal or addition of gas from or to the fluid reservoir will cause the compressor 310 to be switched off. When the brake pedal is released, the system will be reset to the usual non-braking arrangement, i.e. with gas being removed from the fluid reservoir. The multi-port valve 116 illustrated shows four ports. However, this could be increased to allow for independent activation of the dump valve. This embodiment could be used in combination with the cooling system used in FIGS. 3B and 4B.

In systems wherein two master cylinders operate in tandem, and the pivot point is adjustable, it is desirable that, when the brake control system is used to counter knock-back, the means acts on both master cylinders in the same manner. However, when the brake control system is used to retract the associated slave pistons, it may be desirable that more fluid is moved from the main chamber to the fluid reservoir in one master cylinder than the other, as they were applied with different forces. Therefore, each master cylinder will comprise an adjustable valve to allow the systems to act differently on the different cylinders.

Any of the above described systems can be used in combination with other devices to aid in retraction of brake pads, such as that described in GB-2533476. This can provide the benefits of retracting the brake pads in combination with the retraction provided by embodiments of the present invention, and/or in combination with embodiments of the present invention solving the problem of knock-back.

Any of the above described systems can be used in combination with devices with air bearing for aiding maintaining separation of brake pads from brake discs. Such systems provide a flow of air to the surface of the brake pad during non-braking conditions to allow brake pads to remain at a small distance from the brake discs without contact therebetween, allowing for fast brake reaction times as the distance required to travel by the brake pads before they contact the brake discs is minimized.

Any of the above described systems can be used in combination with a system for cooling the brake pads. Such cooling systems could use separate or the same timing controllers as the above described pneumatic systems. Cooling is switched off during brake application. Cooling may also be arranged to be switched off during knock-back and/or retraction (i.e. when gas is added or removed from the reservoir).

Figure 6:
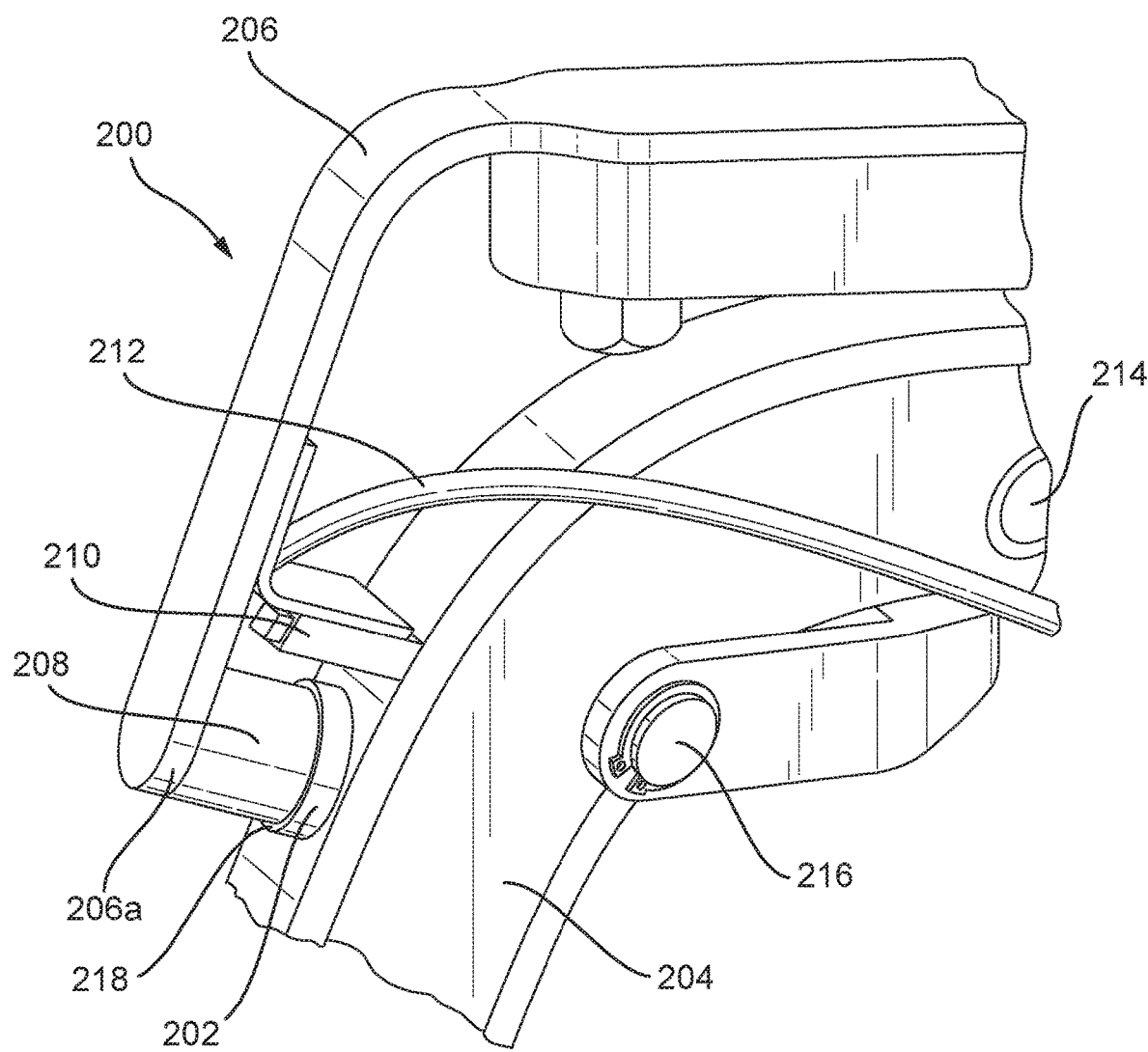
FIG. 6 shows a brake pedal having a system designed to prevent accidental activation of the brake control system of the present invention.

FIG. 6 shows a brake pedal having a system 200 designed to prevent accidental activation of the brake control system. A magnetic keeper plate 202 is attached to the upper surface of the brake pedal 204. As discussed above, the brake of the present invention is exemplified as being actuated by a brake pedal, although a handbrake operated master cylinder used in some vehicular sports activities, would operate equally well. As discussed above, actuation of the brake pedal activates the brake control system. The brake control system is activated by a switch 210 located proximate the upper surface of the brake pedal 204. When the brake pedal 204 is depressed, the brake pedal moves away from the switch. When the brake pedal 204 is released, the brake pedal moves back into contact with the switch and activates the switch, and, thus, the brake control system via a switch cable 212. The switch may be arranged to activate the system (a) just before the seal between the fluid reservoir and the main chamber of the master cylinder opens, (b) as the seal opens or (c) after the seal opens. In position (a), part of the activation time may occur prior to full brake pedal release benefitting, for example, race situations through faster reaction times and thus early brake pad release, lowered rolling resistance and greater acceleration. This can be achieved using any suitable means, for example a magnet or a pressure pad. It is important to ensure that the system is not accidentally actuated, for example by an accidental nudge of the brake pedal as opposed to depression thereof. This is particularly important in racing, where drivers often use left foot braking (i.e. leaving their foot on the brake pedal at all times) in order to increase their reaction times. A support plate 206 extends proximate to the brake pedal 204. At an end 206a of the support plate 206, there is a high power magnet 208 positioned such that, when the brake pedal is not depressed (i.e. not actuated), the magnet 208 aligns with and contacts the keeper plate 202. The magnetic force thus present between the two retains the brake pedal 204 in place against small forces. The strength of the magnetic force is not sufficient to prevent the brake pedal from being easily depressed, but merely prevents accidental actuation and thus needless activation of the brake control system. When the brake pedal is depressed, and the magnetic force overcome, the brake pedal 204 will move away from the magnet 208. The brake pedal 204 will rotate about the brake pedal pivot 214, and press against a push rod pivot 216. The push rod pivot 216 is operatively connected to the master piston of the master cylinder, and thus actuates the brake. When the brake pedal 204 is released, it is biased to return to its original location aided by the magnet force and thus rotates about the brake pedal pivot 214 to return to this position. In doing so, as discussed above, the brake pedal 204 contacts the switch 212, activating the switch and the brake control system.

A thin rubber damper 218 is attached to either the magnet 208 or, more preferably, the keeper plate 202, and protects the system from impact vibrations, and also protects the keeper plate 202 and magnet 208 from wear. Importantly, it also protects the magnet 208, which is formed from a sintered material, from excessive impact damage when the brake pedal is released and the magnet 208 hits the keeper plate 202.

Figure 7A:
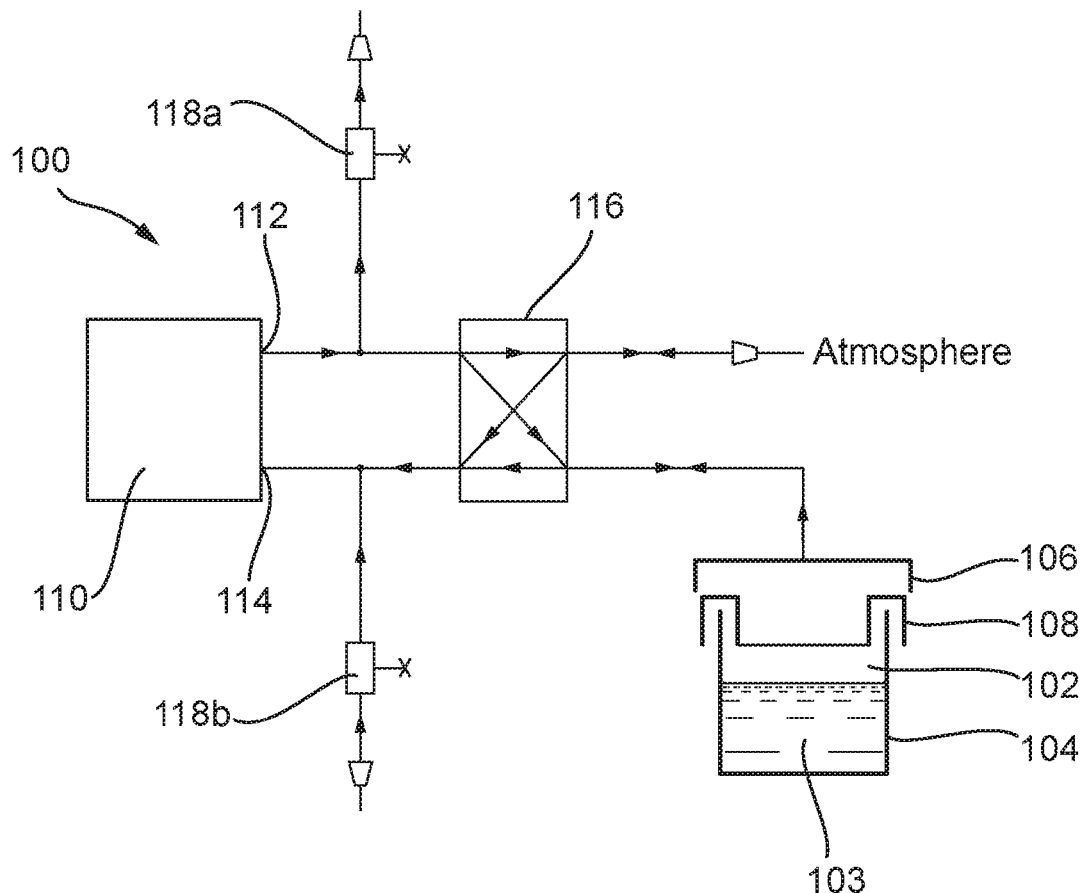
FIG. 7A shows a schematic of a system in accordance with another embodiment of the present invention.

FIG. 7A shows a schematic of a system 100 in accordance with an embodiment of the present invention. FIG. 7A is similar to previous embodiments, such as that shown in FIG. 4A. However, the compressor 110 of FIG. 7A is continually switched on. Under non-braking conditions, the multi-port valve is in a second configuration such that the inlet 114 of the compressor is in fluid communication with the fluid reservoir 102, and the outlet of the compressor 112 is in fluid communication with atmosphere. Thus, under non-braking conditions, the system 100 acts in the same manner as that of FIG. 4A.

Under braking conditions, the multi-port valve is in a first configuration, such that the outlet 112 of the compressor 110 is in fluid communication with the fluid reservoir 102 and the inlet 114 of the compressor 110 is in fluid communication with atmosphere. As the compressor 110 remains switched on and, unlike in FIG. 4A, there is no dump valve located between the fluid reservoir 104 and the multiport valve 116 or the multiport valve 116 and the inlet 112, pressurized gas is thus supplied to the fluid reservoir 102 during braking conditions. However, brake fluid will only be provided into the main chamber for a small time period at the start of braking conditions when the seal is not yet engaged to isolate the fluid reservoir from the main chamber.

The positive pressure (i.e. above atmospheric pressure) gas supplied to the fluid reservoir 102 under braking conditions is regulated by a pressure regulator valve 118a, and the negative pressure (i.e. below atmospheric pressure) gas supplied to the fluid reservoir 102 under braking conditions is regulated by vacuum regulator valve 118b.

Figure 7B:
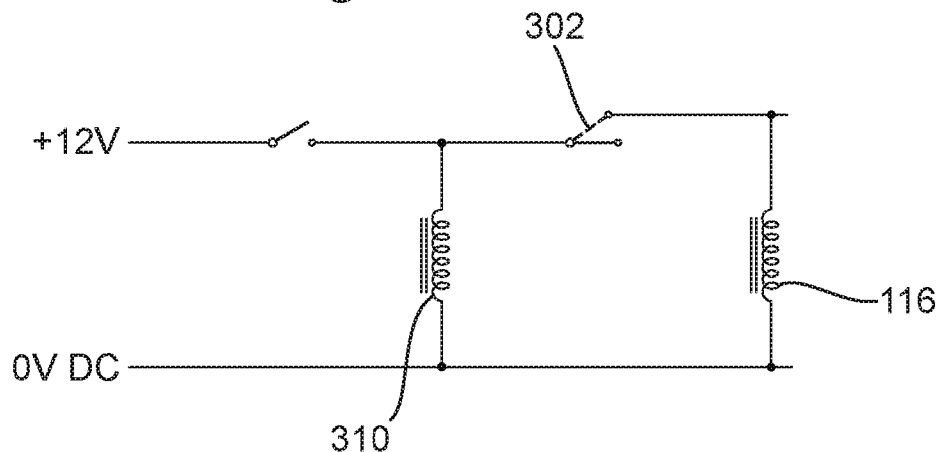
FIG. 7B show a schematic wiring diagram, for use with the system of FIG. 7A.

FIG. 7B shows a schematic wiring diagram for use with the system of FIG. 7A. As can be seen, the system does not require electronic control, such as by using a timer board, as in previous embodiments, as the compressor 110 is continuously switched on. During non-braking conditions, the brake switch 302 is positioned such that the normally open multiport valve 116 is open, and the valve is in the second configuration. The valve being normally open also acts as a safety feature, as if it should fail, the fluid reservoir will be returned to atmospheric pressure via the control valves that will always be partially open to atmosphere. During braking conditions, the multiport valve is energized to be in the first configuration.

In such arrangements, the system would not be arranged to continually supply the fluid reservoir with gas during braking conditions. Instead, when braking conditions begin, the multi-port valve would be energized to be in the first configuration, and the compressor would supply air to the fluid reservoir for a short period of time such as, for example, 10 seconds, after which the compressor can be switched off and the valve de-energized. The fluid reservoir can then vent to atmosphere. This does not affect the function of the system as, once the fluid reservoir has been sealed off from the main chamber under braking conditions, providing gas to the fluid reservoir does not affect the brake system.

Alternatively, the system could be arranged such that the multiport valve is a normally closed valve (i.e. when de-energized, it is in the first configuration). Thus, when the brakes are applied for an extended period of time, such as when a user is waiting in traffic or for a traffic light, the valve is not energized and, as such, does not overheat since, during braking conditions, the valve will be in the first configuration and, thus, de-energized.

Figure 8A:
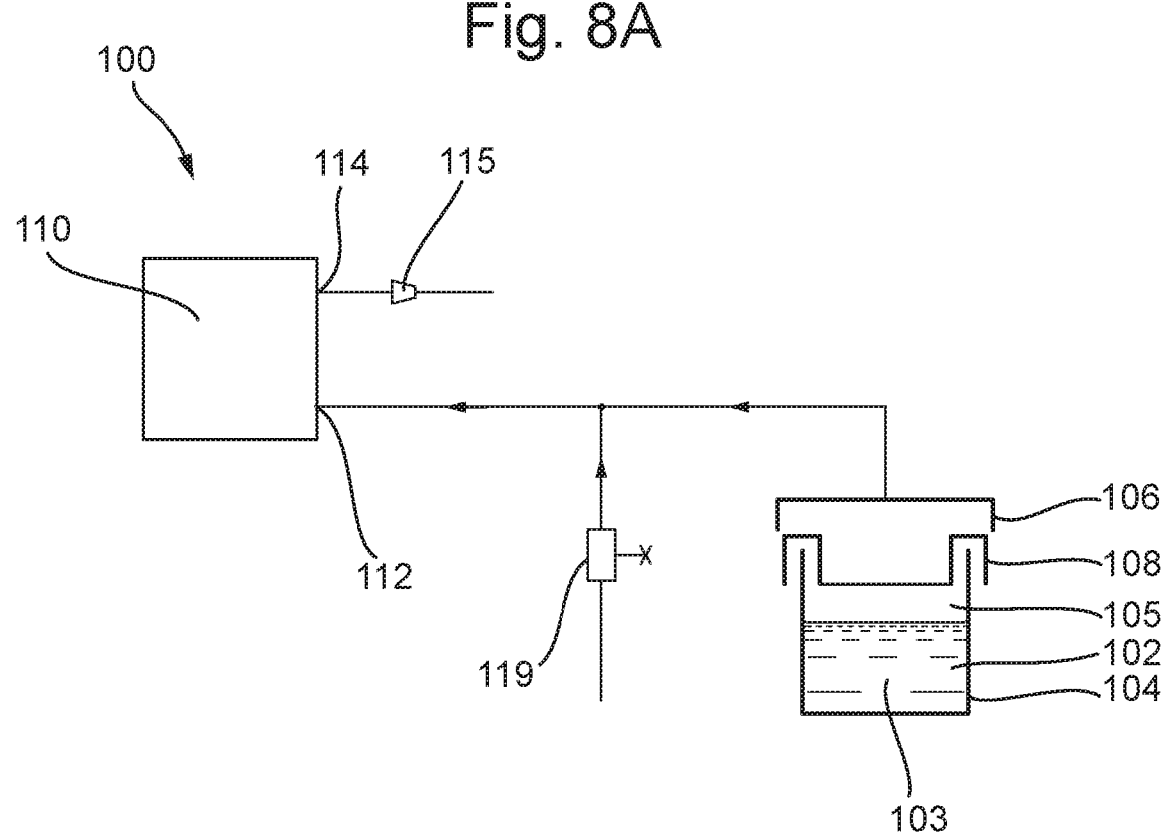
FIG. 8A shows a schematic of a system in accordance with another embodiment of the present invention.

FIG. 8A shows a schematic of a system 100 in accordance with another embodiment of the present invention. This embodiment is similar to that of FIG. 3A. The compressor 110 is a single headed micro-compressor 110. The inlet 112 of the compressor is in fluid communication with the reservoir 102 such that when the compressor 110 is on, gas is removed from the reservoir 102. Outlet 114 is connected to atmosphere via an optional sound muffler 115. Adjustable restrictor/control valve 119 creates a negative pressure within the reservoir 102 during non-braking conditions of around minus 2.5 psi. The restrictor/control valve continuously allows a flow of air therethrough in operation (unlike, for example, a ball/orifice type valve). As such, when the compressor is turned off, e.g. by a pedal switch upon depression of a brake pedal (i.e. at the beginning of braking conditions), the pressure in the fluid reservoir equalizes to atmospheric pressure within one second. This embodiment does not include a changeover or solenoid valve, so there is no leakage caused by any such valve. Thus, this embodiment has high efficiency at 2-3 watts power drain and is cheap to implement with minimal modifications to existing brake systems.

Figure 8B:
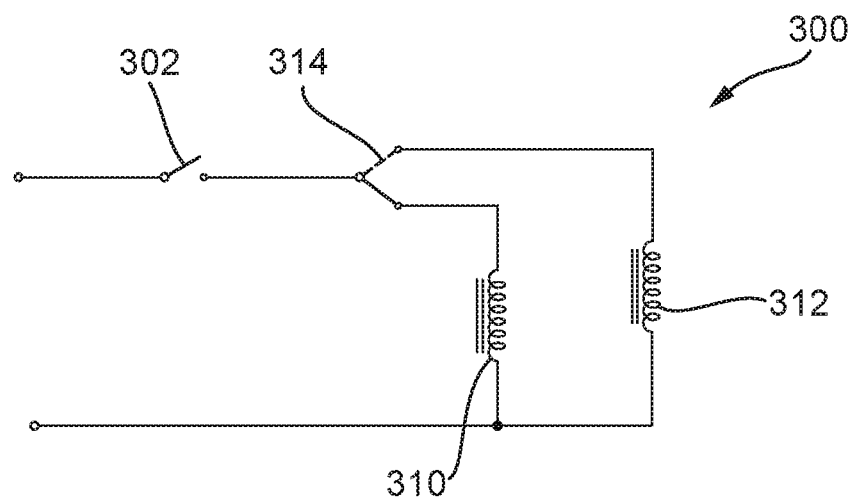
FIG. 8B shows a schematic wiring diagram 300 for use with the embodiment of FIG. 8A.

FIG. 8B shows a schematic wiring diagram 300 for use with the embodiment of FIG. 8A. As in previous embodiments, cooling compressor 312 is optional.

Figure 9A:
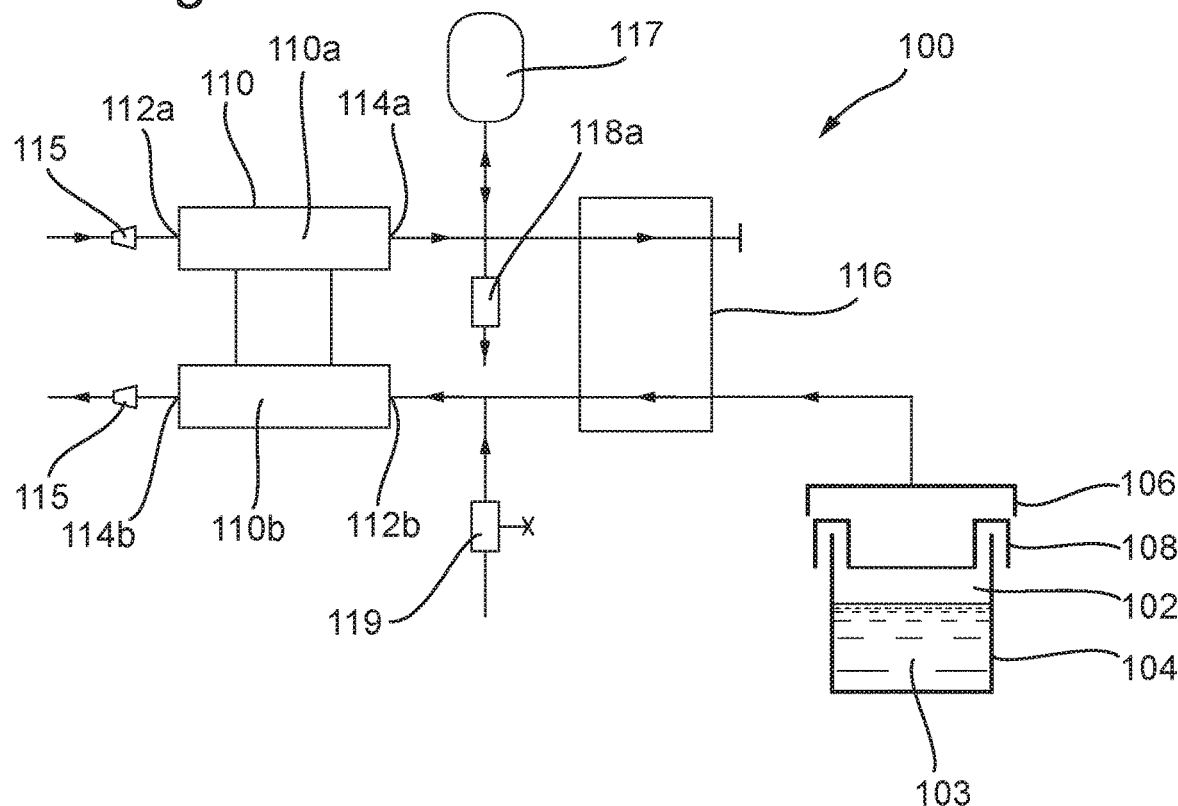
FIGS. 9A and 9B show a schematic of a system 100 in accordance with another embodiment of the present invention.
Figure 9B:
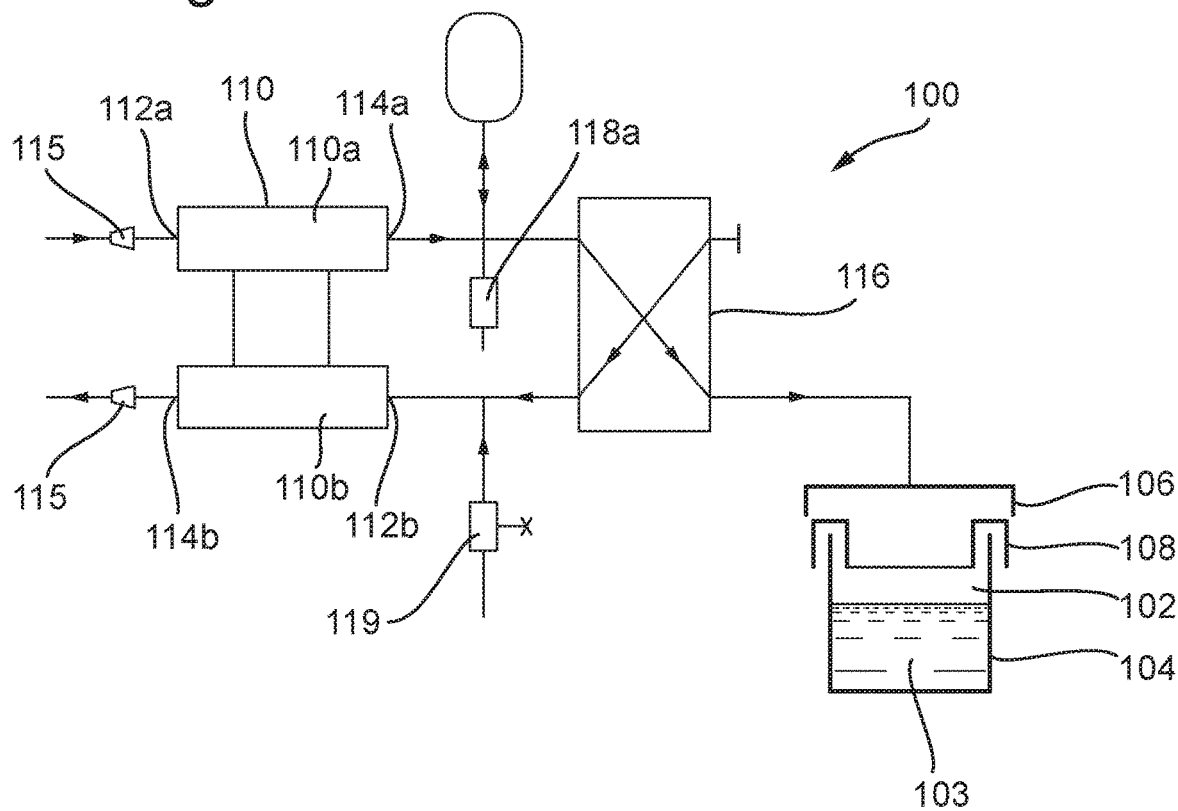

FIGS. 9A and 9B show a schematic of a system 100 in accordance with another embodiment of the present invention. This embodiment uses a twin headed compressor 110 having a first head 110a and a second head 110b. The compressor may be switched on at all times when the ignition of the vehicle is switched on, or the system may be controlled such that the compressor switches off when the ignition is on but the vehicle is stationary, e.g. at traffic lights or in traffic.

FIG. 9A shows the embodiment when change-over valve 116 is in a second configuration, (and de-energized) and the brake pedal is not depressed (i.e. during non-braking conditions) The first head 110a provides air from the outlet 114a to a an auxiliary reservoir 117. The pressure is maintained by a fixed restrictor or variable pressure controller 118a. The inlet 112a of the first head is connected to atmosphere via an optional sound muffler 115. A negative pressure is maintained in the reservoir 102 by the second compressor head 110b inlet 112b, the pressure being maintained by pre-set restriction of valve 119. The negative pressure is applied to the fluid reservoir, and thus the brake pistons are retracted, at all times when the brake pedal is not depressed.

The system may also include a dump valve in fluid communication or selective fluid communication with the fluid reservoir as a safety feature. For example, such a dump valve could be in permanent fluid communication with the fluid reservoir, and be a solenoid valve which is energized to be closed. Therefore, if power were lost to the system, the solenoid valve could open and vent the fluid reservoir to atmosphere. Alternatively, the dump valve could be associated with a further port of the multi-port valve.

Sound mufflers are commonly used to reduce pneumatic valve/compressor exhaust noise, and can also act as filters to remove excess water from air. Whilst mufflers can be used with any of the above described embodiments, the embodiments will equally function without such mufflers, as the relatively low gas pressures used with the systems produce correspondingly low water contents, which can be filtered out by filters generally found in the inlet of a compressor.

FIG. 9B shows the embodiment when change-over valve 116 is in a first configuration, (and energized). The change-over valve is energized (i.e. switched to be in the first configuration) upon application of the brake pedal, e.g. by a brake switch, and remains on until the brake pedal is released. This causes the outlet 114a of the first head 110a and the auxiliary reservoir 117 to be in fluid communication with the fluid reservoir 102. Upon the multi-port valve being energized, and the outlet of the first compressor head 114a and the auxiliary reservoir 117 being in fluid communication with the fluid reservoir, the auxiliary reservoir 117 will immediately partially depressurize into the fluid reservoir 102, causing brake fluid to move out of the fluid reservoir into the brake system. This has the effect of closing any gap between the brake pad and the brake disc created by the retraction of the brake pad during non-braking conditions, i.e. when the system was in the first configuration. Whilst the outlet 114a of the first head 110a is in fluid communication with the reservoir 102, and supplies gas thereto, the increased volume of using the auxiliary reservoir will cause a quicker increase of pressure in the fluid reservoir, a quicker movement of brake fluid returning the brake pistons to their original positions, and less brake piston movement by brake pedal actuation, as the distance required to travel by the brake pedal is partially traversed by the movement of the brake fluid caused by the brake fluid being pushed out of the fluid reservoir. The inlet 112a of the first head 110a and the outlet 114b of the second head 110b remain in fluid communication with atmosphere via optional sound mufflers 115. The change-over valve 116 will remain energized until the brake pedal is released (i.e. the end of braking conditions), when the change-over valve 116 will de-energize, causing vacuum retraction to recommence.

In the above described embodiments, the brake control system of the present invention is activated to move fluid out of the fluid reservoir when depression of the brake pedal activates a switch. As discussed with respect to FIG. 9B, this causes the brake pad to be returned to the position it would have been had the brake pad not been retracted, i.e. to be moved towards the brake disc, and any gap between the brake pad and the brake disc is closed or reduced, in preparation for braking. This reduces the travel distance required by the brake pad once the brake piston is actuated, and thus the time taken for the brake pads to be firmly pressed against the brake disc and the brake pedal "travel" is reduced.

Figure 10A:
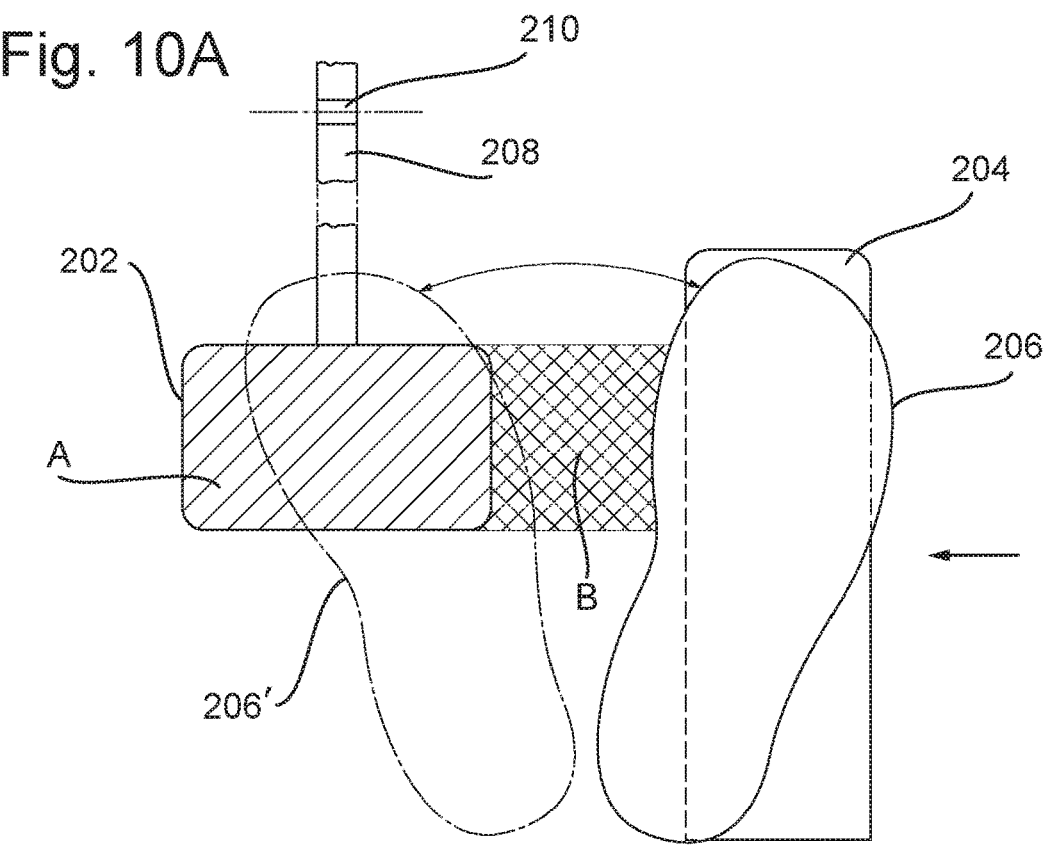
FIGS. 10A and 10B show elevational and side elevational views of an embodiment of the system including an early activation means.
Figure 10B:
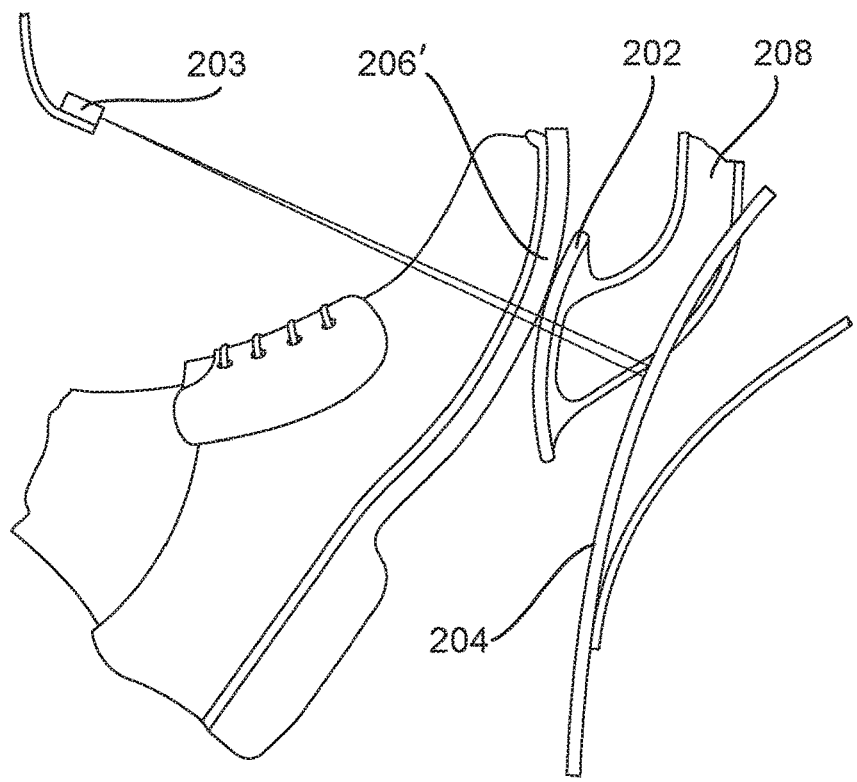

FIG. 10A is an elevational view showing an embodiment including an early activation means designed to predict a braking event by predicting when the driver is about to depress the brake pedal. FIG. 10B is a side elevational view of the embodiment of FIG. 10A. When a braking event is predicted, the means is designed to activate the brake control system in the same manner as was previously done by the brake switch, but sooner (i.e. prior to braking), allowing the brake pad longer to close the gap between the brake pad and the brake disc before braking commences. When driving a typical vehicle, such as a right-hand drive vehicle, the driver's right foot moves between a brake pedal and an accelerator pedal. Prior to braking, the driver will lift their foot from the accelerator pedal and move it sideways to the brake pedal before depressing the brake pedal.

The embodiment of FIGS. 10A and 10B includes a brake pedal 202, an accelerator pedal 204, and an optical or other proximity detector 203. The brake pedal 202 has a brake pedal arm 208 and a brake pedal pivot 210. The driver's foot is shown in a first position 206 above the accelerator pedal and a second position 206' (in dotted lines) above the brake pedal 202. The driver's foot moves between the pedals, i.e. between the first and second positions 206, 206' during driving. Shown are two possible detection zones of the proximity detector, where it will detect movement of and/or the presence of the driver's foot. When the proximity detector detects as the driver's foot, it activates the above described means for selectively moving fluid to move fluid out of the fluid reservoir. Zone A (represented by hatching) is located above the brake pedal, and allows an activation earlier than that which would be provided by the brake switch alone. Zone B, which extends between the accelerator pedal and the brake pedal (represented by the cross hatched area and the hatched area of Zone A) allows for even earlier activation, by the movement of the driver's foot away from the accelerator pedal and towards the brake pedal.

In an embodiment, there may additionally or alternatively be an accelerator switch located on the accelerator pedal. The accelerator switch is activated when the accelerator is fully released. This occurs when a driver has fully removed their foot from the accelerator pedal. It will not be activated when the driver is no longer actively depressing, or pushing down on the accelerator, but is still resting their foot on the accelerator pedal. Thus, the switch will not be activated when the driver is not actively pressing on the accelerator, but resting their foot thereon, as they are also not intending to brake, for example when the driver is driving down a hill, or allowing their speed to gradually and naturally (e.g. rolling towards a stop at traffic lights). In an additional or alternative embodiment, not illustrated, but within the scope of this disclosure, in the event that the user rests their foot on the floor rather than on the accelerator pedal (e.g. when driving downhill or rolling towards a stop) a heel switch could be used to detect the weight of the user's resting foot, and prevent activation of the accelerator switch/proximity detector. In this embodiment, when the user raises their foot to brake, the heel switch disconnects, and the accelerator switch/proximity detector system are allowed to work as previously described.

In embodiments, the brake system may include both a proximity detector and an accelerator switch as early activation means. In such embodiments, both early activation means may provide a prediction or signal to the brake control system: whichever is received earliest will activate the means for selectively moving fluid to move fluid out of the fluid reservoir.

When the driver depresses the brake pedal, the brake switch will stop the means for selectively moving fluid from moving fluid out of the fluid reservoir. In embodiments wherein there is an accelerator switch, when the driver releases the brake pedal, the brake switch will reactivate the means for selectively moving the fluid to again move fluid out of the fluid reservoir. Any further depression of the brake pedal will cause the brake switch to again deactivate the means for selectively moving fluid, and any further release of the brake pedal will cause the brake switch to again reactivate the means for selectively moving fluid to move fluid out of the fluid reservoir. When the driver depresses the accelerator, the accelerator switch will deactivate the means from moving fluid out of the fluid reservoir, and may activate the means to move fluid into the fluid reservoir in order to retract the brake pad(s).

In vehicles having cruise control, when cruise control has been activated, thus allowing the accelerator pedal to be released while the vehicle maintains its speed, the accelerator switch is isolated from the system, such that it cannot activate to the brake control system. Further, any signal that has been provided to the brake control system (for example, if the driver released the accelerator prior to switching on the), cruise control is reversed or over-ridden. The early activation means is thus solely reliant on the proximity detector. Alternatively, if no proximity detector is used, there may be no early activation means in such situations, with the means for selectively moving the fluid instead being activated to move fluid out of the fluid reservoir by the brake switch.

When activated, the proximity detector activates the brake control system to push fluid out of the fluid reservoir and towards the brake (via the master cylinder where applicable), thus resetting or pushing the brake pistons and the brake pad towards the brake disc.

Figure 11A:
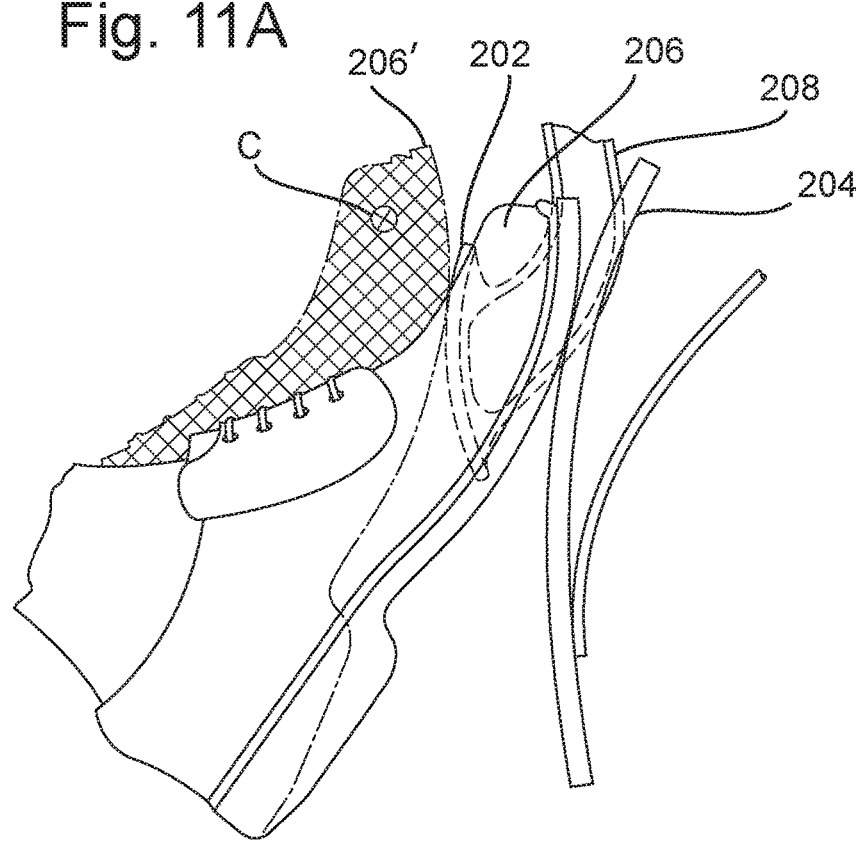
FIGS. 11A and 11B show side elevation views of an alternative embodiment including an early activations means.
Figure 11B:
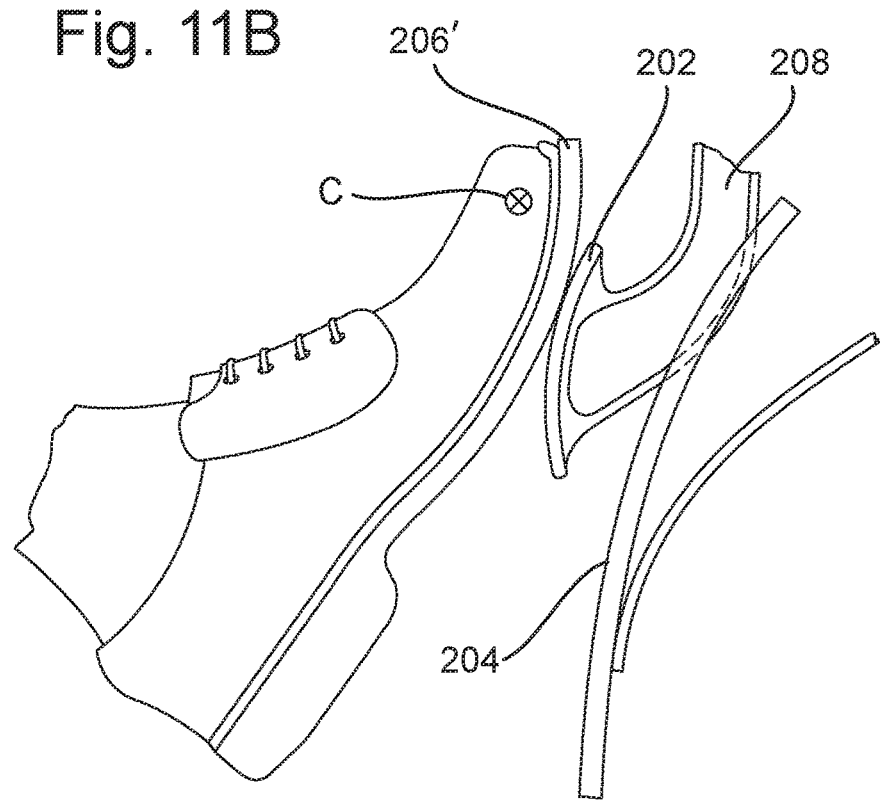

FIGS. 11A and 11B show side elevation views of an alternative embodiment including an early activations means. The embodiment is similar to that of FIGS. 10A and 10B, except the proximity detector and, thus, the detection zone, is in a different position relative to the brake pedal 202 and the accelerator pedal 204. In this embodiment, the detector is located such that the detection zone C extends across the pedals, perpendicular thereto. As can be seen in FIG. 11A, when the driver's foot is depressing the accelerator pedal 204, the detector does not detect the presence of an object, as the driver's foot does not cross the beam of the zone of detection (zone C). When the driver removes their foot from the accelerator, the foot will move into zone C, and be detected.

As can be seen in FIG. 11B, once the driver has depressed the brake pedal, the foot remains within zone C. This location of detector results in a detector zone which is less likely to be accidentally triggered when cruise control has been activated, for example when the driver then moves their foot around to assist blood circulation. The detector size can be small enough to be recessed into the offside wheel arch (not shown) and have adequate axial positional adjustment without detriment to the driver or their leg placement. The detection distance can be adjusted, such as by screw adjustment, and limited to operate up to the vehicle near side brake pedal edge and no further, so as not to be triggered by the movement of the clutch or the clutch foot.

Figure 12:
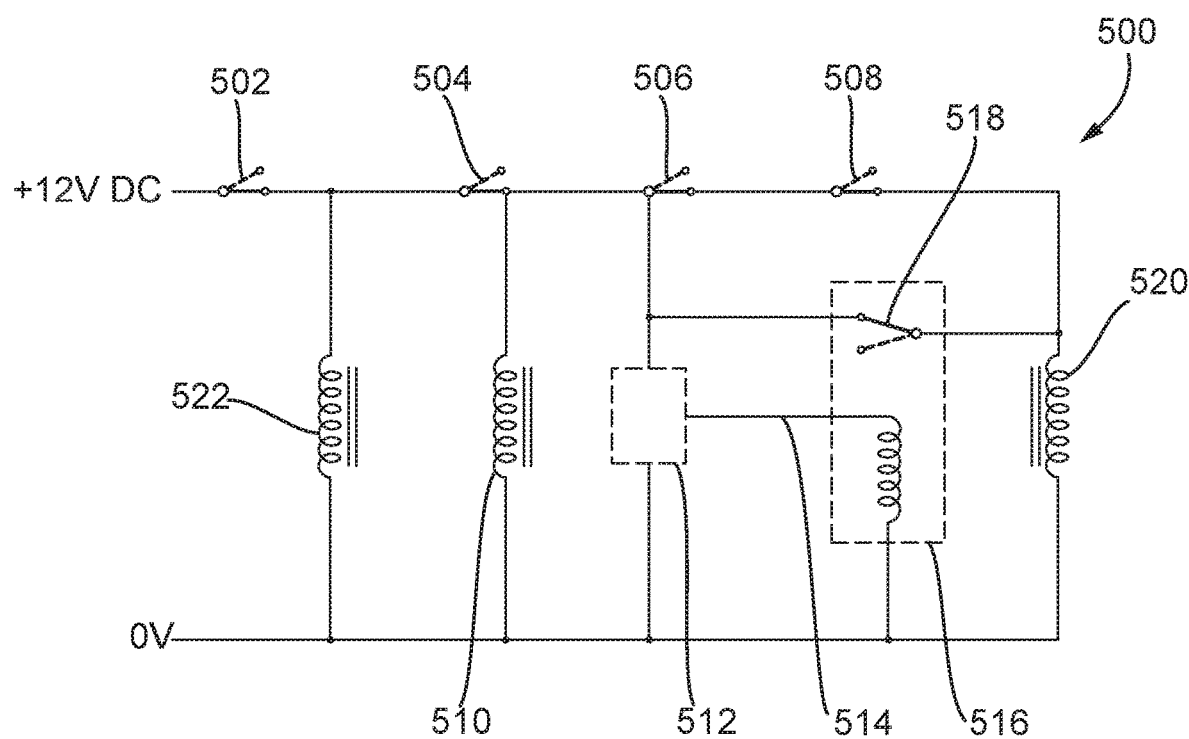
FIG. 12 shows a schematic wiring diagram 400 which can be used with a system having an early activation means, such as with the embodiments of FIGS. 10A and 10B, and 11A and 11B.

FIG. 12 shows a schematic wiring diagram 400 which can be used with a system having an early activation means, such as with the embodiments of FIGS. 10A and 10B, and 11A and 11B. The diagram includes a normally closed (N/C) ignition switch 502, a N/C brake switch 504, a N/C cruise control switch 506, a N/C accelerator switch 508, a twin headed compressor 510, an optical proximity detector 512 having an output 514, a relay 516 having a normally open (N/O) relay switch, and a multi-port valve 518. The schematic wiring diagram 400 also includes an optional cooling compressor 520.

The operation of a system using the wiring schematic of FIG. 12 may be as follows:

When the ignition is switched on, the ignition switch 502, the brake switch 504 and the accelerator switch 508 are closed. The system is energized. The multi-port valve 520 provides positive gas pressure to the fluid reservoir, moving fluid out of the fluid reservoir and pushing the brake pad towards the brake disc. When the driver's foot is pressed onto the accelerator pedal, the accelerator switch 508 is opened, power to the multi-port valve 520 is removed, and thus negative pressure (i.e. vacuum) is provided to the fluid reservoir, moving fluid into the fluid reservoir and causing retraction of the brake disc. When the driver's foot is only lightly resting on the accelerator pressure, there is no change.

When the driver's foot is removed from the accelerator pedal, and the accelerator switch closes, or the proximity detector 512 is activated (whichever occurs soonest), power is provided to the multi-port valve 520. In the case of the proximity detector being activated, this is achieved by power being provided to a relay 516 closing the normally open relay switch 518.

When the brake pedal is subsequently depressed, the N/C brake pedal switch 504 will be opened, removing power from the multi-port valve 520 and from the compressor 510. Thus, the multi-port valve 520 will not provide any pressure to the fluid reservoir, and allow any pressurized gas in the fluid reservoir to vent to atmosphere. This acts to restore the master cylinder to that of a standard vented unit, i.e. not comprising the system of the present invention, ABS, or any other safety system.

When the brake pedal is released, power is restored to the compressor 510, the multi-port valve 520 and the proximity detector 512. The multi-port valve 520 will provide a positive pressure to the fluid reservoir, moving fluid out of the fluid reservoir, to push the brake pads towards the brake disc, in anticipation of a further braking event, until either the brake pedal or the accelerator pedal is depressed (i.e. the brake switch 504 or the accelerator switch 508 is opened).

When cruise control is initiated, the cruise control switch 506 (which may comprise a relay, or contacts) is opened, which disables the accelerator switch 508. The proximity detector 512 will then be the only early-activation method for providing power to the multi-port valve. The accelerator switch 508 will not be reactivated until the cruise control switch 506 is closed, such as by a switch on the steering wheel or other suitable means.

Excessive periods where the multi-port valve is energized (i.e. where power is provided thereto), such is in traffic, or parking etc. could eventually cause unit failure. The multi-port valve may thus be provided with an energy reduction system which reduces the available power, after actuation. Satellite input or wheel RPM output (to the electronic brake control unit) can both detect when a vehicle is stationary, and switch off the brake control system with the use of electronics, as is known in the art. Additionally or alternatively, a timer could be used to switch off the brake control system after a set period of time. Any such system would help reduce the risk of unit failure and improve safety.

The above described early activation means can alternatively be used with any suitable brake control system such as, for example, that described in UK patent applications GB1602052.1 or GB1608429.5.

Figure 13:
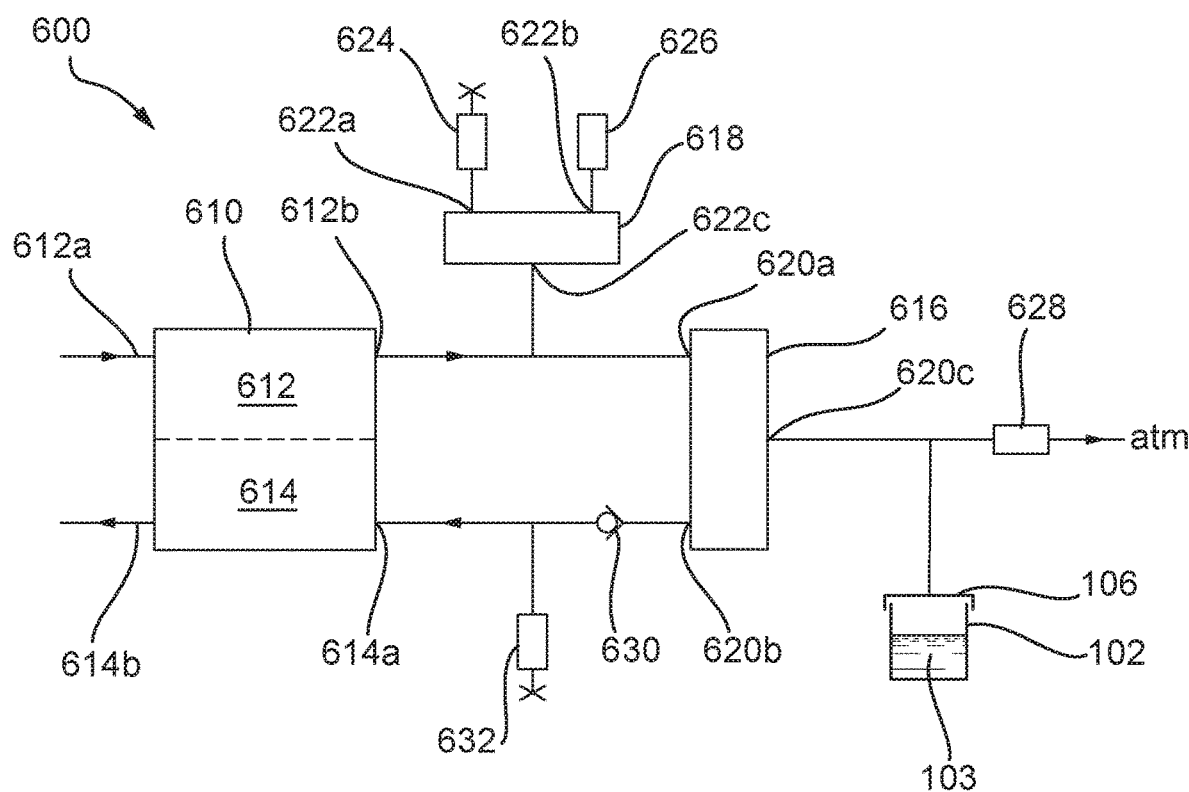
FIG. 13 shows a schematic of an alternative embodiment of a brake system, using a twin headed compressor.

FIG. 13 shows a schematic of an alternative embodiment of a system 600, using a twin headed compressor 610. The first head 612 has an inlet 612a and an outlet 612b. The second head 614 has an inlet 614a and an outlet 614b. The first and second heads 612, 614 work independently of one another. The outlet 612b of the first head 612 of the compressor 610 supplies fluid (i.e. a "positive" fluid pressure) to a first port 620a of a first solenoid valve 616. The third port 622c of a second solenoid valve 618 is in fluid communication with the outlet 612b of the first head 612 of the compressor 610 and the first port 620a of the first solenoid valve 616.

The inlet 614a of the second head 614 of the compressor 610 removes fluid from (i.e. provides a "negative" fluid pressure to) a second port 620b of the first solenoid valve 616 via non-return valve 630. Third port 620c of the solenoid valve 616 is in fluid communication with the fluid reservoir 102 of the master cylinder (not shown). In a first mode, the third port 620c is set to be in fluid communication with the first port 620a. In a second mode, the third port 620c is set to be in fluid communication with the second port 620b.

The second solenoid valve 618 also has three ports. In a first configuration, the third port 622c is in fluid communication with a pressure control valve or switch 624 via the first port 622a. In a second configuration, the third port 622c is in fluid communication with a "knockback" pressure switch 626 via the second port 622b.

The first and second solenoid valves 616, 618 may be multi-port valves, single valves manifold mounted, stand-alone units, or any other suitable valve.

The system 600 also includes an exhaust valve 628 in fluid communication with the fluid reservoir 102. This valve, which may be a solenoid valve, is normally closed.

The pressure switches could also be used in combination with any of the other embodiments, such as those of FIG. 2, 3, 4 or 5, for example in place of the pressure valves.

FIGS. 14 A-C show air flow in the system of FIG. 13 in different modes.

Figure 14A:
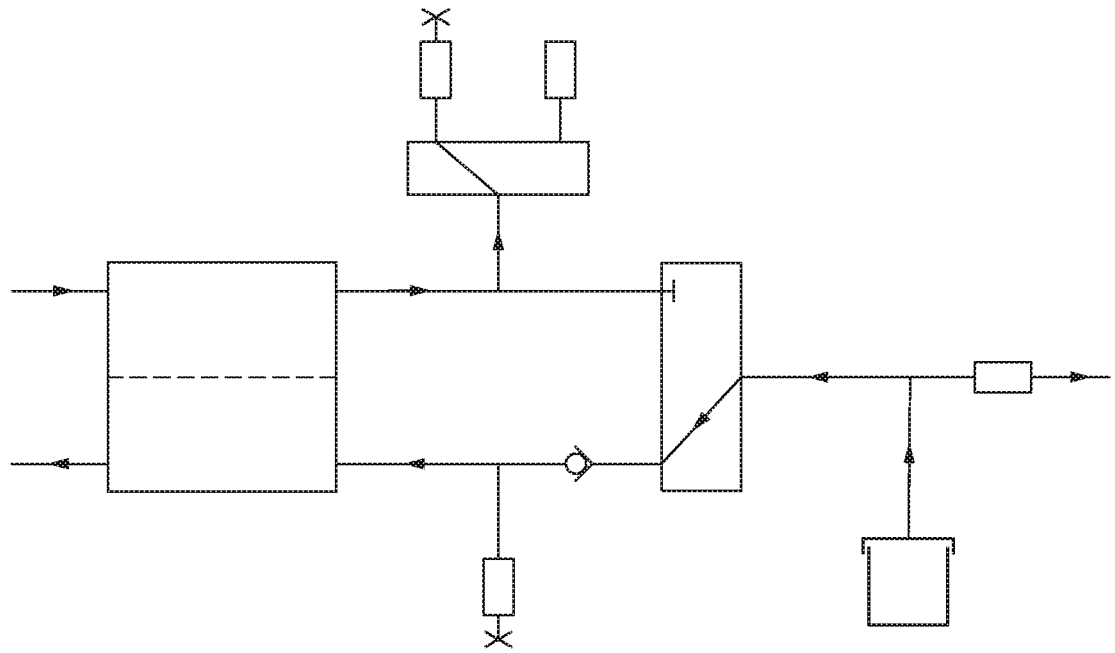
FIGS. 14 A-C show air flow in the system of FIG. 13 in different modes.

FIG. 14A shows the system in "retraction" mode. This occurs during acceleration (i.e. during non-braking conditions). The first solenoid valve 616 is set in the second mode, such that the third port 620*c* is in fluid communication with the second port 620*b*. Therefore, the fluid reservoir of the master cylinder 102 is in fluid communication with the inlet of 614*a* of the second head of the compressor 610. Fluid is therefore moved out of the fluid reservoir of the master cylinder 102. The brake pad is thus moved away from the brake disc, i.e. retracted. The second solenoid valve 618 is set in the first configuration. The fluid provided by the outlet 612*b* of the first head of the compressor 610 provides an increase in pressure between ports 612*b*, 620*a* and 622*c*, which is limited by the pressure control valve or switch 624. This increased pressure is not applied to the master cylinder as port 620*a* is not in communication with port 620*c*

In some embodiments, the compressor 610 may be turned off once a predetermined vacuum level has been reached. This can be achieved by any suitable means, such as by using a pressure sensor, or by using a timer, which automatically turns off the compressor 610 once a predetermined period of time, known to correspond to a predetermine vacuum level having been achieved. The vacuum is then substantially maintained due to non-return valve 630 preventing back flow of the fluid in the system. The compressor 610 can be periodically turned back on for a short period of time to "top up" the vacuum, again using any suitable method, such as using a pressure sensor, or a timer.

Figure 14B:
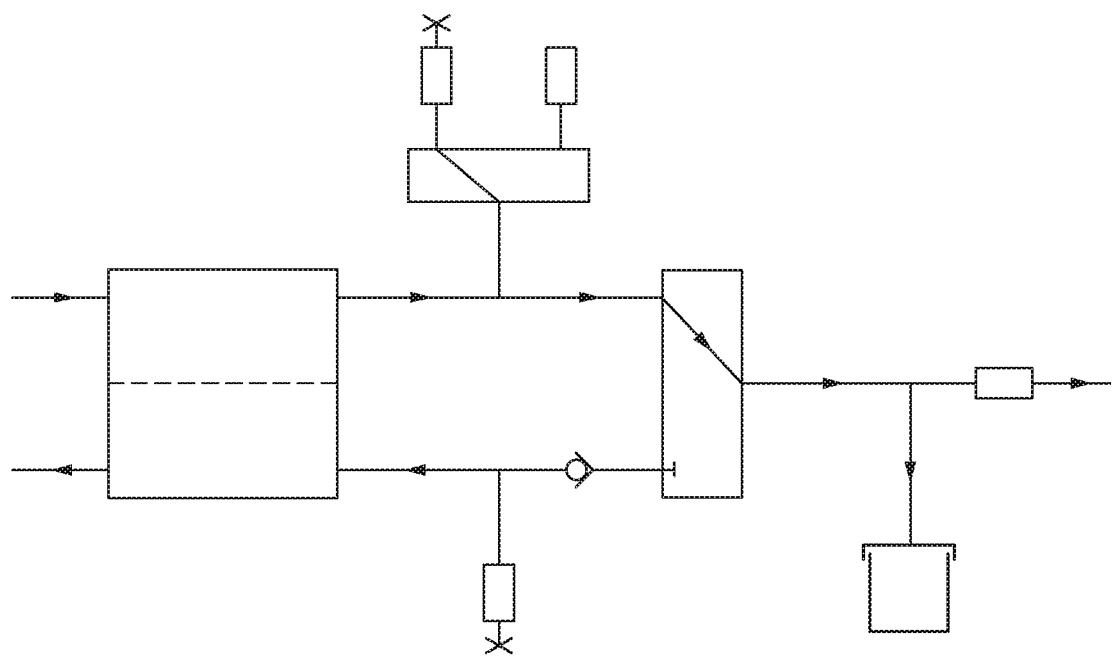

FIG. 14B shows the system in "pre-braking" mode. This occurs when braking conditions are anticipated to begin. The first solenoid valve 616 is set in the first mode. The fluid reservoir 102 of the master cylinder is in fluid communication with the outlet 612*b* of the first head 612 of the compressor 610. Fluid is therefore moved into the fluid reservoir 102. The brake pad is thus moved towards the brake disc. The second solenoid valve is set in the first configuration. This ensures that the pressure in the system does not exceed that set by the pressure control valve or switch 624. The inlet 614*a* of the second head of the compressor is regulated by vacuum control valve or switch 632.

In some embodiments, the compressor will be turned off during braking, i.e. once the brake pedal is depressed. This may be because the system may interfere with other components which need to return to their original positions, for example in anti-lock braking (ABS) systems. In such embodiments, when the compressor is turned off, exhaust valve 628 is opened to atmosphere, to allow the pressure in the fluid reservoir 102 to drain to return to atmospheric pressure. In other embodiments, the compressor may remain in "pre-braking" mode for the entire length of a braking event. For example racing vehicles often do not include ABS systems. In such vehicles, drivers often also employ left footed braking. The braking system may be configured to be in "pre-braking" mode at any time when the accelerator pedal is not depressed, when the system is switched into "retraction" mode, as discussed above with respect to FIG. 14A.

Figure 14C:
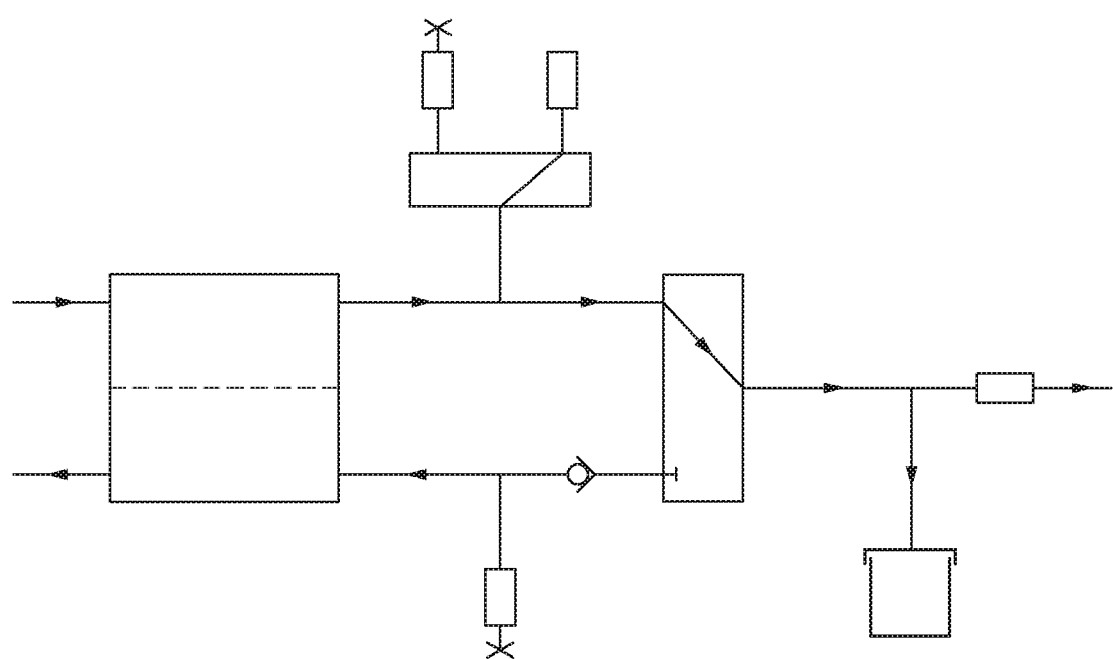

FIG. 14C shows the system in "knockback" mode. This occurs during non-braking conditions. The system will be in retraction mode, as in FIG. 14A. When a knockback event has been identified or detected, knockback mode is initiated. The first solenoid valve 616 is set in the first mode. The second solenoid valve 618 is set in the second configuration. The outlet 612*b* is thus in fluid communication with the fluid reservoir of the master cylinder 102, as in FIG. 14B. However, the pressure of the system is limited instead by the knockback pressure switch 626, which set a higher pressure threshold than that of the pressure switch or valve 624, thus allowing for a higher pressure, providing a great force pushing the brake pad back into place. After a set period of time, e.g. dependent on the knockback event identified or detected, the system will be returned to the retraction mode of FIG. 14A.

Figure 21A:
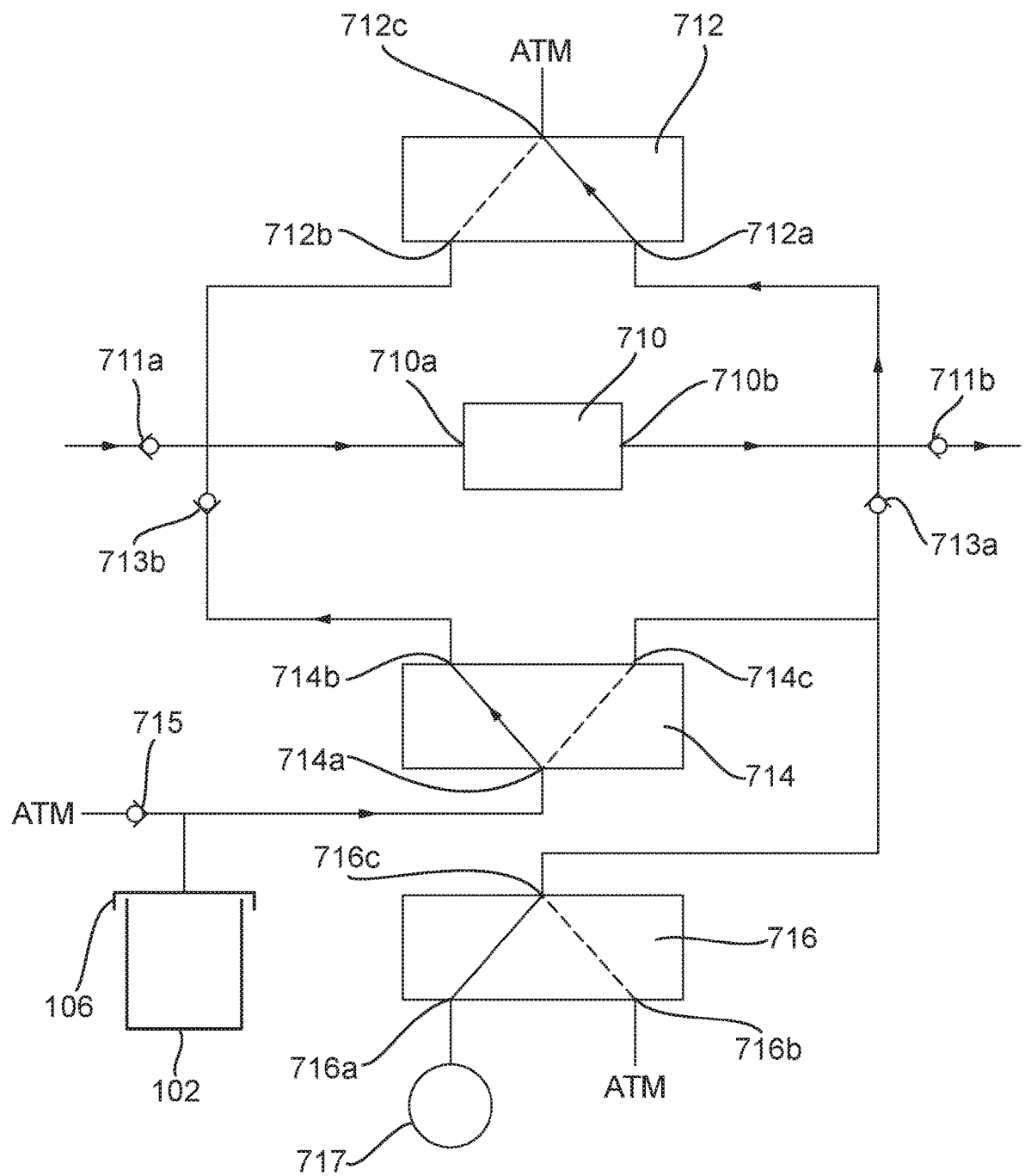
FIGS. 21A-21C show a schematic of an alternative embodiment of a brake system including three control valves and a positive pressure reservoir, in different modes.
Figure 21B:
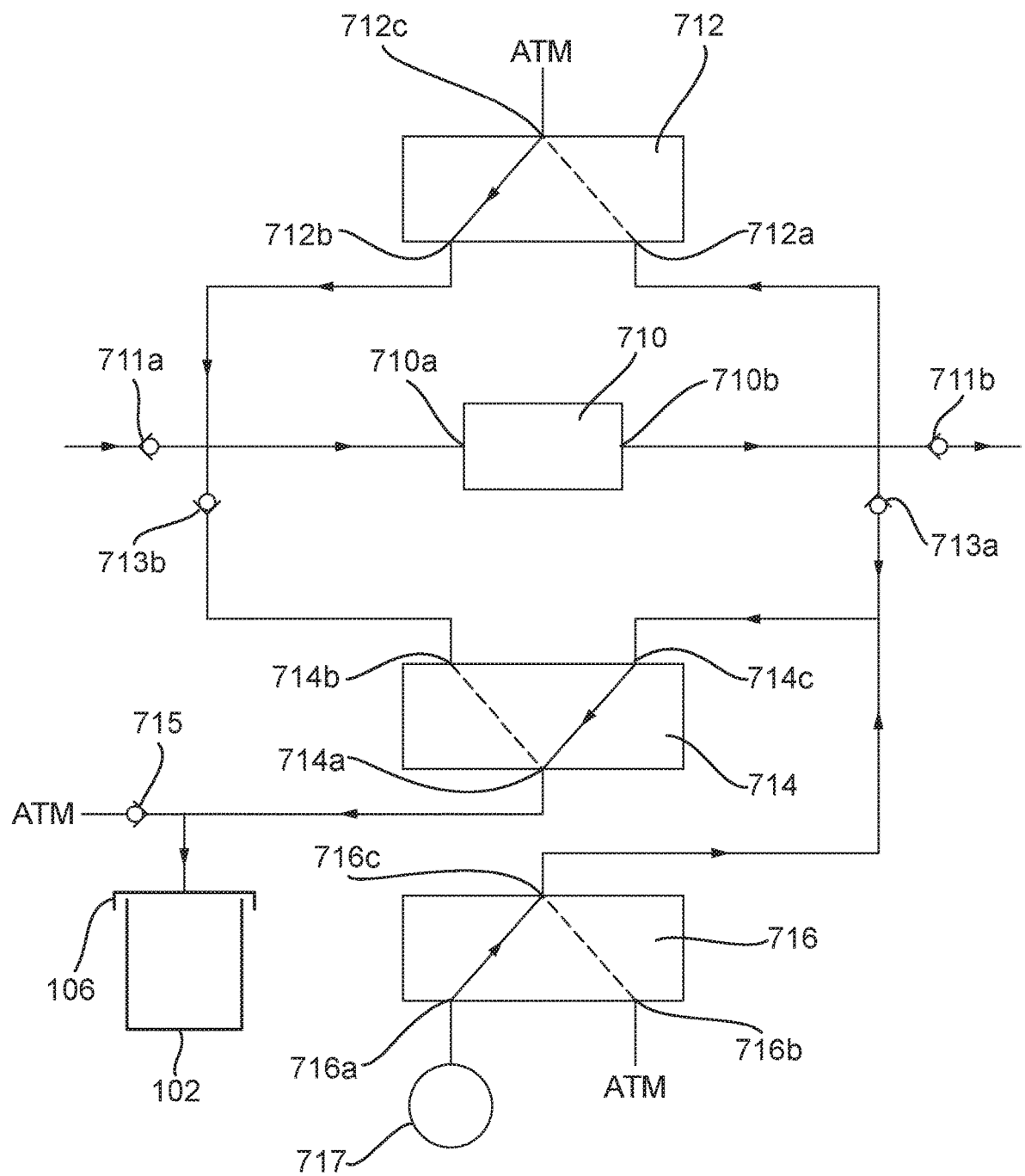
Figure 21C:
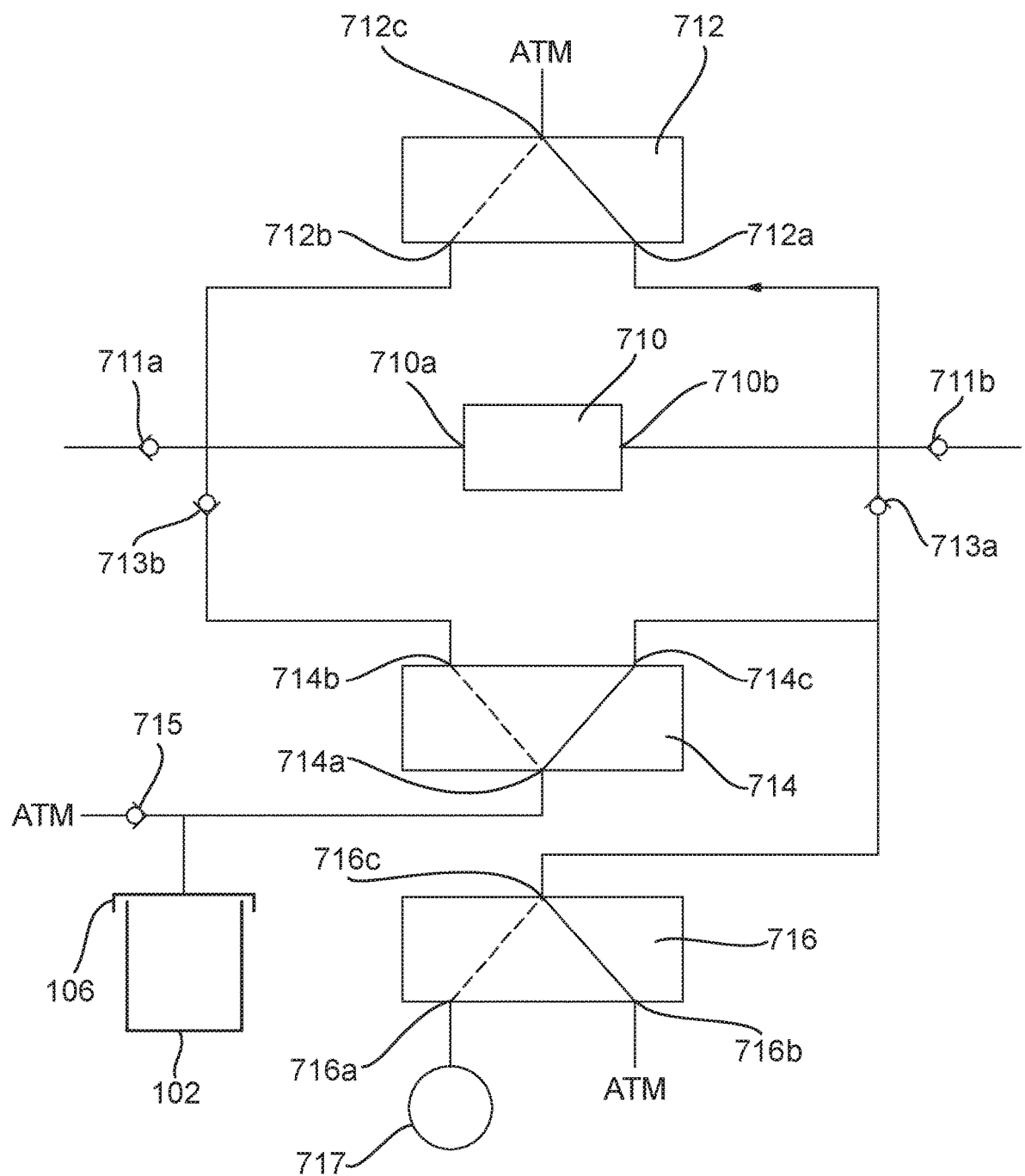

FIGS. 21A-21C show a schematic of another alternative embodiment of a system 700, which comprises a compressor 710 and three control valves 712, 714 and 716, all controlled by a control circuit (not shown).

The illustrated compressor 710 is a single head compressor, however, if greater pressures/continuous compressor operation are required (as discussed above), a multi headed compressor may be used instead. Compressor 710 has an inlet 710*a* and an outlet 710*b*. The inlet 710*a* delivers fluid to the compressor 710 via a first pressure regulator valve 711*a*, and the outlet 710*b* supplies compressed fluid from the compressor 710 to the system 700. The outlet 710*b* is operatively connected to a second pressure regulator valve 711*b*. First and second pressure regulator valves 711*a*, 711*b* are configured to vent excess system pressure.

The first control valve 712 has a first port 712*a* operatively connected to the fluid supply from the outlet 710*b* of the compressor 710, a second port 712*b* operatively connected to the fluid supply to the inlet 710*a* of the compressor 710, and a third port 712*c* operatively connecting the valve 712 to an atmospheric pressure source ATM. Control valve 712 is switchable, such that third port 712*c* can be selectively connected to either first port 712*a* or second port 712*b*, depending on the operation required of the system 700 (as explained below).

The second control valve 714 has a first port 714*a* operatively connected to the fluid reservoir 102, a second port 714*b* operatively connected, via a non-return valve 713*b*, to the fluid supply to the inlet 710*a* of the compressor 700, and a third port 714*c* operatively connected, via a non-return valve 713*a*, to the fluid supply from the outlet 710*b* of the compressor 710. Control valve 714 is switchable, such that first port 714*a* can be selectively connected to either second port 714*b* or third port 714*c*, depending on the operation of system 700 (as explained below).

The third control valve 716 has a first port 716*a* operatively connected to a positive pressure reservoir 717, a second port 716*b* operatively connected to an atmospheric pressure source ATM, and a third port 716*c* operatively connected, via non-return valve 713*a*, to the fluid supply from the outlet 710*b* of the compressor 710. Control valve 716 is switchable, such that third port 716*c* can be selectively connected to either first port 714*a* or second port 714*b*, depending on the operation of system 700 (as explained below).

By "operatively connected", it is meant that the various components are in fluid communication.

By "selectively connected", it is meant that, in one configuration, the two connected ports are in fluid communication with each other (i.e. allowing fluid communication across the control valve), whilst the other port not connected is prevented from communicating fluid across the control valve.

The operation of system 700 will now be described, with reference to FIGS. 21A-21C.

FIG. 21A shows the system 700 operating in a "normal driving" condition (i.e. where braking is not required and is not anticipated to begin), and the brake pads have already been retracted from the brake rotor (as discussed above). The control circuit can place the system 700 into this condition by detecting, for instance, via a sensor or switch, when the user's foot is on or has been returned to the accelerator pedal.

In this condition, the control circuit causes the first control valve 712 to selectively connect the first port 712a to the third port 712c, the second control valve 714 to selectively connect the first port 714a to the second port 714b, and the third control valve 716 to selectively connect the first port 716a to the third port 716c. This acts to operatively connect the fluid reservoir 102 with the atmosphere ATM, and to operatively connect the positive pressure reservoir 717 to the compressor outlet 710b.

Non-return valve 713b prevents any backflow from the atmosphere ATM to the fluid reservoir 102, and the disconnection of the third port 714c prevents communication of positive pressure from the reservoir 717 or the compressor 710 to the fluid reservoir 102. This maintains the negative pressure in the fluid reservoir 102, and keeps the brake pads retracted.

Non-return valve 713a prevents escape of positive pressure from the reservoir 717 to the atmosphere ATM. However, there may still be minor leakage over long periods of "normal driving" (i.e. over a long motorway journey without much traffic), or the pressure reservoir 717 may be depleted by a previous "pre-braking" event (as will be discussed with regard to FIG. 21B). To combat this, the positive pressure reservoir 717 can be "topped up", by activating the compressor 710 periodically using the control circuit. When the compressor 710 is activated, positive pressure fluid is directed from the outlet 710b, through check valve 713a and into the positive pressure reservoir 717.

Compressor 710 can be activated in any suitable manner. For instance, in one exemplary embodiment, compressor 710 is activated in response to an automatic timer control (i.e. timer circuit). The automatic timer control activates the compressor 710 for a pre-determined amount of time (i.e. a time sufficient to "top-up" the positive pressure reservoir 717) at regular pre-determined intervals (depending on the anticipated amount of leakage in the system 700).

In another exemplary embodiment, compressor 710 is activated in response to a pressure sensor determining that the pressure in the reservoir 717 is below a minimum pressure threshold. In this case, the compressor 710 is activated only when necessary, and switched off once the positive pressure reservoir 717 has reached a pre-determined (i.e. sufficient) positive pressure value. This may provide a more efficient "top-up" cycle to that of the timer control.

It should be understood, however, that if the system 700 is sufficiently sealed, such that significant leakage does not occur over time, "top-up" of the positive pressure reservoir may not be necessary. If this is the case, the associated timer circuitry/pressure sensors can be dispensed with, saving system complexity and cost.

FIG. 21B shows the system 700 operating in a "braking anticipation" condition (i.e. where braking is anticipated to begin). The control circuit can place the system 700 into this condition using any of the detection means as mentioned above in relation to FIGS. 10A, 10B, 11A, 11B and 12.

In this condition, the control circuit activates the compressor 710 and causes the first control valve 712 to selectively connect the second port 712b to the third port 712c, the second control valve 714 to selectively connect the first port 714a to the third port 714c, and the third control valve 716 to selectively connect the first port 716a to the third port 716c. This acts to operatively connect the compressor inlet 710a to the atmosphere ATM and the fluid reservoir 102 to the positive pressure reservoir 717 and the compressor outlet 710b, and delivers positive pressure to the fluid reservoir 102. In this way, the brake pads move towards the brake rotor in order to prepare for a brake event (as discussed above).

The delivery of positive pressure from the reservoir 717 is instant, and supplements that provided by the compressor 710, which may have some lag time as it spins up to speed once activated. This makes system 700 more responsive, such that the brake pads are moved to the correct braking anticipation position more quickly than if a positive pressure reservoir 717 was not present. It also means that compressor 710 may be made smaller, which reduces weight and cost, and improves efficiency of system 700. In applications where higher responsiveness is needed, and efficiency considerations are less important (e.g. in motor sport applications), compressor 710 can be ran continuously such that it does not present an activation lag time.

Positive pressure reservoir 717 may store enough fluid (e.g. air) to undergo a plurality of braking anticipation movements, before being depleted.

If the positive pressure reservoir 717 is sufficiently large or holds sufficiently high pressure to provide sufficient brake pad movement on its own, activation of the compressor 710 may not be necessary. In such embodiments, this would reduce the amount of power used by the system.

As mentioned above in relation to FIG. 21A, determination that a "normal driving" condition has been established will lead to "topping up" of the pressure in reservoir 717.

FIG. 21C shows the system 700 operating in a braking condition (i.e. where braking is occurring). The control circuit can place the system 700 into this condition by detecting, for instance, via a sensor or switch, when the user's foot is on and/or is pushing the brake pedal.

In this condition, the control circuit deactivates compressor 710 and causes the first control valve 712 to selectively connect the first port 712a to the third port 712c, the second control valve 714 to selectively connect the first port 714a to the third port 714c, and the third control valve 716 to selectively connect the second port 716b to the third port 716c. This acts to connect the fluid reservoir 102 to the atmosphere ATM and isolate the positive pressure reservoir 717 from the system 700, which is also connected to atmosphere ATM via second port 716b. Thus, this mode ensures system 700 does not interfere with the normal braking procedure or any other associated systems (e.g. ABS, traction control, or stability control), and that any residual pressure in system 700 dissipates to atmosphere ATM.

Once a braking event has been completed, the user removes their foot from the brake pedal, and the compressor switches back on and the system 700 reverts to that of FIG. 21B, with positive pressure directed to reservoir 102, in readiness for possible further brake applications. The control circuit then detects a subsequent accelerator actuation (indicating braking is no longer required), for instance, via a sensor or switch, and places the system 700 into a "retraction" condition, to retract the brake pads (as discussed above in other embodiments).

In this "retraction" condition, the control circuit places the system 700 as in the "normal driving" mode shown in FIG. 21A, and activates the compressor 710. Since fluid reservoir 102 is operatively connected to the compressor inlet 710a and is isolated from the compressor outlet 710b and the positive pressure reservoir 717, it experiences a negative pressure, which retracts the brake pads. At the same time, an initial "top-up" of positive pressure reservoir 717 occurs from compressor outlet 710b, which can allow system 700 to be quicker prepared for a subsequent "braking anticipation" event.

In one exemplary embodiment, the compressor 710 is activated for a pre-determined amount of time (i.e. corresponding to the time needed to retract the brake pads a suitable distance from the brake rotors) using a timer circuit. In another exemplary embodiment, the compressor 710 is activated until a pressure sensor detects a threshold negative pressure in the fluid reservoir 102 (i.e. corresponding to the negative pressure required to retract the brake pads a suitable distance from the brake rotors).

Although not illustrated, in some embodiments, a negative pressure reservoir can also be included in system 700. When the system 700 is placed into a "retraction" condition, the negative pressure reservoir is selectively placed into fluid communication with the brake fluid reservoir 102 (e.g. by a control valve), which supplies negative pressure thereto, to provide an instant driving force for brake pad retraction. This can aid brake pad retraction responsiveness, whilst the compressor 710 gets up to full speed after activation. The negative pressure reservoir can be in selective fluid communication with the compressor inlet 710a or a separate vacuum supply source, such that pressure can be removed therefrom when necessary (i.e. to replenish the negative pressure therein for a subsequent brake pad retraction event). This selective removal of pressure can be controlled by a timer control or pressure control, as discussed above for the positive pressure reservoir.

As will be understood by the skilled person, in order to create a more responsive system 700, higher positive pressures can be provided by compressor 710 and stored in reservoir 717. In such a system, in addition to the second pressure regulator valve 711b mentioned above, a further positive pressure regulator valve 715 is operatively connected between the fluid reservoir 102 and the first port 714a. Whilst 711b will allow a higher working pressure to speed-up system activation, the third pressure regulator valve 715 prevents delivery of too higher pressure to the fluid reservoir 102 by venting any excess pressure that exceeds the operating threshold of the fluid reservoir 102 (i.e. pressure which would cause too much brake pad movement and potential drag).

The first, second and third pressure regulator valves 711a, 711b, 715 may be restrictor valves or ball and spring or other sprung loaded type valve (as discussed above in other embodiments). Alternatively, the regulator valves 711a, 711b, 715 may be electronically controlled pressure sensor valves. In addition, the valves may be adjustable, such that their "cracking pressure" (as discussed above) can be adjusted, as desired.

In some embodiments, control valves 712, 714 and 716 are solenoid valves (such as discussed above in other embodiments). In embodiments using solenoid valves, when no power is supplied to system 700, the solenoid valves are configured to revert control valves 712, 714, 716 to the braking condition shown in FIG. 21C, such that in the event of power failure, system 700 does not interfere with normal braking systems and procedures.

In other embodiments, it is desirable to use latching valves. In contrast to solenoid valves, which rely on a constant current draw to keep the solenoid energized, latching valves rely on a momentary reversing of polarity and/or current signal to switch positions, and employ magnets or other means to hold the valve open or closed in that position. This is more energy efficient than using a constant current draw. However, it is to be understood that within the scope of this disclosure, any suitable type of control valve could be used.

Although control valves 712, 714 and 716 have been described in FIGS. 21A-21C as three separate valves, it is to be understood that within the scope of this disclosure, these valves could be substituted with a single multi-port valve (such as described above in previous embodiments) that provides the described selective port connections. This would make system 700 more compact.

In some embodiments, non-return valves 713a, 713b are silicone non-return valves, although is to be understood that within the scope of this disclosure, any suitable type of non-return valve could be used. For instance, in some embodiments, the non-returns valves may be electronically controlled pressure sensor valves.

In some embodiments employing at least one latching valve as a control valve, the latching valve position may be controlled using a double pole, double throw (DPDT) relay in conjunction with an adjustable timer circuit. As will be appreciated by the skilled person, a DPDT relay, with open contacts that are cross connected (i.e. normally open to normally closed and vice versa on both poles of the relay), provides one configuration that allows flow of current via each of the two common terminals to provide a first polarity (e.g. positive), and is switchable to provide a second configuration that allows flow of current providing the opposite polarity (e.g. negative). The DPDT relay switch is supplied with direct current (DC). In one example, the voltage of the supply DC is 12 volts, however, any suitable voltage could be used, such as 6 or 24 volts. The DC communicated through the DPDT relay contacts is converted to a pulse of current by placing a capacitor and a resistor connected in parallel between the DPDT relay and the latching valve. As will be appreciated by the skilled person, DC cannot pass through the capacitor, but the initial burst of charge when the current is first supplied to the capacitor will cause a pulse of current to be communicated across the capacitor to the latching valve. The resistor restricts the current flow until the voltage across the latching valve triggers its activation with a short burst of current the size and duration of which is determined by the resistor/capacitor values. In this manner, the capacitor and resistor act as a DC filter for the system, saving energy. Thus, a pulse of current of a certain polarity can be supplied to the latching valve using the DPDT relay switched contacts. This allows the latching valve position to be switched, by supplying current pulses of opposite polarities to the latching valve when necessary. By supplying pulses of current, as described above, the power required to control the latching valves and the system is reduced.

In operation, the DPDT relay is operatively and electrically connected to the detection means for determining the position and/or actuation of the accelerator pedal (e.g. a sensor or switch), as discussed above in other embodiments.

Upon detected actuation of the accelerator pedal (i.e. indicating a "retraction" condition—as described above), the timer activates the DPDT relay contacts to switch and provide a pulse of current of a first polarity. This pulse places the latching valve in a first position, operatively connecting the fluid reservoir to the compressor inlet, to enable brake pad retraction to take place. In addition to outputting the pulse of current to the latching valve, the relay also outputs a voltage to the timer that activates the compressor for a pre-determined amount of time to enact brake pad retraction (as described above).

When the accelerator pedal is detected as being released (i.e. indicating a "braking anticipation" condition—as described above), the DPDT relay contacts switch polarity to provide a pulse of current of the opposite polarity. This pulse places the latching valve in a second position, operatively connecting the fluid reservoir to the compressor outlet and (in embodiments where present) the positive pressure reservoir, to allow delivery of positive pressure to the fluid reservoir. The relay also outputs a voltage to the timer to activate the compressor, which enacts movement of the brake pads towards the brake rotor for a pre-determined amount of time (set by the timer), to enable the brake pads to return to their brake position in order to prepare for a brake event (as discussed above).

Upon reapplication of the accelerator pedal (i.e. indicating a subsequent "retraction" condition) the timer will reset, ready for subsequent operations that will be activated by the relay output.

As is to be appreciated, the timer, relay and latching valve combination described above, allows system operation to be enacted by only single pulses of current, and it is only the timer that needs be supplied with a constant, and relatively low, current supply in stand-by mode to enable system operation. This may provide a system with particularly low power/battery drain whilst the car is in "cruise" (i.e. normal driving) conditions, which may be particularly advantageous for electric cars, where such drain is a primary concern.

Although the embodiment of FIGS. 21A-21C is described using an electrical control scheme (i.e. relying on a control circuit to detect operation modes and electrical signals to switch control valves 712, 714, 716), it should be understood that in other embodiments within the scope of this disclosure, a mechanically linked control system is used, in which movement of the accelerator pedal and/or brake pedal can mechanically move control valves in the system and activate the passage of relative fluid pressures in the system to provide operation in accordance with FIGS. 21A-21C. Suitable control valves could be pneumatic valves, pneumatically piloted valves or mechanically operated valves.

In such embodiments, a control circuit may be used to active and deactivate the compressor, or in certain applications where efficiency is less of a concern (e.g. such as for motor sport applications), the compressor could run continuously.

An embodiment of such a mechanically controlled system 800 is shown in FIG. 22. System 800 comprises a compressor 810 and first and second control valves 812, 814 that are controlled by actuation of the accelerator pedal. Compressor 810 is either independently activated and deactivated when necessary to supply positive or negative pressure to the fluid reservoir 102 or left constantly running (as described above).

The illustrated compressor 810 is a single headed compressor, however, if greater pressures/continuous compressor operation are required (as discussed above), a multi headed compressor may be used instead. Compressor 810 has an inlet 810a and an outlet 810b.

The first control valve 812 is a three-port valve having a first port 812a operatively connected to the compressor inlet 810a via a first pressure regulator valve 811a, a second port 812b operatively connected to the fluid reservoir 102, and a third port 812c operatively connecting the valve 812 to atmosphere. First control valve 812 is switchable via actuation of switch 813, such that the first port 812a can be selectively connected to the second port 812b or the third port 812c, allowing different fluid flow paths through the first control valve 812, depending on the operation required of the system 800 (as described below).

The second control valve 814 is a two-port valve having a first port 814a operatively connected to the compressor outlet 810b via a second pressure regulator valve 811b and a positive pressure reservoir 817, and a second port 814b operatively connected to the fluid reservoir 102 via a non-return valve 819a and a third pressure regulator valve 819b. Second control valve 814 is switchable via actuation of switch 815, such that the first port 814a and the second port 814b can be selectively connected or disconnected, permitting or preventing fluid flow through the second control valve 814, depending on the operation required of the system 800 (as described below).

It is to be understood that first, second and third pressure regulator valves 811a, 811b and 819b and non-return valve 819a may be any suitable pressure regulator valve or non-return valve as already described above.

Switches 813 and 815 are mechanically linked to the accelerator pedal, such that they are both simultaneously actuated in response to accelerator pedal movement.

When the accelerator pedal is released (i.e. rises from a depressed position) (such as in a "braking anticipation event"), switch 813 is "pushed out" and switch 815 is "pushed in" (as shown in FIG. 22). The movement of switch 813 places the third port 812c into fluid communication with the first port 812a and places second port 812b against an internal blank 812d. This permits fluid from the atmospheric pressure source to communicate through the first control valve 812 via third and first ports 812a, 812c, and prevents fluid communicating through the first control valve 812 from the second port 812b. The movement of switch 815 connects the first port 814a to the second port 814b, such that fluid communication is allowed through the second control valve 814. Thus, as can be seen in FIG. 22, this places the atmospheric pressure source at the third port 812c into fluid communication with the compressor inlet 810a to allow pressurization of fluid through the compressor 810, and places the compressor outlet 810b and positive pressure reservoir 817 into fluid communication with the fluid reservoir 102 via the second control valve 814. This allows the delivery of positive pressure from the compressor outlet 810b and the positive pressure reservoir 817 to the fluid reservoir 102, which pushes the brake pads towards the brake rotor in preparation for an anticipated braking event, as described above in previous embodiments.

When the accelerator pedal is depressed (e.g. triggering a "retraction condition"), switch 813 is "pushed in" and switch 815 is "pushed out" (the opposite configuration to that shown in FIG. 22). The movement of switch 813 disconnects the third port 812c from the first port 812a, preventing fluid communicating through the first control valve 812 from the third port 812c, and places the second port 812b into fluid communication with the first port 812a, permitting fluid communication through the first control valve 812 via the second and first ports 812b, 812a. The movement of switch 815 disconnects the first port 814a from the second port 814b, preventing fluid communication through the second control valve 814. This configuration places the compressor inlet 810a in fluid communication with the fluid reservoir 102 via the first control valve 812. This allows a negative pressure to be exerted on the fluid reservoir 102 from the compressor 810, to retract the brake pads away for the brake rotor during non-braking conditions, as described above in previous embodiments. The compressor outlet 810b is in fluid communication with the second pressure regulator valve 811b and the positive pressure reservoir 817. This allows positive pressure reservoir 817 to be "topped-up" via positive pressure from the compressor outlet 810b, as described in the embodiments of FIGS. 21A-21C, as well as permitting any excess pressure to be vented from the system 800 via the second pressure regulator valve 811b.

FIG. 22 also depicts an optional, third control valve 816 that is controlled by actuation of the brake pedal. Although depicted, it is to be understood that the third control valve 816 is entirely optional, and system 800 may be used without it.

The third control valve 816 has a first port 816a in fluid communication with the second port 814b of the second control valve 814, a second port 816b that is in fluid communication with an external blank 816d, preventing fluid from passing out of the third control valve 816 through the second port 816b, and a third port 816c that is in fluid communication with an atmosphere. Third control valve 816 is switchable via actuation of switch 818, such that the first port 816a can be selectively connected to the second port 816b or the third port 816c, allowing different fluid flow paths through the third control valve 816, depending on the operation required of the system 800 (as described below).

Switch 818 is mechanically linked to the brake pedal, such that it is actuated by brake pedal movement.

When the brake pedal is depressed (i.e. during a braking event), switch 818 is "pushed out" (as shown in FIG. 22). The movement of switch 818 connects the first port 816a to the third port 816c, such that the system 800 is vented to the atmosphere via the third control valve 816. As in previous embodiments, this ensures that the operation of system 800 does not interfere with the braking process.

When the brake pedal is released (i.e. rises from a depressed position), switch 818 is "pushed in". The movement of switch 818 disconnects the first port 816a from the third port 816c, and connects the first port 816a to the second port 816b. This prevents fluid passing out of the system 800 through the third control valve 816 during non-braking conditions, which ensures the appropriate pressure is retained in the system 800 to allow the aforementioned operation of the system 800 when responding to accelerator pedal movement (i.e. to provide a retraction condition and/or an anticipated braking condition).

Although the above switches 813, 815, 818 have been described as being "pushed in" or "pushed out", is it to be understood that within the scope of this disclosure any suitable movement or actuation of the switches 813, 815, 818 may be used to enable operation of the system 800 in response to accelerator/brake pedal movement.

A mechanically operated system, such as described above, may only require electrical power to power the compressor in order to permit operation. Therefore, the system maybe simpler, cheaper and more power efficient than an electrically controlled system.

Figure 15A:
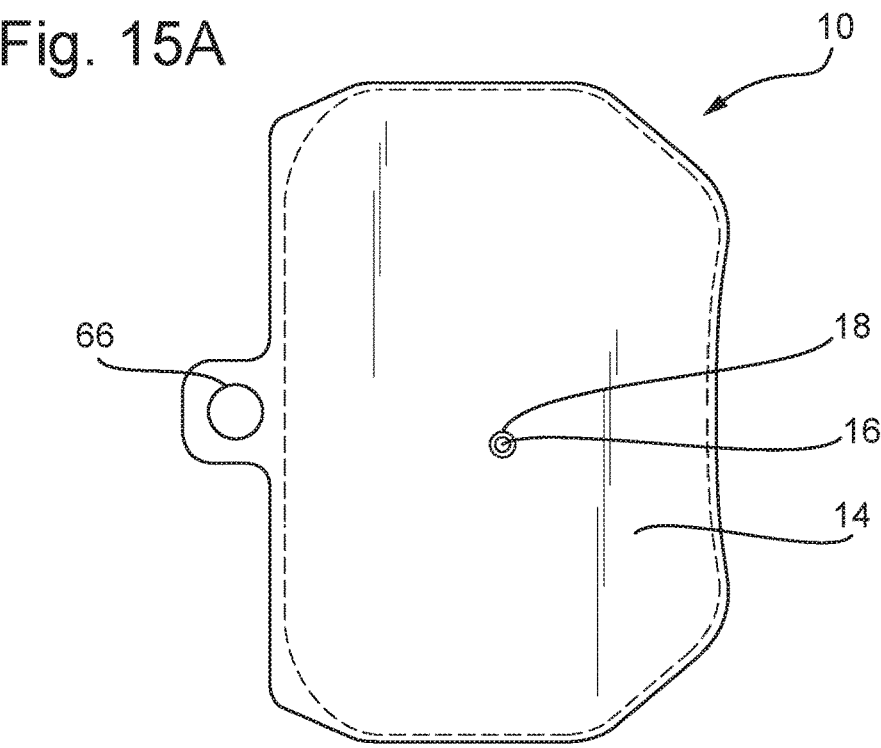
FIGS. 15A, 15B and 15C show a brake pad for use with an aspect of the present invention, without the air supply tube fitted thereto.
Figure 15B:
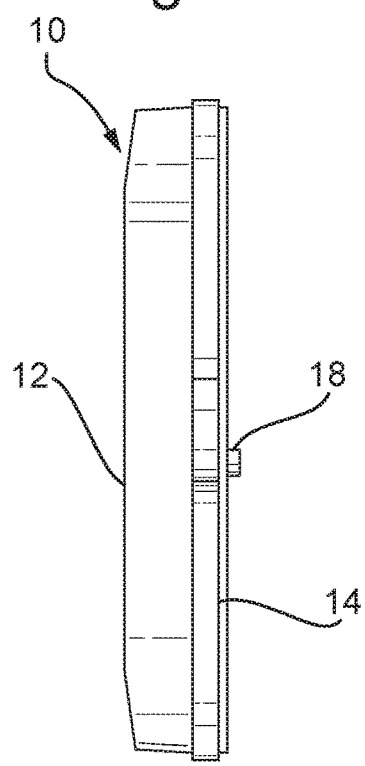
Figure 15C:
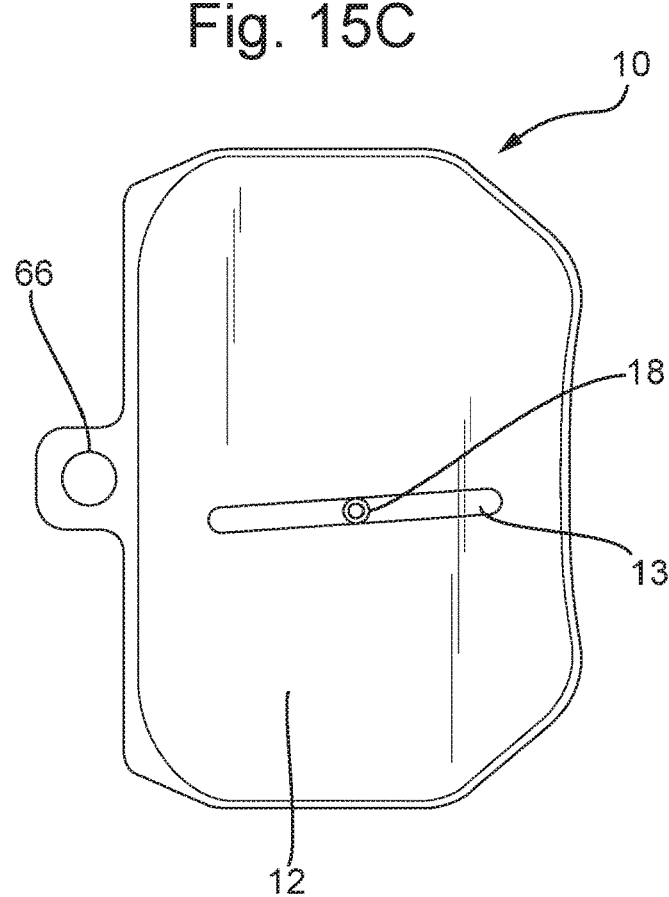

FIGS. 15A, 15B and 15C show a brake pad 10 for use with the present invention, without the air supply tube fitted thereto. FIG. 15A is a back view of the brake pad 10. FIG. 15B is a side view of the brake pad 10. FIG. 15C is a front view of the brake pad 10. The brake pad 10 has a braking surface 12 and an opposing back surface 14. An aperture 16 extends through the brake pad 10 between the braking surface 12 and the back surface 14. An open ended cylindrical spigot 18 extends from the back surface 14 of the brake pad 10, and provides an inlet to the aperture 16. The spigot 18 may extend into the aperture 16 (i.e. into the back surface 14) or may just surround the aperture 16 on the back surface 14. The braking surface 12 has an elongate slot 13 located therein. The elongate slot 13 is spaced from the peripheral edges of the braking surface 12; i.e. it is entirely enclosed by the braking surface. The elongate slot 13 extends at least partially through the depth of the braking surface. The aperture 16 is located in the elongate slot 13, for example, at the shown central location. As such, the interior of the spigot 18 is in fluid communication with the slot 13 and the braking surface 12 via the aperture 16.

Figure 16A:
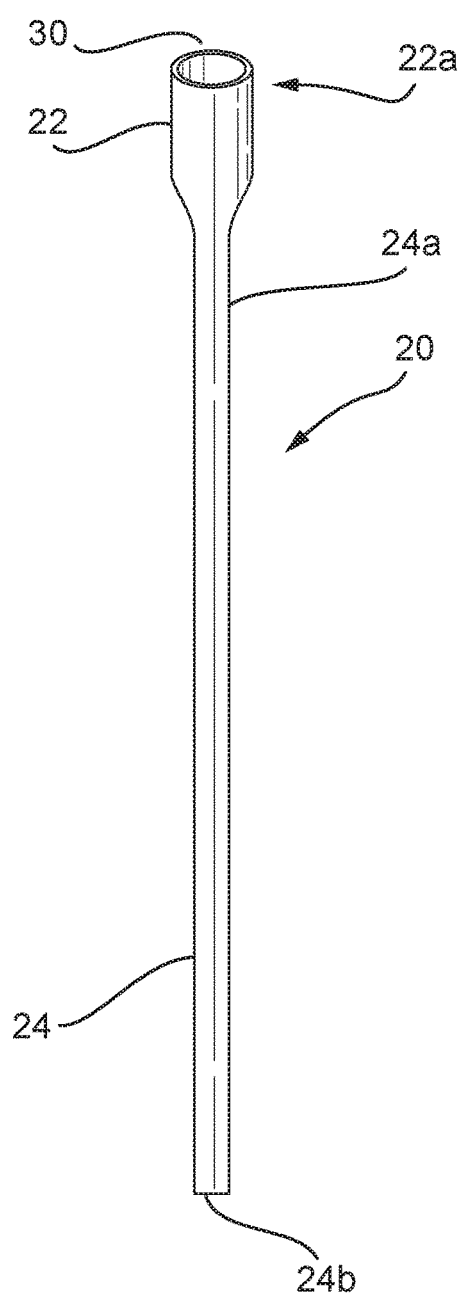
FIGS. 16A, 16B, 16C and 16D show an air supply tube for use with an aspect of the present invention.
Figure 16B:
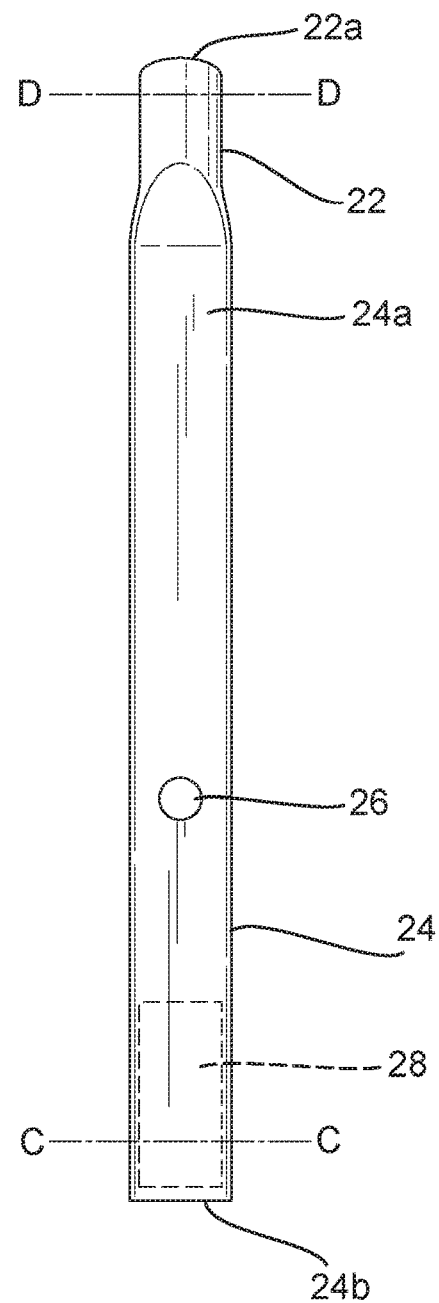
Figure 16C:
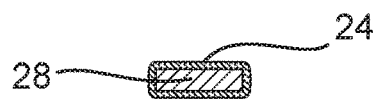
Figure 16D:
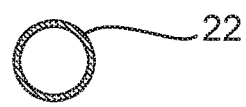

FIGS. 16A, 16B and 16C show an air supply tube 20 for use with the present invention. FIG. 16A shows a side view of the air supply tube 20. FIG. 16B shows a bottom view of the air supply tube 20. FIG. 16C shows a cross sectional end view of the air supply tube 20, taken at line C-C on FIG. 16B. FIG. 16D shows a cross sectional end view of the air supply 20, taken at line D-D on FIG. 16B. The air supply tube 20 has a tubular portion 22, and a flattened portion 24. The tubular portion 22 has a substantially circular cross section. The flattened portion 24 has a shorter, wider cross section, such as an ovaloid, whilst still providing a channel of the same cross-sectional area for air to flow through. The flattened portion 24 includes a hole 26. The flattened portion 24 also includes a magnet 28. The hole 26 is located between the magnet and the tubular portion 22. The air supply tube 20 is sealed at the free end 24b of the flattened portion 24. The magnet 28 may provide the seal. The magnet 28 may be provided inside the air supply tube 20, or extend partially out of the end of the air supply tube 28. The air supply tube 20 has an air inlet 30 at the free end 22a of the tube portion 24. The air supply tube 20 is formed from a malleable metal, such as stainless steel, allowing it to be manipulated, i.e. for a cylindrical spigot section thereof to be reformed into the flattened portion 24. Such a metal will maintain its shape during the high temperatures that will be experienced during use of the brake.

Figure 17A:
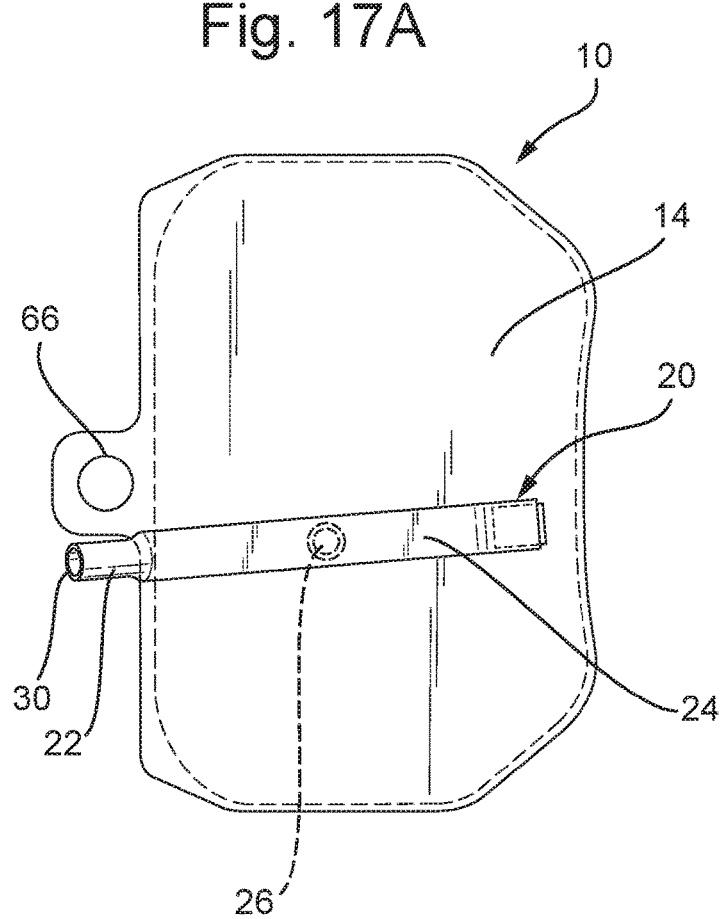
FIGS. 17A, 17B and 17C show the brake pad of FIGS. 15A and 15B with the air supply tube of FIGS. 16A, 16B and 16C fitted thereto.
Figure 17B:
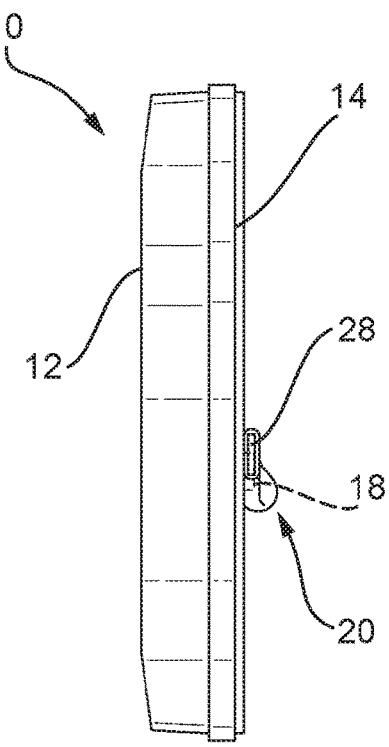
Figure 17C:
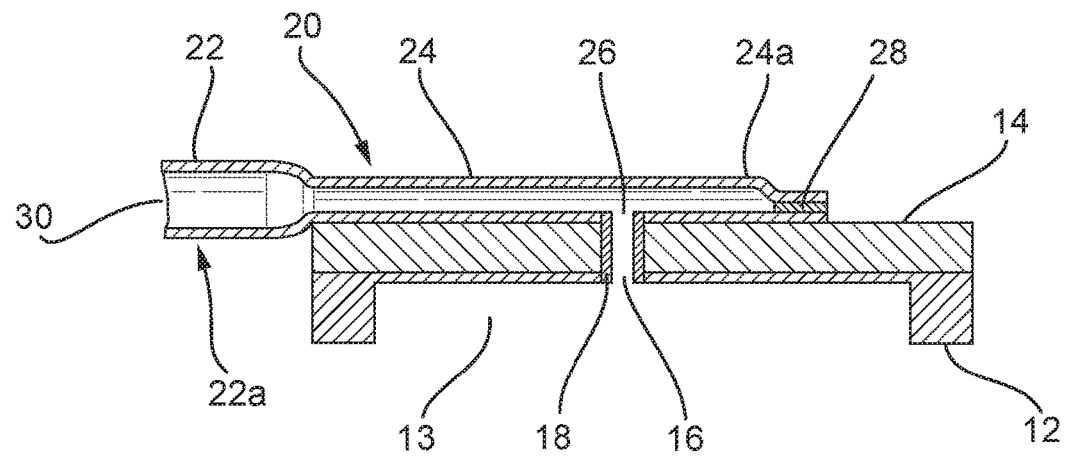

FIGS. 17A, 17B and 17C show the brake pad 10 of FIGS. 15A and 15B with the air supply tube 20 of FIGS. 16A, 16B and 16C fitted thereto. FIG. 17A is a back view of the brake pad 10. FIG. 17B is a side view of the brake pad 10. FIG. 17C is a schematic cross-section side view of the brake pad 10, in which dimensions have been exaggerated for clarity. The hole 26 (shown in dotted lines) in the air supply tube 20 is aligned with the spigot 18, and the spigot 18 extends partially into the hole so as to maintain the alignment between spigot 18 and the hole 26 by preventing any sideways movement of the air supply tube 20 with respect to the brake pad 10 (i.e. parallel to the back surface 14) in the location of the aperture 16 and the hole 26. The air supply tube 20 is free to rotate fully (i.e. 360°) with respect to the back plate 14 of the brake pad 10, about the axis of the spigot 18. The magnet 28 secures the air supply tube 20 to the back surface 14 in the direction i.e. perpendicular to the back surface 14. The magnet 28 also secures the air supply tube 20 in directions parallel to the brake pad 10 for low forces: i.e. the magnet 28 can be moved along the back surface 14 (such that the air supply tube 20 can still rotate freely about the cylindrical spigot 18) upon application of sufficient force. The force required allows a user to easily move the magnet 28 on the back surface 14, but is sufficient to resist the forces that will occur during use, such as during rattle.

Figure 18:
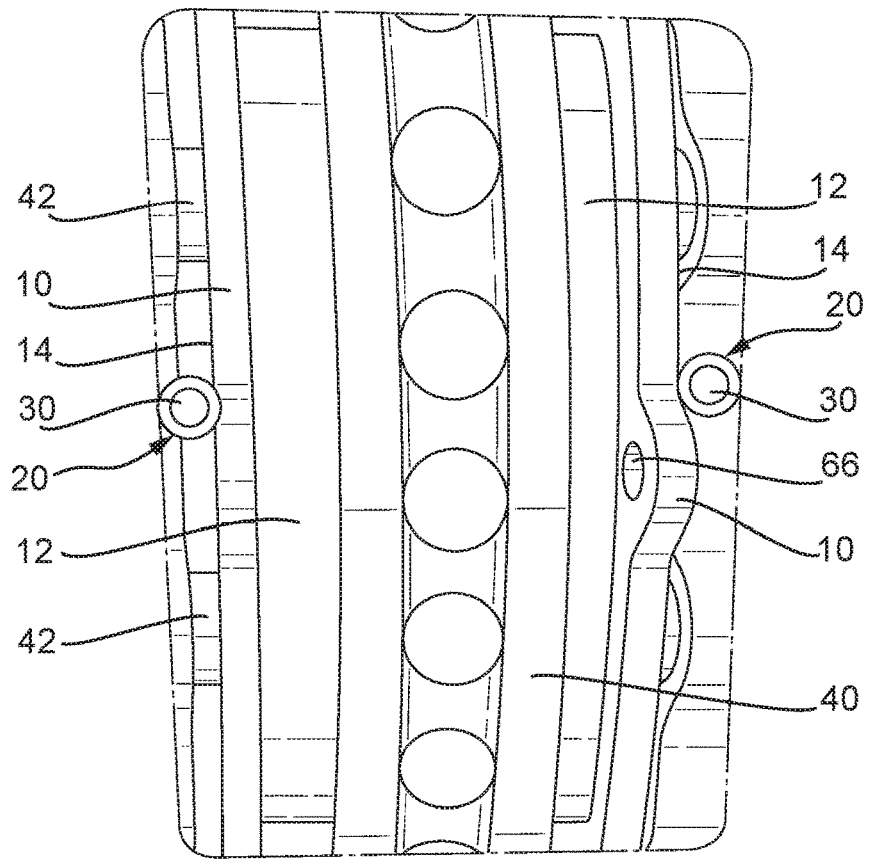
FIG. 18 shows a brake system including the brake pad of FIGS. 15A and 15A attached to the air supply tube of FIGS. 16A, 16B and 16C fitted thereto.

FIG. 18 shows a brake system including the brake pad 10 attached to the air supply tube 20. Brake pads 10 are located on either side of a brake disc 40. The brake pads 10 are located between the brake disc 40 and pistons 42. The pistons 42 are connected to a hydraulic brake system (not shown). As the pipes 20 are attached to the back surfaces 14 of the brake pads, they are located on the side of the brake pads 10 distal the brake disc 40. The flattened pipes 20 can more easily fit in this space than circular pipes having the same area of cross section. The flattened portion 24 of the air supply tube has a thickness of 1-2 mm.

Figure 19A:
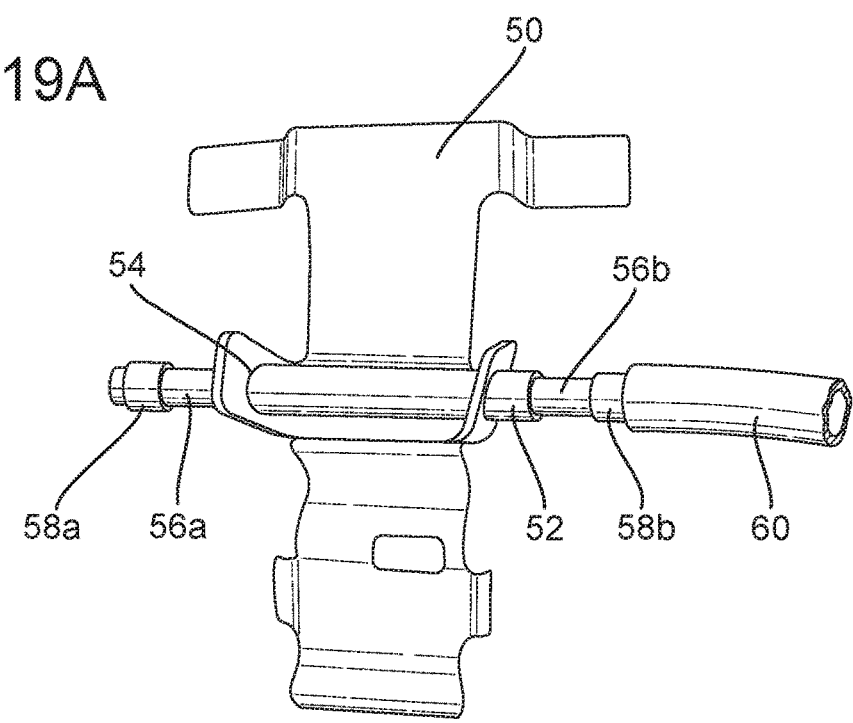
FIGS. 19A and 19B show an anti-rattle spring for use with the brake system of FIG. 18.
Figure 19B:
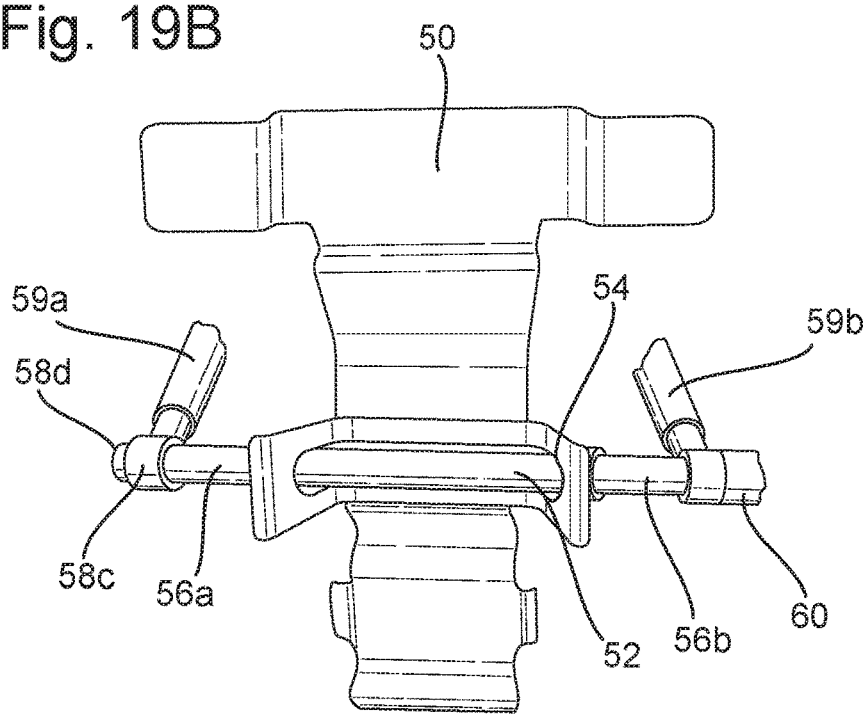

FIGS. 19A and 19B show an anti-rattle spring 50 for use with the brake system of FIG. 18. Adjustment air supply tube 52 extends through holes 54 in the anti-rattle spring 50, and is spot welded thereto. Air supply elbows 58a,b are T-shaped, having three inlets. The inlets can function as inlets or outlets. Two inlets have the same longitudinal axis. The elbow inlet 59 has a longitudinal axis perpendicular to that of the two inlets. The air supply elbows 58a,b supply air to each of the air inlets 30 of the pipes 20 via elbow inlets 59a,b. Inner pipes 56a,b extend between the ends of adjustment air supply tube 52 and an inlet of a respective air supply elbow 58a,b. The inner pipes 56a,b can move relative to the respective air supply elbow 58a,b and/or the adjustment air supply tube 52, allowing for different sized brake pads, wear of the brake pads over time, additional components of a brake system, and movement in use. One air supply elbow 58a is sealed off at the end opposite the inlet 56a. The other air supply elbow 58b is attached to air supply air supply tube 60, such that air is supplied to one air inlet 30 of an air supply tube 20 via air supply elbow 58b proximate the air supply air supply tube 60, and air is supplied to the air inlet 30 of the other air supply tube 20 via the air supply elbow 58b proximate the air supply tube, the inner tube 56b proximate the air supply air supply tube 60, the adjustment air supply tube 52, the other inner tube 56a, and the other air supply elbow 58a.

Figure 20:
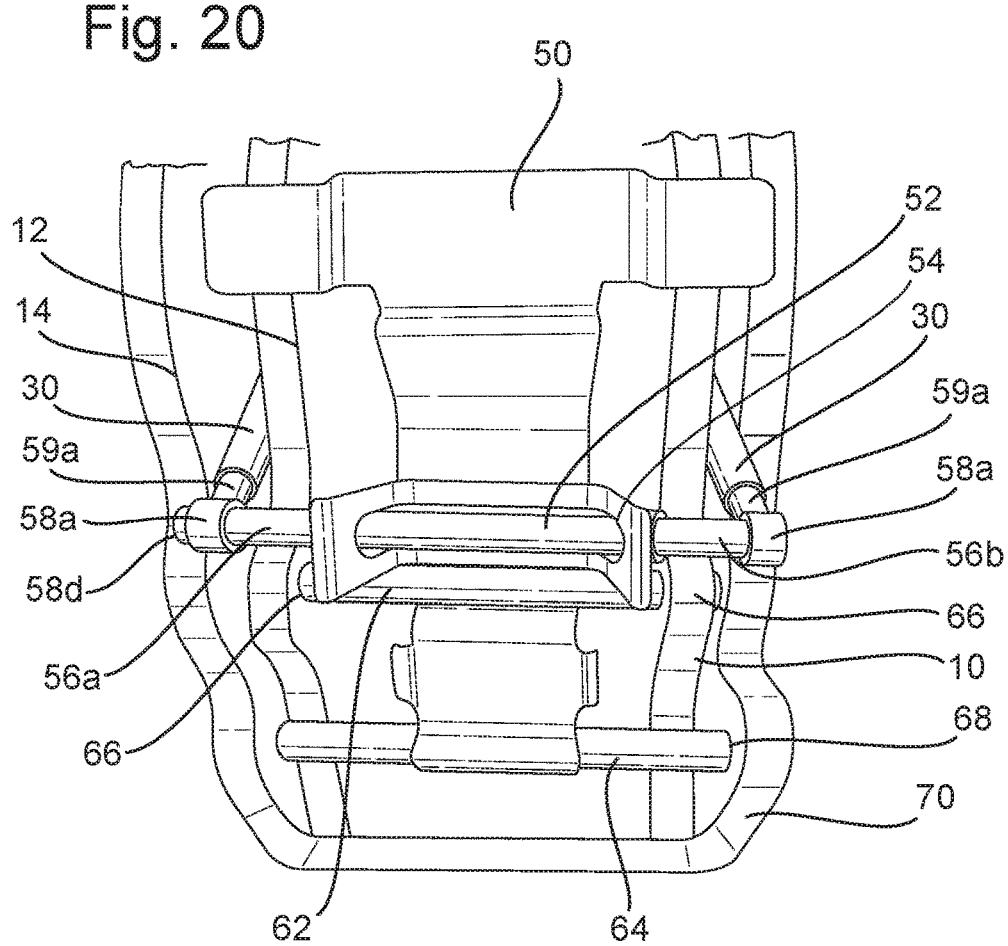
FIG. 20 shows the brake system of FIG. 18 with the anti-rattle spring of FIGS. 19A and 19B fitted.

FIG. 20 shows the brake system of FIG. 18 with the anti-rattle spring 50 of FIGS. 19A and 19B fitted. Elbow inlets 59a,b are attached to the air inlets 30 of the pipes 20. The air supply air supply tube and some components of the brake system have not been shown for simplicity. Securement bars 62 and 64 hold the anti-rattle spring 50 in place. Securement bar 62 extends through a channel in the anti-rattle spring 50 and through securement holes 66 in the brake pads on either side of the anti-rattle spring 50. Securement bar 64 extends through another channel in the anti-rattle spring 50 and through securement holes 68 in the caliper 70 on either side of the anti-rattle spring.

The invention claimed is:

1. A brake control system for a vehicle, the brake control system comprising:
   a master cylinder;
   a brake line for communicating brake fluid between the master cylinder and a brake;
   a fluid reservoir in fluid communication with the brake line during non-braking driving conditions; and
   a gas removal device configured to selectively remove gas from the fluid reservoir to move brake fluid into the fluid reservoir so that brake fluid is moved along the brake line in a direction towards the master cylinder, during non-braking driving conditions;
   wherein the fluid reservoir comprises a flexible diaphragm that fluidly isolates the brake fluid from the gas removal device.

2. The brake control system of claim 1, wherein the gas removal device is configured to selectively remove gas from the fluid reservoir so that brake fluid is moved along the brake line in a direction towards the master cylinder, upon commencement of acceleration conditions.

3. The brake control system of claim 1, wherein the master cylinder comprises a main chamber having an outlet for communicating brake fluid to the brake line, the fluid reservoir is in fluid communication with the outlet via the main chamber during non-braking driving conditions, and selectively moving brake fluid into the fluid reservoir causes brake fluid to move between the fluid reservoir and the main chamber, and between the main chamber and the brake line via the outlet.

4. The brake control system of claim 1, wherein the fluid reservoir is isolated from the brake line for at least a portion of the duration of braking conditions.

5. The brake control system of claim 1, further comprising a gas supply device configured to selectively supply gas to the fluid reservoir to move brake fluid out of the fluid reservoir so that brake fluid is moved along the brake line in a direction away from the master cylinder, during non-braking driving conditions.

6. The brake control system of claim 5, wherein the gas supply device is configured to selectively supply gas to the fluid reservoir to move brake fluid out of the fluid reservoir, so that brake fluid is moved along the brake line in a direction away from the master cylinder, immediately preceding a predicted braking event.

7. The brake control system of claim 5, further comprising an auxiliary reservoir for holding a volume of pressurized gas, wherein the auxiliary reservoir is in selective fluid communication with the fluid reservoir to supply gas to the fluid reservoir.

8. The brake control system of claim 1, wherein the gas removal device is configured to move brake fluid into the fluid reservoir for a limited time period, wherein the limited time period is initiated by a signal received by the gas removal device.

9. The brake control system of claim 1, wherein the gas removal device is configured to at least selectively fluidly isolate the fluid reservoir from atmosphere.

10. The brake control system of claim 1, wherein the gas removal device comprises a compressor, wherein an inlet of the compressor is in selective fluid communication with the fluid reservoir, and an outlet of the compressor is in selective fluid communication with the fluid reservoir.

11. The brake control system of claim 10, further comprising at least one control valve wherein, when the at least one control valve is in a first configuration, the outlet of the compressor is in fluid communication with the fluid reservoir and the inlet of the compressor is in fluid communication with atmosphere, and when the at least one control valve is in the second configuration, the outlet of the compressor is in fluid communication with atmosphere, and the inlet of the compressor is in fluid communication with the fluid reservoir;
    wherein, upon commencement of acceleration conditions, the at least one control valve is switched to the second configuration; and
    wherein, during non-braking driving conditions immediately preceding a predicted braking event or at the start of braking conditions, the at least one control valve is switched to the first configuration.

12. The brake control system of claim 1, further comprising one or more timers or one or more pressure sensors for controlling the gas removal device.

13. The brake control system of claim 1, wherein the system is configured such that, during braking conditions, the fluid reservoir is in fluid communication with atmosphere.

14. A method of controlling a vehicle brake system having a master cylinder, a brake line for communicating brake fluid between the master cylinder and a brake, and a fluid reservoir in fluid communication with the brake line during non-braking driving conditions, the method comprising:
    selectively moving brake fluid into the fluid reservoir by removing gas from the fluid reservoir with a gas removal device, such that brake fluid is moved along the brake line in a direction towards the master cylinder, during non-braking driving conditions;

wherein the fluid reservoir comprises a flexible diaphragm that fluidly isolates the brake fluid from the gas removal device.

15. The method of claim 14, comprising selectively moving brake fluid into the fluid reservoir by removing gas from the fluid reservoir, upon commencement of acceleration conditions.

16. The method of claim 14, further comprising selectively moving brake fluid out of the fluid reservoir by supplying gas to the fluid reservoir, such that brake fluid is moved along the brake line in a direction away from the master cylinder, during non-braking driving conditions.

17. The method of claim 14, comprising selectively moving brake fluid out of the fluid reservoir by supplying gas to the fluid reservoir, such that brake fluid is moved along the brake line in a direction away from the master cylinder, immediately preceding a predicted braking event.

18. The method of claim 14, wherein the step of removing gas from the fluid reservoir is for a limited time period, wherein the limited time period is initiated by a signal indicating the non-braking driving conditions.

19. The method of claim 14, further comprising:

using an auxiliary reservoir for holding a volume of pressurized gas to supply gas to the fluid reservoir; and selectively supplying gas to the auxiliary reservoir during non-braking driving conditions to pressurize the auxiliary reservoir.

20. A brake control system for a vehicle, the brake control system comprising:

a master cylinder;

a brake line for communicating brake fluid between the master cylinder and a brake;

a fluid reservoir in fluid communication with the brake line during non-braking driving conditions; and a gas removal device configured to selectively remove gas from the fluid reservoir to move brake fluid into the fluid reservoir so that brake fluid is moved along the brake line in a direction towards the master cylinder, during non-braking driving conditions;

wherein the system is configured such that, during braking conditions when the gas removal device is not active, the fluid reservoir is in fluid communication with atmosphere, and during non-braking driving conditions when the gas removal device is active, the fluid reservoir is not in fluid communication with atmosphere.

* * * * *